(12) United States Patent
Ngo et al.

(10) Patent No.: US 10,540,226 B2
(45) Date of Patent: *Jan. 21, 2020

(54) WRITE TECHNIQUE FOR A BUS INTERFACE SYSTEM

(71) Applicant: Qorvo US, Inc., Greensboro, NC (US)

(72) Inventors: Christopher Truong Ngo, Queen Creek, AZ (US); Alexander Wayne Hietala, Phoenix, AZ (US)

(73) Assignee: Qorvo US, Inc., Greensboro, NC (US)

( * ) Notice: Subject to any disclaimer, the term of this patent is extended or adjusted under 35 U.S.C. 154(b) by 646 days.

This patent is subject to a terminal disclaimer.

(21) Appl. No.: 14/659,355

(22) Filed: Mar. 16, 2015

(65) Prior Publication Data

US 2015/0193298 A1 Jul. 9, 2015

Related U.S. Application Data

(63) Continuation-in-part of application No. 14/575,491, filed on Dec. 18, 2014, now Pat. No. 10,185,683.

(Continued)

(51) Int. Cl.
*G06F 11/08* (2006.01)
*G06F 11/22* (2006.01)
(Continued)

(52) U.S. Cl.
CPC ............. *G06F 11/08* (2013.01); *G06F 1/10* (2013.01); *G06F 1/26* (2013.01); *G06F 11/00* (2013.01);
(Continued)

(58) Field of Classification Search
CPC ........ G06F 13/36; G06F 13/38; G06F 13/385; G06F 13/40; G06F 2213/0016;
(Continued)

(56) References Cited

U.S. PATENT DOCUMENTS 3,953,835 A * 4/1976 Cuccio .................... G06F 13/24
710/60
5,787,132 A * 7/1998 Kishigami et al. ....... H04L 7/00
375/354

(Continued)

OTHER PUBLICATIONS

Author Unknown, "1-Wire," Wikipedia, last modified Jan. 16, 2015, accessed Feb. 12, 2015, http://en.wikipedia.org/wiki/1-Wire, 4 pages.

(Continued)

*Primary Examiner* — Tim T Vo
*Assistant Examiner* — Kim T Huynh
(74) *Attorney, Agent, or Firm* — Withrow & Terranova, P.L.L.C.

(57) ABSTRACT

Embodiments of a bus interface system are disclosed. In one embodiment, the bus interface system includes a master bus controller and a slave bus controller coupled to a bus line. The master bus controller is configured to generate a first set of data pulses along the bus line representing a payload segment. The slave bus controller is configured to decode the first set of data pulses representing the payload segment into a decoded payload segment. The slave bus controller is then configured to perform a first error check on the decoded payload segment. Furthermore, the slave bus controller is configured to generate an acknowledgment signal along the bus line so that the acknowledgement signal indicates that the decoded payload segment passed the first error check. In this manner, the master bus controller can determine that the slave bus controller received an accurate copy of the payload segment.

31 Claims, 17 Drawing Sheets

Related U.S. Application Data

(60) Provisional application No. 61/953,251, filed on Mar. 14, 2014, provisional application No. 61/917,610, filed on Dec. 18, 2013.

(51) Int. Cl.
  *G06F 11/30*     (2006.01)
  *G06F 13/362*    (2006.01)
  *G06F 1/10*      (2006.01)
  *G06F 1/26*      (2006.01)
  *G06F 11/00*     (2006.01)
  *H04L 1/00*      (2006.01)
  *H04L 1/16*      (2006.01)

(52) U.S. Cl.
  CPC ........ *G06F 11/221* (2013.01); *G06F 11/3027* (2013.01); *G06F 13/3625* (2013.01); *H04L 1/00* (2013.01); *H04L 1/0041* (2013.01); *H04L 1/0045* (2013.01); *H04L 1/0061* (2013.01); *H04L 1/1692* (2013.01); *H04L 2001/0094* (2013.01)

(58) Field of Classification Search
  CPC ..... G06F 2213/0024; G06F 2213/0026; G06F 13/4004; G06F 13/4027; G06F 2213/4002; G06F 12/0835; H04L 12/40052; H04L 2012/4026
  USPC .......................... 710/110, 305–306; 714/100
  See application file for complete search history.

(56) References Cited

U.S. PATENT DOCUMENTS

| | | | |
|---|---|---|---|
| 6,408,163 B1 | 6/2002 | Fik | |
| 6,484,268 B2 | 11/2002 | Tamura et al. | |
| 7,685,320 B1 | 3/2010 | Wishneusky | |
| 9,430,321 B2 | 8/2016 | Slik | |
| 9,519,612 B2 | 12/2016 | Hietala et al. | |
| 9,652,451 B2 | 5/2017 | Elder | |
| 2001/0050713 A1* | 12/2001 | Kubo | H04N 5/335 348/220.1 |
| 2004/0049619 A1 | 3/2004 | Lin | |
| 2004/0100400 A1 | 5/2004 | Perelman et al. | |
| 2004/0128594 A1* | 7/2004 | Elmhurst | G11C 11/56 714/718 |
| 2004/0221067 A1 | 11/2004 | Huang et al. | |
| 2005/0012492 A1* | 1/2005 | Mihalka | H02J 1/102 323/272 |
| 2006/0050694 A1* | 3/2006 | Bury | H04L 47/10 370/389 |
| 2006/0152236 A1 | 7/2006 | Kim | |
| 2006/0236008 A1 | 10/2006 | Asano et al. | |
| 2009/0248932 A1 | 10/2009 | Taylor et al. | |
| 2011/0035632 A1 | 2/2011 | Hong et al. | |
| 2011/0113171 A1 | 5/2011 | Radhakrishnan et al. | |
| 2012/0027104 A1 | 2/2012 | Bas et al. | |
| 2012/0030753 A1 | 2/2012 | Bas et al. | |
| 2012/0226965 A1 | 9/2012 | Hammerschmidt et al. | |
| 2013/0054850 A1* | 2/2013 | Co | H04L 12/4633 710/105 |
| 2013/0124763 A1 | 5/2013 | Kessler | |
| 2013/0132624 A1 | 5/2013 | Chen et al. | |
| 2013/0197920 A1 | 8/2013 | Lesso et al. | |
| 2013/0265884 A1 | 10/2013 | Brombal et al. | |
| 2013/0301689 A1 | 11/2013 | Marchand et al. | |
| 2014/0025999 A1 | 1/2014 | Kessler | |
| 2014/0376278 A1 | 12/2014 | Fornage et al. | |
| 2015/0056941 A1 | 2/2015 | Lin et al. | |
| 2015/0074306 A1 | 3/2015 | Ayyagari et al. | |
| 2015/0106541 A1 | 4/2015 | Southcombe et al. | |
| 2015/0127862 A1 | 5/2015 | Fan et al. | |
| 2016/0050513 A1 | 2/2016 | Wang et al. | |
| 2016/0124892 A1 | 5/2016 | Amarilio et al. | |

OTHER PUBLICATIONS

Author Unknown, "DS1822: Econo 1-Wire Digital Thermometer," Maxim Integrated, 2007, 21 pages.
Author Unknown, "MAXIM 1-Wire® Tutorial," MAXIM, online audiovisual presentation, 17 slides, No Date, accessed Feb. 12, 2015, http://www.maximintegrated.com/products/1-wire/flash/overview/ (38 images of slides).
Awtry, Dan, et al., "Design Guide v1.0," Springbok Digitronics, Aug. 19, 2004, 96 pages.
Non-Final Office Action for U.S. Appl. No. 14/575,491, dated May 26, 2017, 20 pages.
Non-Final Office Action for U.S. Appl. No. 14/659,379, dated Apr. 7, 2017, 37 pages.
Non-Final Office Action for U.S. Appl. No. 14/575,491, dated Nov. 30, 2017, 18 pages.
Advisory Action for U.S. Appl. No. 14/659,379, dated Feb. 26, 2018, 3 pages.
Non-Final Office Action for U.S. Appl. No. 14/659,292, dated Sep. 29, 2017, 27 pages.
Non-Final Office Action for U.S. Appl. No. 14/659,328, dated Sep. 8, 2017, 51 pages.
Non-Final Office Action for U.S. Appl. No. 14/659,371, dated Sep. 25, 2017, 23 pages.
Final Office Action for U.S. Appl. No. 14/659,379, dated Oct. 18, 2017, 44 pages.
Final Office Action for U.S. Appl. No. 14/659,292, dated Apr. 30, 2018, 24 pages.
Final Office Action for U.S. Appl. No. 14/659,328, dated Mar. 20, 2018, 61 pages.
Final Office Action for U.S. Appl. No. 14/659,371, dated May 3, 2018, 21 pages.
Notice of Allowance for U.S. Appl. No. 14/659,379, dated Mar. 20, 2018, 10 pages.
Non-Final Office Action for U.S. Appl. No. 14/659,292, dated Dec. 21, 2018, 23 pages.
Final Office Action for U.S. Appl. No. 15/467,790, dated Nov. 5, 2018, 15 pages.
Non-Final Office Action for U.S. Appl. No. 15/443,236, dated Nov. 16, 2018, 19 pages.
Non-Final Office Action for U.S. Appl. No. 14/659,371, dated Feb. 26, 2019, 22 pages.
Non-Final Office Action for U.S. Appl. No. 15/365,295, dated Mar. 29, 2019, 15 pages.
Advisory Action for U.S. Appl. No. 15/467,790, dated Feb. 26, 2019, 3 pages.
U.S. Appl. No. 14/575,491, filed Dec. 18. 2014.
U.S. Appl. No. 14/659,292, filed Mar. 16, 2015.
U.S. Appl. No. 14/659,328, filed Mar. 16, 2015.
U.S. Appl. No. 14/659,371, filed Mar. 16, 2015.
U.S. Appl. No. 14/659,379, filed Mar. 16, 2015.
Advisory Action for U.S. Appl. No. 14/659,292, dated Aug. 10, 2018, 3 pages.
Notice of Allowance for U.S. Appl. No. 14/659,328, dated Jul. 2, 2018, 8 pages.
Advisory Action for U.S. Appl. No. 14/659,371, dated Aug. 1, 2018, 3 pages.
Non-Final Office Action for U.S. Appl. No. 15/467,790, dated Jun. 28, 2018, 14 pages.
Ex Parte Quayle Action for U.S. Appl. No. 15/365,315, mailed Jul. 26, 2018, 7 pages.
Notice of Allowance for U.S. Appl. No. 15/472,756, dated Aug. 8, 2018, 8 pages.
Notice of Allowance and Examiner-Initiated Interview Summary for U.S. Appl. No. 15/365,315, dated Sep. 14, 2018, 9 pages.
Notice of Allowance for U.S. Appl. No. 15/886,209, dated Sep. 11, 2019, 7 pages.
Final Office Action for U.S. Appl. No. 15/365,295, dated Aug. 15, 2019, 11 pages.
Notice of Allowance for U.S. Appl. No. 15/443,236, dated Sep. 24, 2019, 8 pages.
Corrected Notice of Allowance for U.S. Appl. No. 15/467,790, dated Aug. 15, 2019, 6 pages.

(56) References Cited

OTHER PUBLICATIONS

Corrected Notice of Allowance for U.S. Appl. No. 15/467,790, dated Aug. 28, 2019, 6 pages.
Final Office Action for U.S. Appl. No. 14/659,292, dated Jun. 4, 2019, 24 pages.
Non-Final Office Action for U.S. Appl. No. 15/886,209, dated May 17, 2019, 7 pages.
Notice of Allowance for U.S. Appl. No. 15/467,790, dated May 20, 2019, 8 pages.
Final Office Action for U.S. Appl. No. 15/443,236, dated May 30, 2019, 20 pages.

* cited by examiner

WRITE TECHNIQUE FOR A BUS INTERFACE SYSTEM

RELATED APPLICATIONS

This application claims the benefit of provisional patent application Ser. No. 61/953,251, filed Mar. 14, 2014, the disclosure of which is hereby incorporated herein by reference in its entirety. This application is a continuation-in-part of U.S. patent application Ser. No. 14/575,491, filed Dec. 18, 2014, now U.S. Pat. No. 10,185,683, which claims priority to provisional patent application Ser. No. 61/917,610, filed Dec. 18, 2013.

The present application is related to concurrently filed U.S. patent application Ser. No. 14/659,292, entitled "START OF SEQUENCE DETECTION FOR ONE WIRE BUS;" concurrently filed U.S. patent application Ser. No. 14/659,328, entitled "READ TECHNIQUE FOR A BUS INTERFACE SYSTEM," now U.S. Pat. No. 10,282,269, concurrently filed U.S. patent application Ser. No. 14/659,371, entitled "POWER MANAGEMENT SYSTEM FOR A BUS INTERFACE SYSTEM;" and concurrently filed U.S. patent application Ser. No. 14/659,379, now U.S. Pat. No. 10,049,026, entitled "GROUP WRITE TECHNIQUE FOR A BUS INTERFACE SYSTEM."

All of the applications listed above are hereby incorporated herein by reference in their entireties.

FIELD OF THE DISCLOSURE

This disclosure relates generally to digital bus interfaces.

BACKGROUND

Digital bus interfaces are used to communicate data between components within an electronic device, such as a computer, a radio frequency (RF) front-end module, a cellular telephone, a tablet, a camera, and/or the like. The digital bus interface generally includes at least one master bus controller and one or more slave bus controllers. The master bus controller(s) and the slave bus controller(s) are connected by bus lines and the master bus controller coordinates the transfer of data along the bus lines. The slave bus controllers perform commands (e.g., read and write commands) as coordinated by the master bus controller. If more than one master bus controller is provided, a bus arbitration scheme is generally implemented to negotiate between the various master bus controllers. The bus lines that connect the master bus controller(s) to the slave bus controllers typically include one or more data, power, and clock bus lines. Generally, the size of the digital bus interface increases as more bus lines are provided in the digital bus interface. The increase is due to the number of wires which must be routed between the bus controllers and the number of pins for the bus controllers that must be dedicated to the bus lines. In modern communication systems, the area available for pins and wires is minimal.

Therefore, digital bus interface designs that utilize fewer bus lines are needed.

SUMMARY

Embodiments of a bus interface system are disclosed along with methods of operating the same. In one embodiment, the bus interface system includes a bus line, a master bus controller coupled to the bus line, and a slave bus controller coupled to the bus line. The master bus controller is configured to generate a first set of data pulses along the bus line representing a payload segment. The slave bus controller is configured to decode the first set of data pulses representing the payload segment into a decoded payload segment. The slave bus controller is then configured to perform a first error check on the decoded payload segment. Furthermore, the slave bus controller is configured to generate an acknowledgment signal along the bus line so that the acknowledgement signal indicates that the decoded payload segment passed the first error check. In this manner, the master bus controller can determine that the slave bus controller received an accurate copy of the payload segment.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
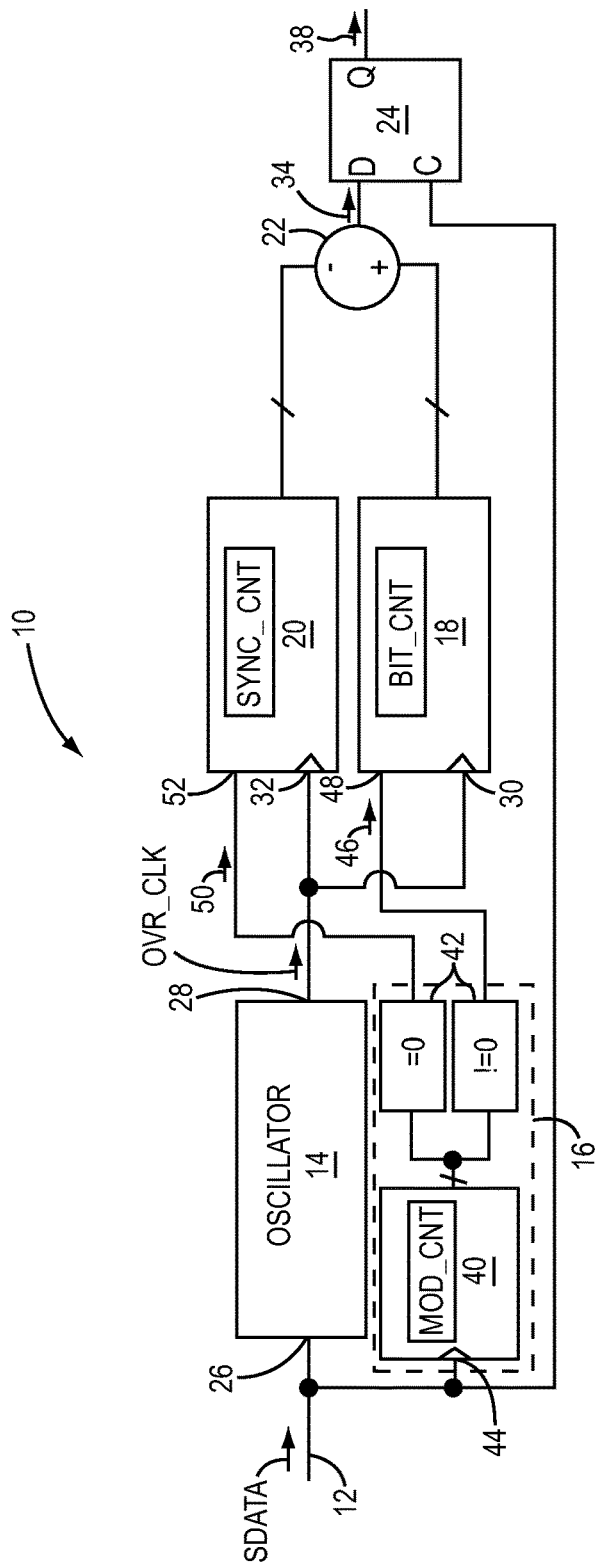
FIG. 1 illustrates one embodiment of a decoder, which may be provided in a bus controller of a bus interface system.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

With regard to the term "terminal," a terminal refers to any conductive feature in an electronic component for receiving signals, transmitting signals, and/or establishing a connection to another electronic component. For instance, a terminal may be one or more nodes, ports, conductive pads, pins, solder bumps, leads, pins, and/or the like.

When relative terminology, such as "approximately," "substantially," and the like are used in this disclosure, the relative terminology should be interpreted sensu lato but also in accordance to error tolerances dictated by performance parameters for a particular apparatus or method. These performance parameters may be described explicitly and/or implicitly by technical standard(s) relevant to an application that uses the particular apparatus or method to implement certain designed functions.

This disclosure relates generally to bus interface systems, components for bus interface systems, and related methods of operating the same. Embodiments of a bus interface system may be a digital bus interface system and may include various bus controllers connected by a bus line. For example, a bus interface system may include a master bus controller and a slave bus controller coupled by a bus line. Some embodiments of the bus interface system may be one wire bus interface systems where power, synchronization, payload information, and address information are all delivered to the slave bus controller on the bus line such that no other bus lines are provided between the master bus controller and the slave bus controller. More specifically, the master bus controller may be configured to generate an input data signal and transmit the input data signal on the bus line to the slave bus controller. The slave bus controller may include a decoder that extracts address information and payload information from the input data signal. As explained in further detail below, a bus protocol utilizing pulse width modulation (PWM) may be utilized where the decoder is clocked by the input data signal itself so that a separate clock signal does not have to be provided to the slave bus controller. Some embodiments of the slave bus controller may also include power conversion circuitry configured to convert the input data signal into a supply voltage. Accordingly, the slave bus controller may also be powered by the input data signal itself. In this manner, no other bus line has to be provided in the bus interface system in order to couple the master bus controller to the slave bus controller.

FIG. 1 illustrates one embodiment of a decoder 10, which may be provided in a bus controller of a bus interface system, such as a digital interface bus system. The decoder 10 is configured to receive an input data signal SDATA. The input data signal SDATA may be provided along a bus line 12 to the bus controller. The input data signal SDATA may define data pulses in order to represent data being transmitted along the bus line 12. For example, the input data signal SDATA may define data pulses such that logical values (e.g. bit values, logical symbols) are represented in accordance with a PWM bus protocol by the data pulses. More specifically, different logical values may be represented by a temporal duration of a data pulse during a time slot. As explained in further detail below, the PWM bus protocol also allows for the decoder 10 to be clocked by the input data signal SDATA itself, and thus an additional bus line does not have to be provided for a system clock signal in order to synchronize the decoder 10.

With regard to the input data signal SDATA, the data pulses defined by the input data signal SDATA are provided during time slots. More specifically, each of the data pulses may be provided during a different one of the time slots. The PWM bus protocol may organize the data pulses into data frames, where the data frame includes a certain number of the data pulses provided during a certain number of time slots. A temporal length of the time slots and thus of the data frame may be defined by the PWM bus protocol. For example, the PWM bus protocol may also allow for a bus address and a payload to be provided during certain time slots of the data frame. Also, an initial time slot of the data frame may be utilized to calibrate the decoder 10 as explained in further detail below. Accordingly, both the bus address and the payload can be provided by the input data signal SDATA so that additional address or data bus lines do not have to be provided. Furthermore, since the input data signal SDATA can also be used to calibrate the decoder 10, additional clock lines also do not have to be provided to synchronize the decoder 10. In this manner, a bus controller with the decoder 10, such as a slave bus controller, can extract both a bus address and a payload without requiring additional bus lines.

As shown in FIG. 1, the decoder includes an oscillator 14, counter enabling circuitry 16, a first counter 18, a second counter 20, a comparison circuit 22 and a sequential state element 24. The oscillator 14 is operable to receive the input data signal SDATA from the bus line 12. As mentioned above, each of the data pulses may be provided during a different one of the time slots. In other words, the data pulses provided by the input data signal SDATA may correspond injectively with the time slots.

In this embodiment, the oscillator 14 includes an enabling terminal 26 and is coupled to the bus line 12 so that the input data signal SDATA is received at the enabling terminal 26. In this manner, the oscillator 14 is configured to be enabled by the data pulses of the input data signal SDATA. In other words, the oscillator 14 is triggered by an activating edge of each of the data pulses of the input data signal SDATA. The oscillator 14 is configured to generate oscillation pulses while enabled. The oscillator 14 shown in FIG. 1 is operable to provide an oscillation signal OVR_CLK from an output terminal 28 of the oscillator 14. While enabled, the oscillator 14 is configured to provide the oscillation signal OVR_CLK so that the oscillation signal OVR_CLK defines the oscillation pulses. The oscillator 14 is then deactivated in response to an end of the data pulse. More specifically, the oscillator 14 is deactivated and does not generate oscillation pulses in response to a deactivation edge of each of the data pulses of the input data signal SDATA. While deactivated, the oscillation signal OVR_CLK does not provide the oscillation pulses and thus does not provide the oscillation signal OVR_CLK. The oscillation signal OVR_CLK is held in a deactivation state while the oscillator 14 is not enabled and deactivated. Since the oscillator 14 is enabled by the data pulses of the input data signal SDATA and deactivated when the data pulses of the input data signal SDATA are not provided, the decoder 10 is more power efficient. For instance, little to no current may be drawn by the oscillator 14 when deactivated as a result of the input data signal SDATA being between the data pulses. When the oscillator 14 is deactivated, the oscillator 14 does not generate the oscillation pulses, and thus little to no power may be consumed by the oscillator 14 while deactivated.

In accordance with the PWM bus protocol, a pulse rate of the oscillation signal OVR_CLK is significantly greater than a pulse rate of the data pulses of the input data signal SDATA. For example, the oscillator 14 is configured to generate the oscillation pulses when enabled at a pulse rate that is at least three times greater than a pulse rate of the data pulses. Thus, for a particular data pulse provided during a particular time slot, a temporal duration (i.e., a pulse width) of the particular data pulse in the input data signal SDATA can be determined by the number of oscillation pulses provided in the oscillation signal OVR_CLK during the particular time slot. The PWM bus protocol assigns different temporal durations (i.e., different pulse widths) to different logical values. In this manner, the decoder 10 can count the number of oscillation pulses provided in the oscillation signal OVR_CLK during the particular time slot and thereby determine the logical value being represented by the particular data pulse during that particular time slot, as explained in further detail below. Note that how much greater the pulse rate of the oscillation signal OVR_CLK is with respect to the pulse rate of the input data signal SDATA may depend on various factors such as a cardinality of the set of logical values that can be represented by each of the data pulses and an acceptable error rate in discriminating between the different logical values. For example, it is easier to discriminate what logical value a data pulse represents if a set of logical values that can be represented by the data pulse only includes a bit value of "1" and a bit value "0." Thus, the pulse rate of the oscillation signal OVR_CLK can be lower if desired in this case. It is more difficult to discriminate what logical value a particular data pulse represents if the set of logical values includes logical symbols, such as "0," "1," "2." However, the greater the cardinality of the set of logical values that can be represented by the data pulse, the greater the informational efficiency of the PWM bus protocol.

As shown in FIG. 1, both the first counter 18 and the second counter 20 are configured to receive the oscillation signal OVR_CLK from the oscillator 14. More specifically, the first counter 18 includes an input terminal 30 coupled to the output terminal 28 of the oscillator 14 so that the first counter 18 receives the oscillation signal OVR_CLK at the input terminal 30. The second counter 20 includes an input terminal 32 coupled to the output terminal 28 of the oscillator 14 so that the second counter 20 receives the oscillation signal OVR_CLK at the input terminal 32. The first counter 18 and the second counter 20 are each enabled and disabled by the counter enabling circuitry 16.

The first counter 18 is operable to store a first count parameter BIT_CNT. While the first counter 18 is enabled by the counter enabling circuitry 16, the first counter 18 is configured to increment the first count parameter BIT_CNT in response to each of the oscillation pulses provided by the oscillation signal OVR_CLK. When the first counter 18 is disabled by the counter enabling circuitry, the first counter 18 holds the first count parameter BIT_CNT at its current value. The second counter 20 is operable to store the reference parameter SYNC_CNT. While the second counter 20 is enabled by the counter enabling circuitry 16, the second counter 20 is configured to increment the reference parameter SYNC_CNT in response to each of the oscillation pulses provided by the oscillation signal OVR_CLK. When the second counter 20 is disabled by the counter enabling circuitry 16, the second counter 20 holds the reference parameter SYNC_CNT at its current value.

The input data signal SDATA may be formatted in accordance with the PWM bus protocol so that the data pulses defined by the input data signal SDATA during the time slots are organized into data frames. For each data frame, an initial time slot may be a calibration time slot. The data pulse provided during the calibration time slot is a calibration pulse, which may be provided by a bus controller (e.g., a master bus controller as explained in further detail below) with a precise pulse duration. For example, a duty cycle of the calibration pulse may be approximately 50% with respect to the calibration time slot and thus be provided during half of the calibration time slot. The oscillator 14 is configured to be enabled by the calibration data pulse. As explained in further detail below, the counter enabling circuitry 16 is configured to disable the first counter 18 and enable the second counter 20 during the calibration time slot of the data frame. Also, the second counter 20 may have reset the reference parameter SYNC_CNT to an initial value (e.g., such as zero) prior to an activation edge of the calibration pulse. Thus, during the calibration time slot of each of the data frames, the second counter 20 is configured to count the oscillation pulses defined by the oscillation signal OVR_CLK. In this manner, the reference parameter SYNC_CNT indicates a reference number, and the reference number is based on how many of the oscillation pulses were generated by the oscillator 14 during the calibration time slot as a result of the calibration pulse. In this example, the reference number is equal to how many of the oscillation pulses were generated by the oscillator 14 during the calibration time slot. This reference number is used to determine logical values of a remainder of the data pulses provided in the data frame. By making the decoder 10 responsive to the calibration pulse as described above, the decoder 10 can be synchronized and calibrated by the input data signal SDATA itself without having to receive an external clock signal on another bus line. It should be noted that in other embodiments, the calibration time slot may be greater than the other time slots in the data frame. Thus, in these cases, the reference number may be equal to some fraction of the number of oscillation pulses that were generated by the oscillator during the calibration time slot. In this case, the second counter 20 may be configured to be incremented after a certain number of the oscillation pulses or may include division circuitry that divides the reference parameter SYNC_CNT by the appropriate integer after the calibration pulse so that the reference parameter SYNC_CNT is stored after the calibration time pulse to equal the appropriate fraction of the number of oscillation pulses that were generated by the oscillator during the calibration time slot.

In accordance with the PWM bus protocol, the remainder of the data pulses provided in the other time slots of the data frame may represent a bus address, a payload, and/or the like. To recover the logical value represented by a data pulse during a time slot, the first counter 18 is configured to count the oscillation pulses such that the first count parameter BIT_CNT indicates a number of the oscillation pulses generated during the time slot. More specifically, after the calibration time slot, the counter enabling circuitry 16 is configured to disable the second counter 20 and enable the first counter 18 in response to the data pulse defined by the input data signal SDATA during the time slot. Thus, for the remainder of the time slots in the data frame, the second counter 20 holds the reference parameter SYNC_CNT indicating the reference number, which is how many of the oscillation pulses were generated by the oscillator during the calibration time slot as a result of the calibration pulse.

The first counter 18 is configured to reset the first count parameter BIT_CNT to an initial value (e.g., zero) in response to the activation edge of the data pulse. In response to the data pulse defined by the input data signal SDATA during the time slot, the oscillator 14 is configured to be enabled by the data pulse of the input data signal SDATA and generate oscillation pulses while enabled. The first counter 18 (which has been enabled by the counter enabling circuitry 16) is configured to increment the first count parameter BIT_CNT in response to the oscillation pulses from the oscillator 14. Thus, for each of the data pulses provided after the calibration time slot, the first counter 18 is configured to count the oscillation pulses defined by the oscillation signal OVR_CLK such that the first count parameter BIT_CNT indicates a number of the oscillation pulses generated during the time slot. The oscillation pulses defined by the oscillation signal OVR_CLK were generated as a result of the data pulse of the input data signal SDATA. In this manner, the first count parameter BIT_CNT indicates how many of the oscillation pulses were generated during the time slot during the data pulse of the input data signal SDATA.

To determine the logical value of the data pulse from the first count parameter BIT_CNT, the comparison circuit 22 is configured to compare the first count parameter BIT_CNT with the reference parameter SYNC_CNT. As explained above, the reference parameter SYNC_CNT indicates the reference number, which is a count of the oscillation pulses that were generated by the oscillator 14 during the calibration time slot as a result of the calibration pulse at the beginning of the data frame. The PWM bus protocol may define a set of logical values that may be represented by each of the data pulses provided during the time slots of the data frame after the calibration time slot. The comparison circuit 22 is configured to generate a data output 34 such that the data output 34 represents a first logical value in response to the first count parameter BIT_CNT being greater than the reference parameter SYNC_CNT and such that the data output 34 represents a second logical value in response to the first count parameter BIT_CNT being less than the reference parameter SYNC_CNT.

For a bit scheme, the set of logical values may be the set of bit values [0, 1]. In the embodiment shown in FIG. 1, the comparison circuit 22 is configured to the data output 34 as a data output signal such that the data output signal represents an output bit. The output bit is a first bit value (e.g., bit value of 1 in the set of bit values [0, 1]) if the first count parameter BIT_CNT is greater than the reference parameter SYNC_CNT. For example, in this case, the data pulse defined during the time slot by the data pulse of the input data signal SDATA had a temporal duration that was longer than a temporal duration of the calibration pulse defined by the data pulse of the input data signal SDATA during the calibration time slot. As a result, the number of oscillation pulses provided by the oscillation signal OVR_CLK during this time slot is greater than the number of oscillation pulses provided during the calibration time slot. Thus, the comparison circuit 22 will determine that the first count parameter BIT_CNT is greater than the reference parameter SYNC_CNT and generate the data output 34 such that the data output 34 represents the first bit value (e.g., the bit value 1).

The output bit is a second bit value (e.g., bit value of 0 in the set of bit values [0, 1]) if the first count parameter BIT_CNT is less than the reference parameter SYNC_CNT. In this case, the data pulse defined during the time slot by the data pulse of the input data signal SDATA had a temporal duration that was shorter than a temporal duration of the calibration pulse defined by the data pulse of the input data signal SDATA during the calibration time slot. As a result, the number of oscillation pulses provided by the oscillation signal OVR_CLK during this time slot is less than the number of oscillation pulses provided during the calibration time slot. Thus, the comparison circuit 22 will determine that the first count parameter BIT_CNT is less than the reference parameter SYNC_CNT and generate the data output 34 such that the data output 34 represents the second bit value (e.g., the bit value 0).

The sequential state element 24 is configured to receive the data output 34 and store the output bit represented by the data output 34, which in this example is provided by a data output signal. In this example, the sequential state element 24 is a flip-flop that has a data input terminal D, a clock terminal C, and a data output terminal Q. The data output 34 (e.g., the data output signal) is received by the sequential state element 24 at the data input terminal D. The input data signal SDATA is received at the clock terminal C and thus is used to clock the sequential state element 24. A memory input signal 38 is generated at the data output terminal Q so that the bit value stored by the sequential state element 24 is provided to memory outside of the decoder 10. As explained below, in other embodiments, the set of logical values that can be represented by the data pulses may be logical symbols. In this case, the data output 34 may have multiple data output signals in order to represent multiple bits. Thus, additional sequential state elements (not explicitly shown) may be provided to store the various bits.

As shown in FIG. 1, the comparison circuit 22 is provided as a subtractor that is configured to compare the first count parameter BIT_CNT with the reference parameter SYNC_CNT by subtracting the first count parameter BIT_CNT and the reference parameter SYNC_CNT. In this embodiment, the comparison circuit 22 is configured to subtract the first count parameter BIT_CNT from the reference parameter SYNC_CNT to determine a difference between the first count parameter BIT_CNT and the reference parameter SYNC_CNT. If the difference is positive, the comparison circuit 22 circuit generates the data output 34 to represent the first bit value (e.g., the bit value 1). If the difference is negative, the comparison circuit 22 circuit generates the data output 34 to represent the second bit value (e.g., the bit value 0).

As mentioned above, the counter enabling circuitry 16 is configured to enable the second counter 20 and disable the first counter 18 during a calibration time slot of the data frame and enable the first counter 18 and disable the second counter 20 during time slots of the data frame after the calibration time slot. To do this, the counter enabling circuitry 16 shown in FIG. 1 includes a modulo counter 40 and a logical network 42. The modulo counter 40 is operable to store a modulo counter parameter MOD_CNT and receive the input data signal SDATA at an input terminal 44. The modulo counter 40 is configured to increment the modulo counter parameter MOD_CNT in response to each of the data pulses defined by input data signal SDATA, including the calibration pulse and the other data pulses defined during the time slots of a data frame.

Since the modulo counter 40 is modulo, the modulo counter parameter MOD_CNT wraps around to cycle through an initial value to a final value and back to the initial value to cycle through the values again. The cycle can be set in accordance with the number of time slots provided in each data frame. For example, if the number of time slots in each data frame is an integer N and the initial value is zero (0), then the modulo counter 40 can be configured to cycle the modulo counter parameter MOD_CNT between the initial value of zero (0) and the final value of N−1. Accordingly, the initial value (e.g., zero (0)) can be used to indicate the initial time slot of a data frame, which in this embodiment is the calibration time slot that has the calibration pulse. Any other one of the values in the cycle is for time slots after the calibration time slot. The final value of N−1 indicates that the last time slot in the data frame has been reached. If the modulo counter parameter MOD_CNT is incremented again after reaching the final value of N−1, the modulo counter parameter MOD_CNT wraps back around to the initial value of zero (0) and thereby indicates the calibration time slot for the next data frame. The initial value of zero (0) is thus a calibration number that indicates the calibration time slot of the data frame. In this manner, the counter enabling circuitry 16 allows the decoder 10 to be synchronized with the various data frames provided with the input data signal SDATA.

The logical network 42 is configured to disable the first counter 18 and enable the second counter 20 such that the second counter 20 counts the oscillation pulses if the modulo counter parameter MOD_CNT is equal to a calibration number (e.g. zero (0)). In this example, the logical network 42 is configured to generate an enabling signal 46 received at an enabling terminal 48 of the first counter 18 and generate an enabling signal 50 received at an enabling terminal 52 of the second counter 20. The logical network 42 generates the enabling signal 46 in a deactivation state, and the enabling signal 50 in an activation state if the modulo counter parameter MOD_CNT is equal to a calibration number (e.g. zero (0)). As such, the first counter 18 is disabled and the second counter is enabled during the calibration time slot. However, the logical network 42 is configured to enable the first counter 18 and disable the second counter 20 such that the first counter 18 counts the oscillation pulses if the modulo counter parameter MOD_CNT is not equal to the calibration number. Thus, the logical network 42 shown in FIG. 1 generates the enabling signal 46 in the activation state and the enabling signal 50 in the deactivation state when the modulo counter parameter MOD_CNT is equal to any value from 1 to N−1. As such, the first counter 18 is enabled and the second counter is disabled during the time slots that are provided after the calibration time slot.

Figure 2:
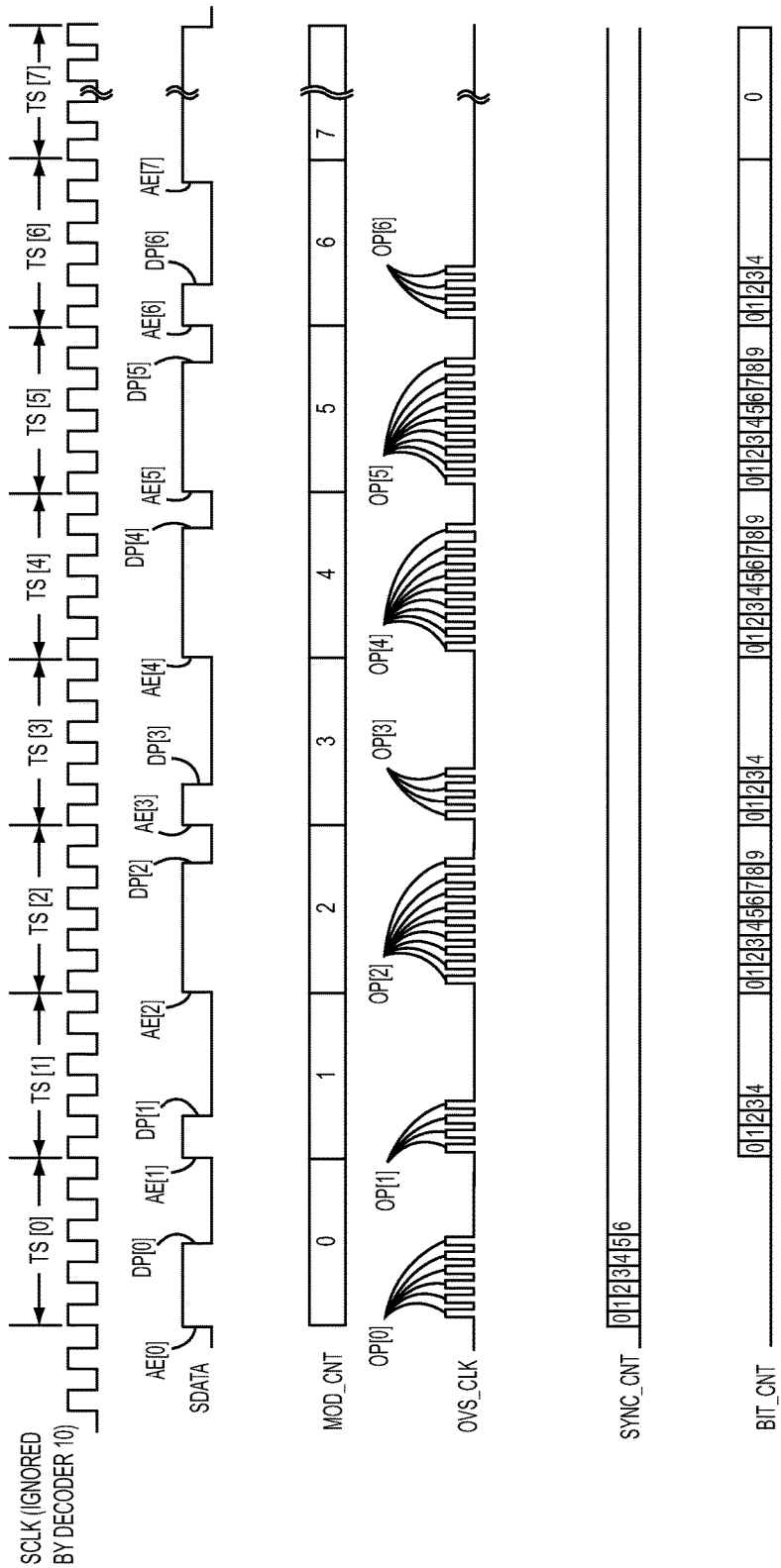
FIG. 2 illustrates a timing diagram for the decoder shown in FIG. 1 during an exemplary data frame provided in accordance to a one wire PWM bus protocol.

Referring now to FIG. 1 and FIG. 2, FIG. 2 illustrates a timing diagram for the decoder 10 shown in FIG. 1 during an exemplary data frame provided in accordance to a one wire PWM bus protocol. As shown in FIG. 2, the data frame in this example has eight time slots (referred to generally and generically as elements TS and specifically as elements TS[0]-TS[7]). The timing diagram shown in FIG. 2 illustrates signal levels and parameter values for embodiments of a system clock signal SCLK, the input data signal SDATA, the modulo counter parameter MOD_CNT, the oscillator signal OVS_CLK, the reference parameter SYNC_CNT, and the first counter parameter BIT_CNT as a function of time during the time slots of the data frame. The system clock signal SCLK is ignored by the decoder 10 and is not provided at all to the decoder 10 shown in FIG. 1. However, the system clock signal SCLK may be utilized by outside circuitry (such as a master bus controller) to generate the input data signal SDATA, as explained in further detail below. The system clock signal SCLK is being shown here to help clarify the timing diagram with respect to system timing despite the decoder 10 not utilizing the system clock signal SCLK. As shown in FIG. 2, a time duration of each of the time slots TS is approximately equal to four clock cycles.

The input data signal SDATA provided to the decoder 10 defines data pulses (referred to generally or generically as elements DP and specifically as elements DP[0] to DP[6]) during each of the time slots TS[1]-TS[6]. More specifically, a data pulse DP[0] is defined by the input data signal SDATA during a time slot TS[0]. This is the initial time slot, which is a calibration time slot. Thus, the data pulse DP[0] is a calibration data pulse. A duty cycle of the data pulse DP[0] is 50%, and thus the data pulse DP[0] is provided for half the time slot TS[0] and has a temporal duration equal to two clock cycles of the system clock signal SCLK. The PWM bus protocol in this example uses one of the time slots to communicate a one-bit command. A data pulse DP[1] is defined by the input data signal SDATA during a time slot TS[1]. The time slot TS[1] is a command time slot and the data pulse DP[1] represents a command bit. A duty cycle of the data pulse DP[1] is 25%, and thus the data pulse DP[1] is provided for one quarter of the time slot TS[1] and has a temporal duration equal to one clock cycle of the system clock signal SCLK.

The PWM bus protocol in this example uses two of the time slots to communicate a two-bit bus address. A data pulse DP[2] is defined by the input data signal SDATA during a time slot TS[2]. The time slot TS[2] is a bus address time slot, and the data pulse DP[2] represents an address bit for a bus address. A duty cycle of the data pulse DP[2] is 75%, and thus the data pulse DP[2] is provided for 3 quarters of the time slot TS[2] and has a temporal duration equal to three clock cycles of the system clock signal SCLK. A data pulse DP[3] is defined by the input data signal SDATA during a time slot TS[3]. The time slot TS[3] is also an address time slot, and the data pulse DP[3] represents another address bit for the bus address. A duty cycle of the data pulse DP[3] is 25% and thus the data pulse DP[3] is provided for one quarter of the time slot TS[3] and has a temporal duration equal to one clock cycle of the system clock signal SCLK.

The PWM bus protocol in this example uses three of the time slots TS to communicate a three-bit payload. A data pulse DP[4] is defined by the input data signal SDATA during a time slot TS[4]. The time slot TS[4] is a payload time slot, and the data pulse DP[4] represents a first data bit for the three-bit data payload. A duty cycle of the data pulse DP[4] is 75%, and thus the data pulse DP[4] is provided for 3 quarters of the time slot TS[4] and has a temporal duration equal to three clock cycles of the system clock signal SCLK. A data pulse DP[5] is defined by the input data signal SDATA during a time slot TS[5]. The time slot TS[5] is another payload time slot, and the data pulse DP[5] represents a second data bit for the three-bit data payload. A duty cycle of the data pulse DP[5] is 75%, and thus the data pulse DP[5] is provided for 3 quarters of the time slot TS[5] and has a temporal duration equal to three clock cycles of the system clock signal SCLK. A data pulse DP[6] is defined by the input data signal SDATA during a time slot TS[6]. The time slot TS[6] is yet another payload time slot, and the data pulse DP[6] represents a third data bit for the three-bit data payload. A duty cycle of the data pulse DP[6] is 25%, and thus the data pulse DP[6] is provided for a quarter of the time slot TS[6] and has a temporal duration equal to one clock cycle of the system clock signal SCLK. A time slot TS[7] is a set up time slot for the next data frame. During the time slot TS[7], the input data signal SDATA is held high. The time slot TS[7] may extend for any period of time, and thus may be longer than the time slots TS[1]-TS[6].

As shown in FIG. 2, the modulo counter parameter MOD_CNT is provided to equal the calibration number of zero (0) during the time slot TS[0], which is the calibration time slot. The counter enabling circuitry 16 is thus configured to enable the second counter 20 and disable the first counter 18. The oscillator 14 is configured to be enabled by the data pulse DP[0], which is the calibration pulse provided during the calibration time slot (i.e., TS[0]). The reference parameter SYNC_CNT of the second counter 20 may have been reset to an initial value of zero (0) prior to an activation edge AE[0] of the data pulse DP[0]. The second counter 20 is configured to count the oscillation pulses OP[0] defined by the oscillation signal OVR_CLK during the time slot TS[0] as a result of the data pulse DP[0] (the calibration pulse). More specifically, the second counter 20 is configured to increment the reference parameter SYNC_CNT as a result of each of the oscillation pulses OP[0] defined by the oscillation signal OVR_CLK during the time slot TS[0]. In this example, the reference parameter SYNC_CNT is set equal to a reference number of six (6) as a result of the six oscillation pulses OP[0] generated as a result of the data pulse DP[0] during the time slot TS[0]. As a result of the end of the data pulse DP[0], no more of the oscillation pulses OP[0] are generated, and the oscillation signal OVS_CLK is held in a deactive state for a remainder of the time slot TS[0]. Accordingly, the reference parameter SYNC_CNT indicates the reference number of six (6), which is how many of the oscillation pulses OP[0] were generated by the oscillator 14 during the time slot TS[0] (i.e., the calibration time slot) as a result of the data pulse DP[0] (i.e., the calibration pulse).

The modulo counter parameter MOD_CNT is provided to equal the number of one (1) during the time slot TS[1], which is the command time slot. The counter enabling circuitry 16 is thus configured to enable the first counter 18 and disable the second counter 20. As such, the second counter 20 holds the reference parameter SYNC_CNT at the reference number of six (6). The oscillator 14 is configured to be enabled by the data pulse DP[1], which is the command time slot. The first counter 18 may be configured to reset the first count parameter BIT_CNT to an initial value of zero (0) in response to an activation edge AE[1] of the data pulse DP[1]. The first counter 18 is configured to count the oscillation pulses OP[1] defined by the oscillation signal OVR_CLK during the time slot TS[1] as a result of the data pulse DP[1] (the command pulse), which had a 25% duty cycle.

More specifically, the first counter 18 is configured to increment the first count parameter BIT_CNT as a result of each of the oscillation pulses OP[1] defined by the oscillation signal OVR_CLK during the time slot TS[1]. In this example, the first count parameter BIT_CNT is set equal to a number of four (4) as a result of the four oscillation pulses OP[1] generated as a result of the data pulse DP[1] during the time slot TS[1]. As a result of the end of the data pulse DP[1], no more of the oscillation pulses OP[1] are generated and the oscillation signal OVS_CLK is held in a deactive state for a remainder of the time slot TS[1]. Accordingly, the first count parameter BIT_CNT indicates a number of four (4), which is how many of the oscillation pulses OP[1] were generated by the oscillator 14 during the time slot TS[1] (i.e., the command time slot) as a result of the data pulse DP[1] (i.e., a command pulse). The comparison circuit 22 then subtracts the reference parameter SYNC_CNT from the first count parameter BIT_CNT. Since four (4) minus six (6) is negative, the comparison circuit 22 generates the data output 34 so that the data output 34 represents a bit value of 0. The command bit has thus been recovered in this case to equal the bit value of 0, which may indicate a write command. If the command bit had been a bit value of 1, this may have indicated a read command.

The modulo counter parameter MOD_CNT is provided to equal the number of two (2) during the time slot TS[2], which is a first address time slot. The counter enabling circuitry 16 is thus configured to enable the first counter 18 and disable the second counter 20. As such, the second counter 20 holds the reference parameter SYNC_CNT at the reference number of six (6). The oscillator 14 is configured to be enabled by the data pulse DP[2], which is a first address time slot. The first counter 18 may be configured to reset the first count parameter BIT_CNT to an initial value of zero (0) in response to an activation edge AE[2] of the data pulse DP[2]. The first counter 18 is configured to count the oscillation pulses OP[2] defined by the oscillation signal OVR_CLK during the time slot TS[2] as a result of the data pulse DP[2] (i.e., a first address pulse), which has a 75% duty cycle.

More specifically, the first counter 18 is configured to increment the first count parameter BIT_CNT as a result of each of the oscillation pulses OP[2] defined by the oscillation signal OVR_CLK during the time slot TS[2]. In this example, the first count parameter BIT_CNT is set equal to a number of nine (9) as a result of the nine oscillation pulses OP[2] generated as a result of the data pulse DP[2] during the time slot TS[2]. As a result of the end of the data pulse DP[2], no more of the oscillation pulses OP[2] are generated, and the oscillation signal OVS_CLK is held in a deactive state for a remainder of the time slot TS[2]. Accordingly, the first count parameter BIT_CNT indicates a number of nine (9), which is how many of the oscillation pulses OP[2] were generated by the oscillator 14 during the time slot TS[2] (i.e., the first address time slot) as a result of the data pulse DP[2] (i.e., the first address pulse). The comparison circuit 22 then subtracts the reference parameter SYNC_CNT from the first count parameter BIT_CNT. Since nine (9) minus six (6) is positive, the comparison circuit 22 generates the data output 34 so that the data output 34 represents a bit value of 1. The first address bit has thus been recovered in this case to equal a bit value of 1.

The modulo counter parameter MOD_CNT is provided to equal the number of three (3) during the time slot TS[3], which is a second address time slot. The counter enabling circuitry 16 is thus configured to enable the first counter 18 and disable the second counter 20. As such, the second counter 20 holds the reference parameter SYNC_CNT at the reference number of six (6). The oscillator 14 is configured to be enabled by the data pulse DP[3], which is a second address time slot. The first counter 18 may be configured to reset the first count parameter BIT_CNT to an initial value of zero (0) in response to an activation edge AE[3] of the data pulse DP[3]. The first counter 18 is configured to count the oscillation pulses OP[3] defined by the oscillation signal OVR_CLK during the time slot TS[3] as a result of the data pulse DP[3] (i.e., a second address pulse), which has a 25% duty cycle.

More specifically, the first counter 18 is configured to increment the first count parameter BIT_CNT as a result of each of the oscillation pulses OP[3] defined by the oscillation signal OVR_CLK during the time slot TS[3]. In this example, the first count parameter BIT_CNT is set equal to a number of four (4) as a result of the four oscillation pulses OP[3] generated as a result of the data pulse DP[3] during the time slot TS[3]. As a result of the end of the data pulse DP[3], no more of the oscillation pulses OP[3] are generated, and the oscillation signal OVS_CLK is held in a deactive state for a remainder of the time slot TS[3]. Accordingly, the first count parameter BIT_CNT indicates a number of four (4), which is how many of the oscillation pulses OP[3] were generated by the oscillator 14 during the time slot TS[3] (i.e., the second address time slot) as a result of the data pulse DP[3] (i.e., the second address pulse). The comparison circuit 22 then subtracts the reference parameter SYNC_CNT from the first count parameter BIT_CNT. Since four (4) minus six (6) is negative, the comparison circuit 22 generates the data output 34 so that the data output 34 represents a bit value of 0. The second address bit has thus been recovered in this case to equal a bit value of 0.

The modulo counter parameter MOD_CNT is provided to equal a number of four (4) during the time slot TS[4], which is a first payload time slot. The counter enabling circuitry 16 is thus configured to enable the first counter 18 and disable the second counter 20. As such, the second counter 20 holds the reference parameter SYNC_CNT at the reference number of six (6). The oscillator 14 is configured to be enabled by the data pulse DP[4], which is the first payload time slot. The first counter 18 may be configured to reset the first count parameter BIT_CNT to an initial value of zero (0) in response to an activation edge AE[4] of the data pulse DP[4]. The first counter 18 is configured to count the oscillation pulses OP[4] defined by the oscillation signal OVR_CLK during the time slot TS[4] as a result of the data pulse DP[4] (i.e., a first payload pulse), which has a 75% duty cycle.

More specifically, the first counter 18 is configured to increment the first count parameter BIT_CNT as a result of each of the oscillation pulses OP[4] defined by the oscillation signal OVR_CLK during the time slot TS[4]. In this example, the first count parameter BIT_CNT is set equal to a number of nine (9) as a result of the nine oscillation pulses OP[4] generated as a result of the data pulse DP[4] during the time slot TS[4]. As a result of the end of the data pulse DP[4], no more of the oscillation pulses OP[4] are generated, and the oscillation signal OVS_CLK is held in a deactive state for a remainder of the time slot TS[4]. Accordingly, the first count parameter BIT_CNT indicates a number of nine (9), which is how many of the oscillation pulses OP[4] were generated by the oscillator 14 during the time slot TS[4] (i.e., the first payload time slot) as a result of the data pulse DP[4] (i.e., the first payload pulse). The comparison circuit 22 then subtracts the reference parameter SYNC_CNT from the first count parameter BIT_CNT. Since nine (9) minus six (6) is positive, the comparison circuit 22 generates the data output 34 so that the data output 34 represents a bit value of 1. The first payload bit has thus been recovered in this case to equal a bit value of 1.

The modulo counter parameter MOD_CNT is provided to equal the number of five (5) during the time slot TS[5], which is a second payload time slot. The counter enabling circuitry 16 is thus configured to enable the first counter 18 and disable the second counter 20. As such, the second counter 20 holds the reference parameter SYNC_CNT at the reference number of six (6). The oscillator 14 is configured to be enabled by the data pulse DP[5], which is the second payload time slot. The first counter 18 may be configured to reset the first count parameter BIT_CNT to an initial value of zero (0) in response to an activation edge AE[5] of the data pulse DP[5]. The first counter 18 is configured to count the oscillation pulses OP[5] defined by the oscillation signal OVR_CLK during the time slot TS[5] as a result of the data pulse DP[5] (i.e., a second payload pulse), which has a 75% duty cycle.

More specifically, the first counter 18 is configured to increment the first count parameter BIT_CNT as a result of each of the oscillation pulses OP[5] defined by the oscillation signal OVR_CLK during the time slot TS[5]. In this example, the first count parameter BIT_CNT is set equal to a number of nine (9) as a result of the nine oscillation pulses OP[5] generated as a result of the data pulse DP[5] during the time slot TS[5]. As a result of the end of the data pulse DP[5], no more of the oscillation pulses OP[5] are generated, and the oscillation signal OVS_CLK is held in a deactive state for a remainder of the time slot TS[5]. Accordingly, the first count parameter BIT_CNT indicates a number of nine (9), which is how many of the oscillation pulses OP[5] were generated by the oscillator 14 during the time slot TS[5] (i.e., the second payload time slot) as a result of the data pulse DP[5] (i.e., the second payload pulse). The comparison circuit 22 then subtracts the reference parameter SYNC_CNT from the first count parameter BIT_CNT. Since nine (9) minus six (6) is positive, the comparison circuit 22 generates the data output 34 so that the data output 34 represents a bit value of 1. The second payload bit has thus been recovered in this case to equal a bit value of 1.

Also, the modulo counter parameter MOD_CNT is provided to equal a number of six (6) during the time slot TS[6], which is a third payload time slot. The counter enabling circuitry 16 is thus configured to enable the first counter 18 and disable the second counter 20. As such, the second counter 20 holds the reference parameter SYNC_CNT at the reference number of six (6). The oscillator 14 is configured to be enabled by the data pulse DP[6], which is the third payload time slot. The first counter 18 may be configured to reset the first count parameter BIT_CNT to an initial value of zero (0) in response to an activation edge AE[6] of the data pulse DP[6]. The first counter 18 is configured to count the oscillation pulses OP[6] defined by the oscillation signal OVR_CLK during the time slot TS[6] as a result of the data pulse DP[6] (i.e., a third payload pulse), which has a 25% duty cycle.

More specifically, the first counter 18 is configured to increment the first count parameter BIT_CNT as a result of each of the oscillation pulses OP[6] defined by the oscillation signal OVR_CLK during the time slot TS[6]. In this example, the first count parameter BIT_CNT is set equal to a number of four (4) as a result of the four oscillation pulses OP[6] generated as a result of the data pulse DP[6] during the time slot TS[6]. As a result of the end of the data pulse DP[6], no more of the oscillation pulses OP[6] are generated, and the oscillation signal OVS_CLK is held in a deactive state for a remainder of the time slot TS[6]. Accordingly, the first count parameter BIT_CNT indicates a number of four (4), which is how many of the oscillation pulses OP[6] were generated by the oscillator 14 during the time slot TS[6] (i.e., the third payload time slot) as a result of the data pulse DP[6] (i.e., the third payload pulse). The comparison circuit 22 then subtracts the reference parameter SYNC_CNT from the first count parameter BIT_CNT. Since four (4) minus six (6) is negative, the comparison circuit 22 generates the data output 34 so that the data output 34 represents a bit value of 0. The third payload bit has thus been recovered in this case to equal a bit value of 0. Note that in this embodiment, the data pulses DP and oscillation pulses (referred to generally or generically as elements OP) are positive pulses. Other embodiments of the decoder 10 may be provided to operate with the data pulses DP and/or the oscillation pulses OP being negative pulses. For example, in another embodiment, the data pulses DP are negative pulses, while the oscillation pulses OP are positive pulses.

Finally, the modulo counter parameter MOD_CNT is provided to equal the number of seven (7) during the time slot TS[7], which is the setup time slot. The time slot TS[7] does not include a data pulse. Rather, the input data signal SDATA is held in the activation state during the entire time slot TS[7]. The counter enabling circuitry 16 is configured to deactivate the oscillator 14 so that the oscillator does not generate the oscillation pulses OP when the modulo counter parameter MOD_CNT is equal to 7 during the time slot TS[7]. Thus, oscillation pulses OP are not generated during the time slot TS[7]. The first counter 18 may be configured to reset the first count parameter BIT_CNT to an initial value of zero (0) in response to an activation edge AE[7] of input data signal SDATA during the time slot TS[7]. Similarly, the second counter 20 may be configured to reset the reference parameter SYNC_CNT to an initial value of zero (0) in response to an activation edge AE[7] of input data signal SDATA during the time slot TS[7]. In this manner, the decoder 10 is set up for the next data frame. The time slot TS[7] could extend for any period of time until the next data frame is ready to be communicated.

In the example described above in FIG. 2, the time slot D[0] has the same temporal duration as the time slots D[1]-D[6]. However, in other embodiments, the time slot D[0] (i.e., the calibration time slot) may be greater than the temporal duration of the time slots D[1]-D[6]. For example, the time slot D[0] may be four times as long as the temporal duration of the time slots D[1]-D[6]. Thus, in this case, the reference number may be equal to a quarter of the number of oscillation pulses OP[0] that were generated by the oscillator 14 during the calibration time slot. The second counter 20 may be configured to divide the reference parameter SYNC_CNT by four to equal the reference number of a quarter of the number of the oscillation pulses OP[0] that were generated by the oscillator 14 during the time slot D[0] (i.e., the calibration time slot).

Figure 3:
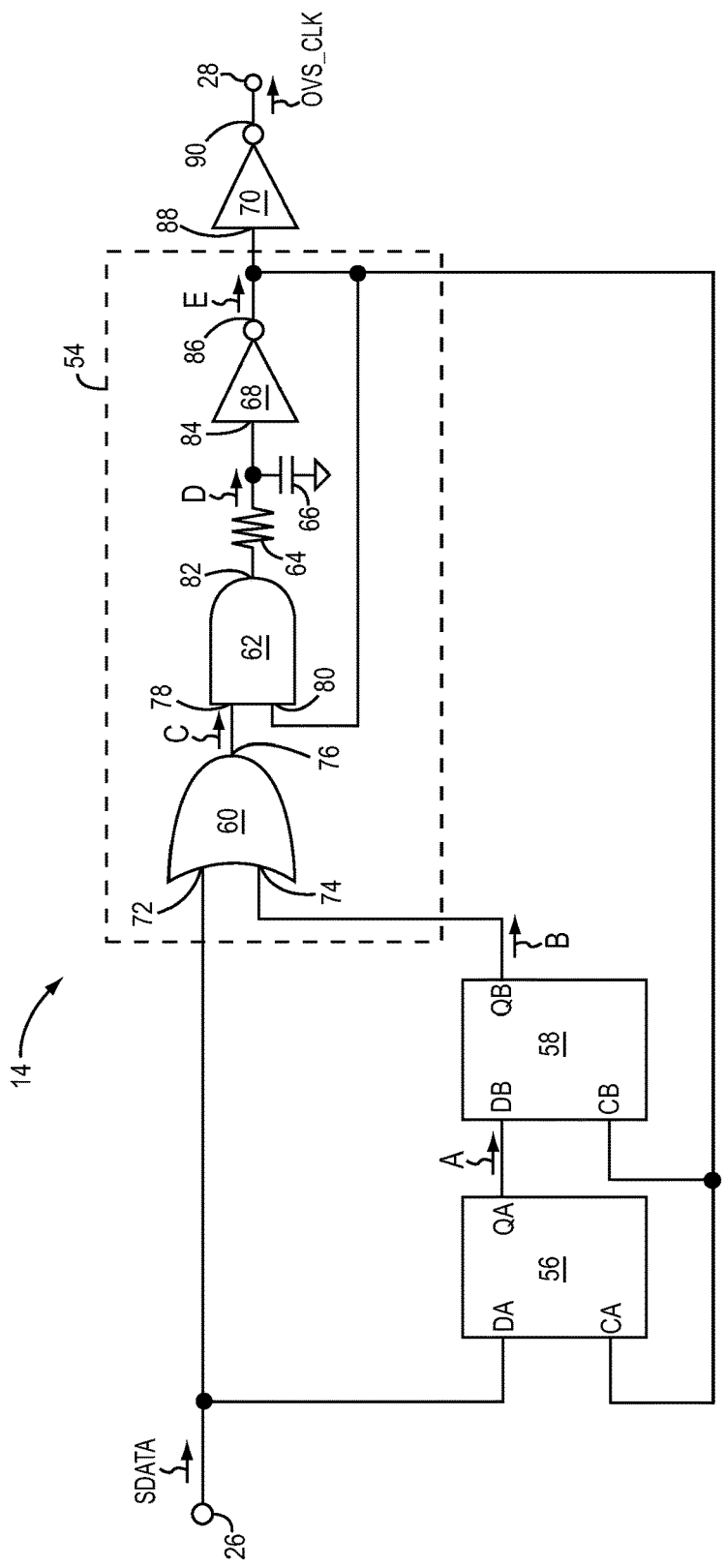
FIG. 3 illustrates one embodiment of an oscillator provided within the decoder shown in FIG. 1.

FIG. 3 illustrates one embodiment of the oscillator 14 provided within the decoder 10 shown in FIG. 1. The oscillator 14 includes a ring oscillator 54, a flip-flop 56, and a flip-flop 58. The ring oscillator 54 includes an OR gate 60, an AND gate 62, a resistor 64, a capacitor 66, and an inverter gate 68. An inverter gate 70 is connected to the inverter gate 68 of the ring oscillator 54. The input data signal SDATA is received at the enabling terminal 26. The oscillator 14 provides an asynchronous turn on and a synchronous turn off. An asynchronous turn on is acceptable because the normal state of this oscillator 14 is off. A synchronous turn off is used because data pulse edges on SDATA do not have a guaranteed phase.

The flip-flops 56, 58 are coupled sequentially with one another such that the flip-flops 56, 58 are configured to receive the input data signal SDATA and generate a delayed data signal B. More specifically, the flip-flop 56 includes a data terminal DA coupled to receive the data input signal SDATA, an output terminal QA, and a clock terminal CA. The flip-flop 58 includes a data terminal DB coupled to the output terminal QA, an output terminal QB, and a clock terminal CB. Flip-flop 56 generates a delayed data signal A from the data input signal SDATA, which is received by the flip-flop 58 at the data terminal DB. In response, the flip-flop 58 generates the delayed data signal B from the output terminal QB. In other embodiments, more flip-flops are provided in sequence with the flip-flops 56, 58 to provide an appropriate delay. The clock terminals CA, CB of the flip-flops 56, 58 are coupled to the ring oscillator 54 such that each of the flip-flops 56, 58 is clocked by the ring oscillator 54.

The OR gate 60 has an input terminal 72 coupled to receive the input data signal SDATA, an input terminal 74 coupled to the output terminal QB of the flip-flop 58, and an output terminal 76. The flip-flops 56, 58 are thus coupled to provide the delayed data signal B to the input terminal 74 of the OR gate 60. The OR gate 60 performs an OR operation on the input data signal SDATA and the delayed data signal B to generate an oscillator enable signal C at the output terminal 76.

The AND gate 62 has an input terminal 78 coupled to the output terminal 76 so as to receive the oscillator enable signal C, an input terminal 80 coupled to the ring oscillator 54, and an output terminal 82. The AND gate 62 thus gates the ring oscillator 54 and provides a feedback oscillator signal D from the output terminal 82. The resistor 64 and the capacitor 66 are used to provide a time constant for the ring oscillator 54. The feedback oscillator signal D is generated in accordance with the time constant set by the resistor 64 and capacitor 66 respectively. The inverter gate 68 has an input terminal 84 that receives the feedback oscillator signal D. The inverter gate 68 is an initial stage of the ring oscillator 54. The inverter gate 68 is configured to invert the feedback oscillator signal D and generate an intermediate oscillator signal E from an output terminal 86. The intermediate oscillator signal E is fed back to the input terminal 80 of the AND gate 62 and is provided to the clock terminals CA, CB to clock the flip-flops 56, 58. The AND gate 62 thus perform an AND operation on the intermediate oscillator signal E and the oscillator enable signal C to generate the feedback oscillator signal D. The intermediate oscillator signal E is provided to an input terminal 88 of the inverter gate 70. The inverter gate 70 is a buffer of the ring oscillator 54. The inverter gate 70 is configured to generate the oscillator signal OVS_CLK from an output terminal 90 of the inverter gate 70. The oscillator signal OVS_CLK is then output from the output terminal 28.

Figure 4:
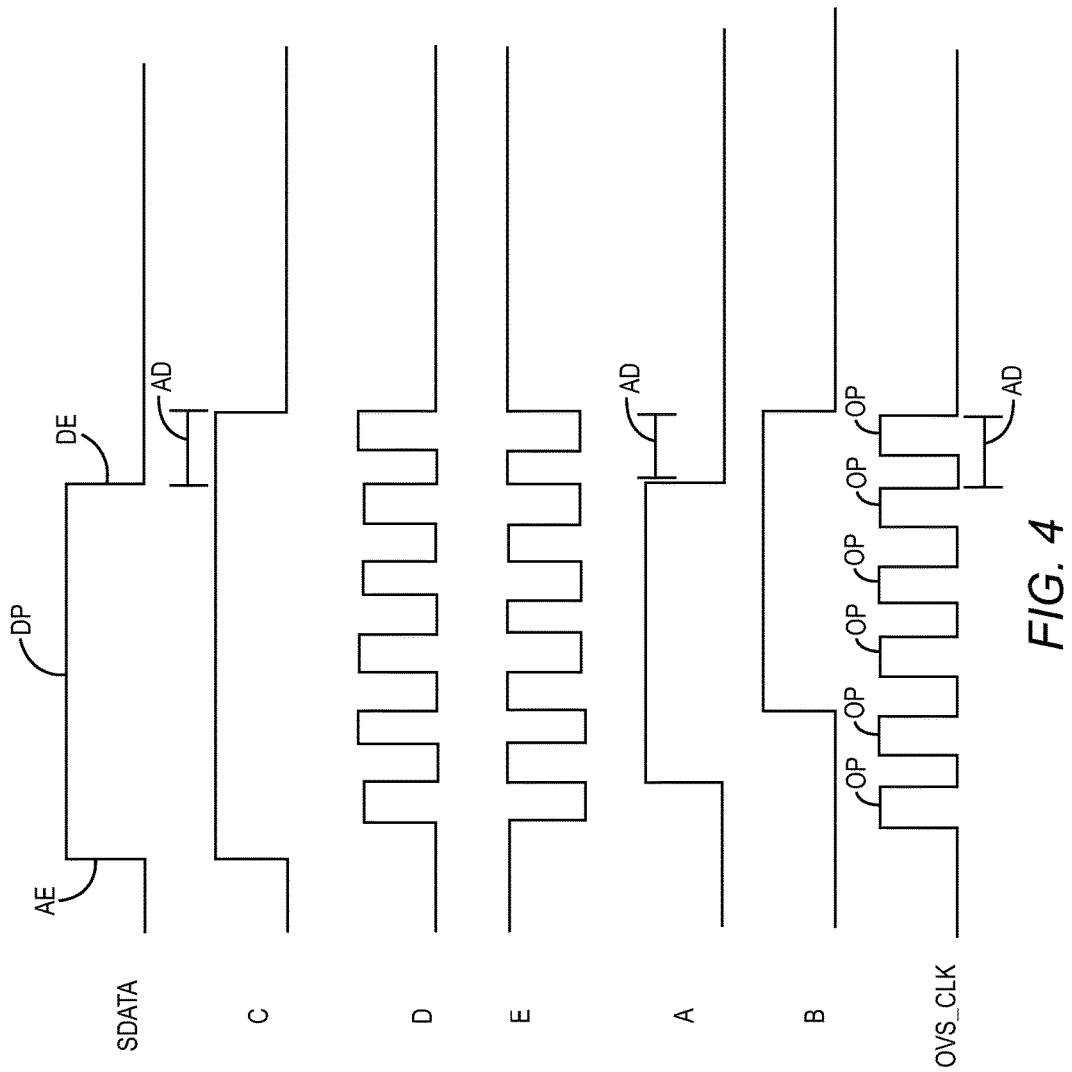
FIG. 4 illustrates an exemplary timing diagram for the oscillator shown in FIG. 3.

Referring now to FIG. 3 and FIG. 4, FIG. 4 illustrates an exemplary timing diagram for the oscillator 14 shown in FIG. 3. The operation of the oscillator 14 is demonstrated for the data pulse DP defined by the input data signal SDATA. Initially, when the input data signal SDATA is low, the capacitor 66 is discharged, and the feedback oscillator signal D is low while the intermediate oscillator signal E is high. At an activation edge AE of the data pulse DP and throughout the data pulse DP, the input terminal 72 of the OR gate 60 rises, and thus the oscillator enable signal C is provided in an activation state. Eventually the capacitor 66 charges enough so that the feedback oscillator signal D also is provided in an activation state. In response, the intermediate oscillator signal E goes low. As such, the capacitor 66 begins to discharge, and eventually the inverter gate 68 provides the intermediate oscillator signal E high. The inverter gate 70 then inverts the intermediate oscillator signal E to generate the oscillator signal OVS_CLK low. The process repeats so that, through the inverter gate 70, the ring oscillator 54 generates the oscillation pulses OP in the oscillation signal OVS_CLK. Note that any number of additional inverter gates may be provided in the ring oscillator 54 to provide an odd number of inversions.

By utilizing the OR gate 60, the input data signal SDATA provides a gated clock that activates and deactivates the ring oscillator 54. However, sampling errors can occur since the input data signal SDATA and the oscillator signal OVS_CLK are not frequency locked. The flip-flops 56, 58 synchronize the input data signal SDATA in accordance with the oscillator signal OVS_CLK and ensure that the oscillator 14 is cleanly deactivated. If the oscillation pulses OP of the oscillator signal OVR_CLK were being provided by sampling the input data signal SDATA, there would be a potential for counter errors on the activation edge AE and the deactivation edge DE of the data pulse DP defined by of the input data signal SDATA. The flip-flops 56, 58 hold the oscillator enable signal C high for a time delay AD to ensure proper synchronization.

After the deactivation edge DE, the delayed data signal A is delayed by the flip-flop 56, and the delayed data signal B has an additional delay due to the flip-flop 58. This provides the oscillator enable signal C in a high state for an additional period AD after the deactivation edge DE. Otherwise, if the OR gate 60 were not provided and the input data signal SDATA were provided directly into the input terminal 78 of the AND gate 62, a narrow glitch could occur in the feedback oscillator signal D. Also, in a worst case scenario without the OR gate, the activation edge AE or the deactivation edge DE of the SDATA is provided during a positive edge of one of the oscillation pulses OP of the oscillation signal OVR_CLK. Since noise can shift the activation edge AE or the deactivation edge DE, this could cause a counter error. If both the activation edge AE and the deactivation edge DE shift, counter errors from 0-2 can result. The OR gate 60 and the flip-flops 56, 58 help ensure that the activation edge AE and the deactivation edge DE are appropriately aligned and that glitches do not occur in the oscillation signal OVR_CLK. In this manner, an appropriate number of the oscillation pulses OP are provided for the data pulse DP.

Figure 5:
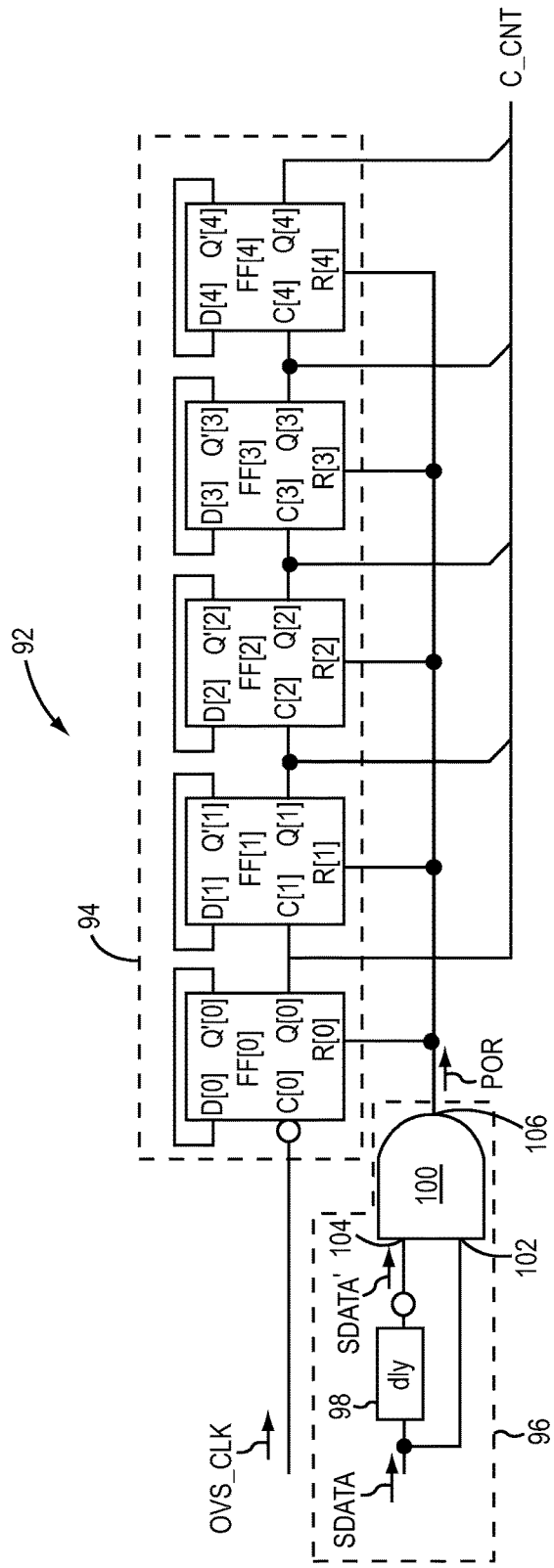
FIG. 5 illustrates one embodiment of a counter, which may be provided within the decoder shown in FIG. 1.

FIG. 5 illustrates one embodiment of a counter 92. The first counter 18 and/or the second counter 20 shown in FIG. 1 may be provided in accordance with the counter 92 shown in FIG. 5. The counter 92 includes a ripple counter 94 and a reset circuit 96. The ripple counter 94 includes flip-flops (referred to generally or generically as elements FF and specifically as elements FF[0]-FF[4]). Each of the flip-flops FF includes a data terminal (referred to generally or generically as elements D and specifically as elements D[0]-D[4]), a non-inverted output terminal (referred to generally or generically as elements Q and specifically as elements Q[0]-Q[4]), an inverted output terminal (referred to generally or generically as elements Q' and specifically as elements Q'[0]-Q'[4]), a clock terminal (referred to generally or generically as elements C and specifically as elements C[0]-C[4])), and a reset terminal (referred to generally or generically as elements R and specifically as elements R[0]-R[4])).

More specifically, a flip-flop FF[0] includes a data terminal D[0], a non-inverted output terminal Q[0], an inverted output terminal Q'[0], and a reset terminal R[0]. The inverted output terminal Q'[0] is connected to the data terminal D[0]. The reset terminal R[0] is coupled to the reset circuit 96. The clock terminal C[0] is connected to receive an inverted version of the oscillation signal OVS_CLK. A flip-flop FF[1] includes a data terminal D[1], a non-inverted output terminal Q[1], an inverted output terminal Q'[1], and a reset terminal R[1]. The inverted output terminal Q'[1] is connected to the data terminal D[1]. The reset terminal R[1] is coupled to the reset circuit 96. The clock terminal C[1] is connected to the non-inverted output terminal Q[0]. A flip-flop FF[2] includes a data terminal D[2], a non-inverted output terminal Q[2], an inverted output terminal Q'[2], and a reset terminal R[2]. The inverted output terminal Q'[2] is connected to the data terminal D[2]. The reset terminal R[2] is coupled to the reset circuit 96. The clock terminal C[2] is connected to the non-inverted output terminal Q[1]. A flip-flop FF[3] includes a data terminal D[3], a non-inverted output terminal Q[3], an inverted output terminal Q'[3], and a reset terminal R[3]. The inverted output terminal Q'[3] is connected to the data terminal D[3]. The reset terminal R[3] is coupled to the reset circuit 96. The clock terminal C[3] is connected to the non-inverted output terminal Q[2]. Finally, a flip-flop FF[4] includes a data terminal D[4], a non-inverted output terminal Q[4], an inverted output terminal Q'[4], and a reset terminal R[4]. The inverted output terminal Q'[4] is connected to the data terminal D[4]. The reset terminal R[4] is coupled to the reset circuit 96. The clock terminal C[4] is connected to the non-inverted output terminal Q[3]. Each of the flip-flops FF stores a bit of a count parameter C_CNT, which may be the reference parameter SYNC_CNT or the first count parameter BIT_CNT. The ripple counter arrangement of the flip-flops FF allows for the count parameter C_CNT to be incremented for each the oscillation pulses defined by the oscillation signal OVR_CLK.

The reset circuit 96 is configured to generate a reset signal POR that is received by the reset terminal R of each of the flip-flops FF to reset the ripple counter 94. In particular, the reset circuit 96 provides power on reset. As shown in FIG. 5, the reset circuit 96 includes a delay element 98 and an AND gate 100. The AND gate 100 has an input terminal 102 operable to receive the input data signal SDATA. The input data signal SDATA is also received by the delay element 98 that provides a delayed data signal SDATA', which is a delayed and inverted version of the input data signal SDATA. The AND gate 100 is operable to receive the delayed data signal SDATA' at the input terminal 104. The AND gate 100 also includes an output terminal 106. The AND gate 100 is configured to perform an AND operation on the input data signal SDATA and the delayed data signal SDATA' to generate the reset signal POR. Thus, the reset signal POR is high only after the reset circuit 96 is initially turned on by an activation edge of a data pulse and for a temporal period equal approximately to a propagation delay of the delay element 98. Otherwise, the reset signal POR remains low. The propagation delay of the delay element 98 is shorter than an oscillation period of the oscillation pulses defined by the oscillation signal OVS_CLK. This is because the negative edge of the oscillation pulses defined by the oscillation signal OVS_CLK is used. Once the input data signal SDATA goes low, the oscillation signal OVS_CLK is provided in a deactivation state, so the counter 92 will hold its last value of the count parameter C_CNT.

Figure 6:
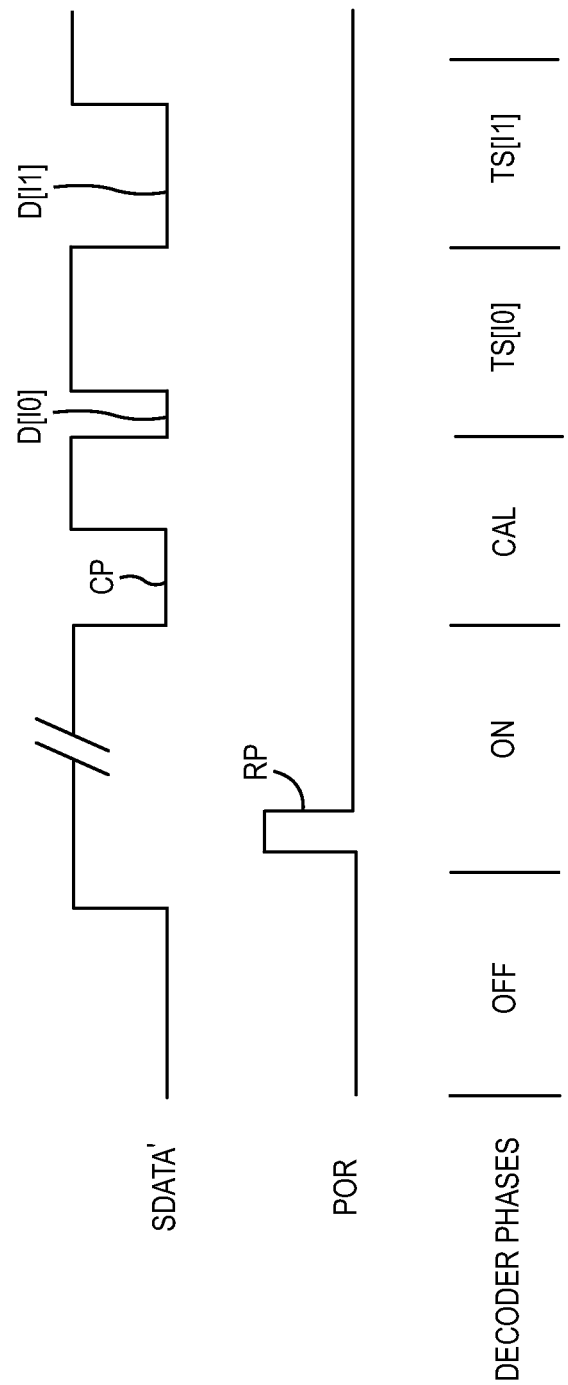
FIG. 6 illustrates a timing diagram for the counter shown in FIG. 5.

FIG. 6 illustrates a timing diagram for the counter 92 shown in FIG. 5. In this embodiment, the delayed input data signal SDATA' is shown, which is inverted with respect to the input data signal SDATA. The reset signal POR is shown for different phases of the decoder 10, including an off state, an on state, a calibration time slot CAL that provides a calibration pulse CP, a data pulse D[I0] that represents a bit value of 0 during a time slot TS[I0], and a data pulse D[I1]

that represents a bit value of 1 during a time slot TS[I1]. As shown in FIG. 6, the reset signal POR has a reset pulse RP, which is provided initially when transitioning from the off state and the on state.

As illustrated by the timing diagram in FIG. 6, the counter 92 shown in FIG. 5 uses active high signaling. Note that since the signaling polarity is inverted in the delayed data signal SDATA', the oscillation signal OVS_CLK shown in FIG. 5 triggers the counter 92 when delayed data signal SDATA' is low. With reference to FIG. 6, the oscillation signal OVS_CLK will not be provided when the decoder 10 is in the off state or in the on state. It will only run during the calibration time slot CAL, the time slot TS[I0] and the time slot [I1].

As shown by the delayed data signal SDATA', when the input data signal SDATA pin is held low for a long period of time during the off state, it essentially starves the decoder 10 of power and the decoder turns off. To wake up the slave in the on state, the data input signal SDATA and the delayed input signal SDATA simply go high. This allows for the decoder 10 to be turned on in the on state and triggers the reset pulse RP of the reset signal POR when reaching a nominal voltage threshold. From there, the delayed data signal SDATA' has an opposite polarity of the data input signal SDATA shown in FIG. 2.

Figure 7:
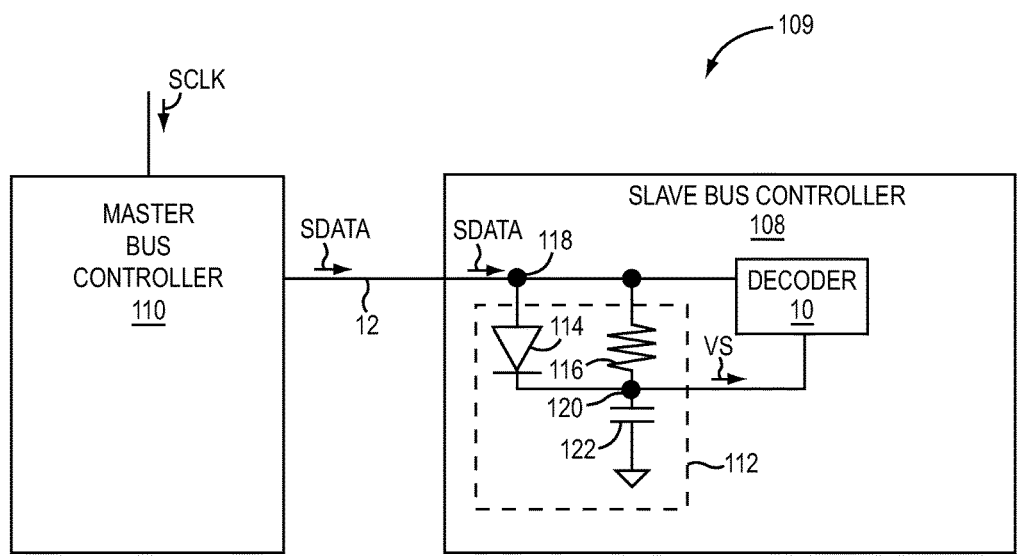
FIG. 7 illustrates an exemplary bus interface system having a slave bus controller, a master bus controller, and a bus line, where the slave bus controller derives power from the input data signal transmitted along the bus line.

FIG. 7 illustrates an exemplary bus interface system 109 having a slave bus controller 108, a master bus controller 110, and the bus line 12, where the slave bus controller 108 derives power from the input data signal SDATA. The master bus controller 110 is configured to generate the input data signal SDATA in accordance with the PWM bus protocol described above. The master bus controller 110 is coupled to the bus line 12 to transmit the input data signal SDATA along the bus line 12 to the slave bus controller 108. The slave bus controller 108 includes the decoder 10 described above with respect to FIG. 1. The slave bus controller 108 is also coupled to the bus line 12 to receive the input data signal SDATA from the master bus controller 110. In this manner, the slave bus controller 108 can recover bits from the input data signal SDATA using the decoder 10 as described above with respect to FIGS. 1 and 2. The slave bus controller 108 also includes power conversion circuitry 112 configured to also receive the input data signal SDATA and convert the input data signal SDATA into a supply voltage VS. More specifically, the supply voltage VS is used to power the decoder 10 in the slave bus controller 108 along with other components. Note that in this embodiment of the bus interface system 109, no other bus line is provided to couple the master bus controller 110 to the slave bus controller 108. Thus, only the bus line 12 is provided to couple the master bus controller 110 to the slave bus controller 108.

While the master bus controller 110 may use the system clock signal SCLK to synchronize the input data signal SDATA, the system clock signal SCLK does not have to be provided to the slave bus controller 108 since the master bus controller 110 generates the input data signal SDATA in accordance with the PWM bus protocol. As a result, the calibration pulse of the data frame is used by the decoder 10 in the slave bus controller 108 to synchronize the data frames and provide calibration as explained with respect to FIGS. 1 and 2 above. Thus, a clock bus line does not have to be provided between the master bus controller 110 and the slave bus controller 108 since the slave bus controller 108 can be synchronized without the system clock signal SCLK. Furthermore, since the power conversion circuitry 112 converts the input data signal SDATA into the supply voltage VS, a power bus line does not have to be provided in order to provide a supply voltage to the slave bus controller 108. Instead, the slave bus controller 108 generates the supply voltage VS from the input data signal SDATA itself. Thus, no other bus line besides the bus line 12 is provided by the bus interface system 109 to couple the master bus controller 110 to the slave bus controller 108.

In this embodiment, the power conversion circuitry 112 includes a diode 114 and a resistor 116 coupled in parallel between a node 118 and a node 120. Both the diode 114 and the resistor 116 receive the input data signal SDATA from the node 118. A capacitor 122 is coupled in shunt to the node 120. The capacitor 122 is charged by the input data signal SDATA to generate the supply voltage VS.

The power conversion circuitry 112 isolates the bus line 12 from the supply voltage VS provided to power the slave bus controller 108. The diode 114 allows for the input data signal SDATA to be pulled low without discharging the supply voltage VS. The resistor 116 does cause a slight pull down of the supply voltage VS. The diode 114 allows for faster charging of the capacitor 122. When the master bus controller 110 pulls the input data signal SDATA low to turn off the slave bus controller 108, the resistor 116 discharges the capacitor 122 to turn off the supply voltage VS and the slave bus controller 108.

Figure 8:
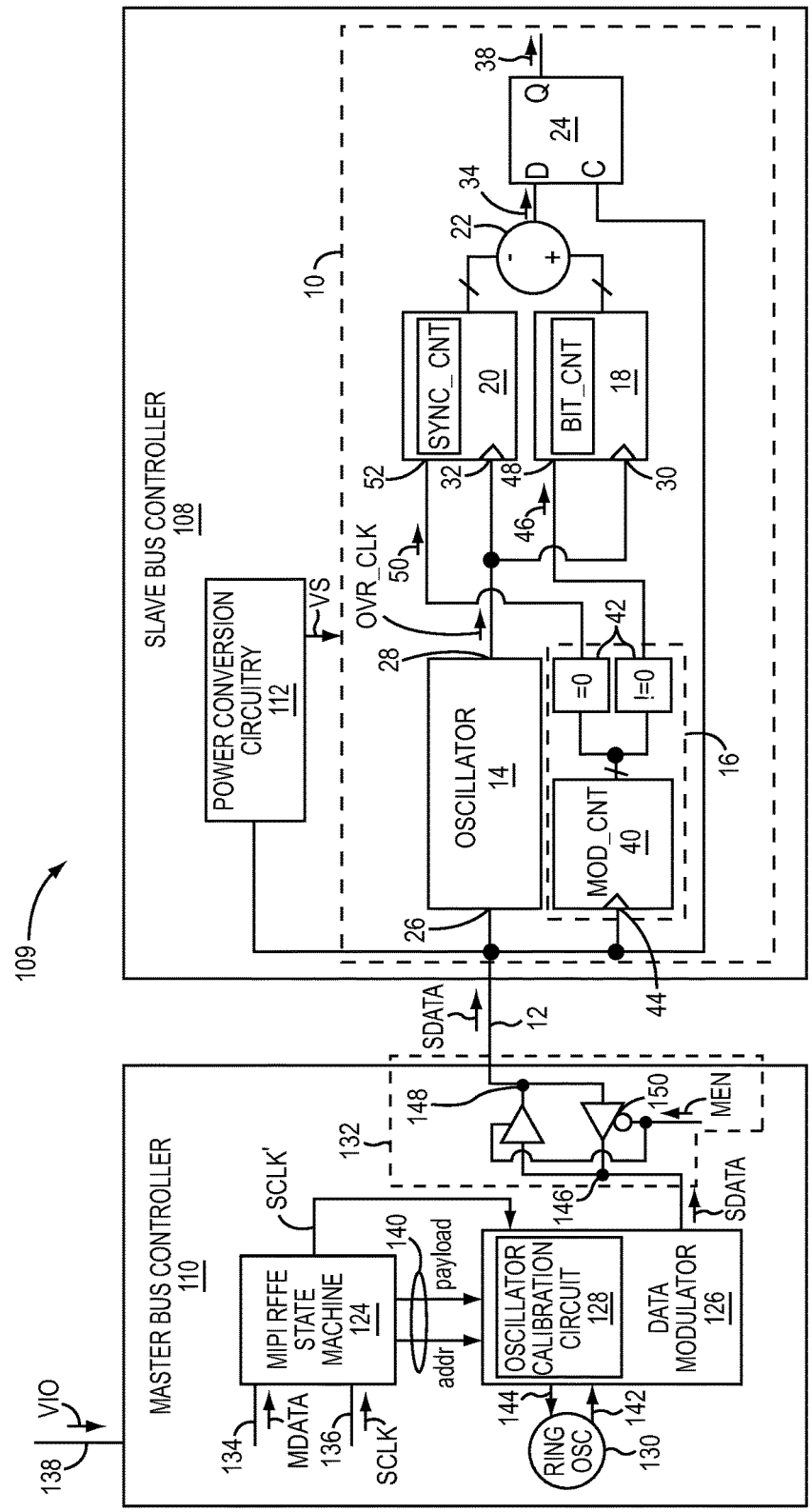
FIG. 8 illustrates another exemplary embodiment of the bus interface system that includes exemplary embodiments of the slave bus controller and the master bus controller, where the master bus controller is a bridge bus controller.

FIG. 8 illustrates another exemplary embodiment of the bus interface system 109 that includes exemplary embodiments of the slave bus controller 108 and the master bus controller 110. The master bus controller 110 is coupled to the bus line 12 to provide the input data signal SDATA and transmit the input data signal SDATA along the bus line 12 to the slave bus controller 108. The slave bus controller 108 includes the decoder 10 described above with respect to FIG. 1 and the power conversion circuitry 112 described above with respect to FIG. 7 that generates the supply voltage VS that powers the decoder 10. The slave bus controller 108 is also coupled to the bus line 12 to receive the input data signal SDATA from the master bus controller 110. In this embodiment, the master bus controller 110 is a bridge bus controller that translates a data frame formatted in accordance with a first bus protocol into the data pulses DP (shown in FIG. 2) defined by the input data signal SDATA during the time slots TS (shown in FIG. 2) of the data frame formatted in accordance with the PWM bus protocol. More specifically, in this embodiment, the master bus controller 110 is configured to translate the payload and the bus address represented by a data frame formatted in accordance with a Mobile Industry Processor Interface (MIPI) bus protocol and translate the payload and the bus address represented by the second data frame into the data pulses DP (shown in FIG. 2) defined by the input data signal SDATA during the time slots TS (shown in FIG. 2) of the data frame formatted in accordance with the PWM bus protocol.

The master bus controller 110 shown in FIG. 8 includes a MIPI Radio Frequency Front End (RFFE) state machine 124, a data modulator 126, an oscillator calibration circuit 128, a ring oscillator 130, and a bidirectional buffer 132. In this embodiment, the oscillator calibration circuit 128 is provided in the data modulator 126. The MIPI RFFE state machine 124 is configured to receive a first bus input, which in this example is a data input signal MDATA formatted in accordance with the MIPI bus protocol. The data input signal MDATA is received on a bus line 134. The data input signal MDATA represents a data frame that includes a bus address and a payload formatted in accordance with the MIPI bus protocol. To synchronize the master bus controller 110, the master bus controller 110 also receives the system clock signal SCLK on a bus line 136. Furthermore, the master bus controller 110 receives a supply voltage VIO along a bus line 138. The MIPI RFFE state machine is configured to extract the bus address and the payload from the data frame represented using the input data signal MDATA and generate a digital output 140 that transfers the bus address and the payload to the data modulator 126. The data modulator 126 is configured to obtain the bus address and payload extracted from the data input signal MDATA and provide the bus address and payload to a data frame formatted in accordance with the PWM bus protocol. The data modulator 126 is synchronized using the ring oscillator 130, which in this example is a digitally controlled oscillator (DCO). The ring oscillator 130 is configured to generate an oscillator signal 142. The ring oscillator 130 is relatively cheap. The oscillator calibration circuit is configured to calibrate the ring oscillator 130 based on the system clock signal SCLK. In this embodiment, the MIPI RFFE state machine 124 is configured to generate a calibration clock signal SCLK' by dividing down the system clock signal SCLK. The oscillator calibration circuit 128 is operable to receive the calibration clock signal SCLK' and generate a control output 144 that synchronizes the oscillator signal 142 in accordance with the calibration clock signal SCLK'.

The data modulator 126 is operable to receive the oscillator signal 142 and is configured to generate the input data signal SDATA such that the data pulses DP (shown in FIG. 2) of the input data signal SDATA are synchronized by the oscillator signal 142. Since the oscillator signal 142 was synchronized based on the system clock signal SCLK (e.g., in this embodiment, in accordance with the calibration clock signal SCLK' generated from the system clock signal SCLK), the timing accuracy of the oscillator signal 142 is maintained. As shown in FIG. 8, the bidirectional buffer 132 has an input terminal 146 that receives the SDATA signal and an output terminal 148 that provides the input data signal SDATA to the bus line 12. The output terminal 148 is coupled to the bus line 12, which is connected to the slave bus controller 108. However, the bidirectional buffer 132 also includes an input terminal 150 that is operable to receive an enable signal MEN. When the enable signal MEN is in an activated state, the bidirectional buffer 132 is configured to transmit the input data signal SDATA along the bus line 12. Otherwise, when the enable signal MEN is in a deactivation state, the bidirectional buffer 132 does not transmit the input data signal SDATA along the bus line 12 but rather allows the master bus controller 110 to receive data signals from slave controllers connected to the bus line 12. The enabling signal MEN may be generated by the data modulator 126 and may activate the bidirectional buffer 132 when the slave bus controller 108 (shown in FIG. 7) is not pulling down the bus line 12. Since the slave bus controller 108 is synchronized with the data pulse DP[0] (i.e., the calibration pulse), and the power conversion circuitry 112 converts the input data signal SDATA into the supply voltage VS, the master bus controller 110 and the slave bus controller 108 are only connected by the bus line 12. No other bus lines are needed.

Figure 9:
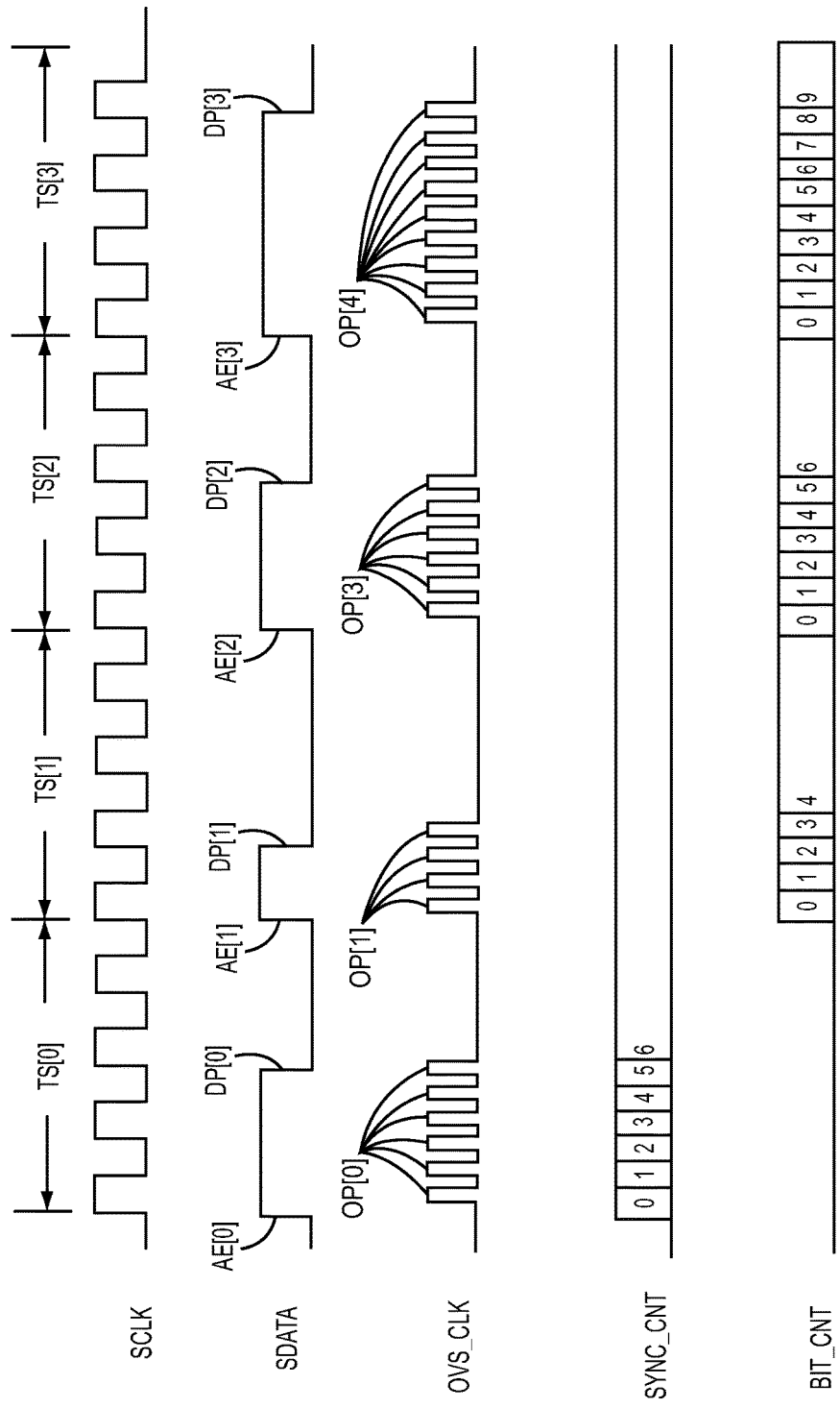
FIG. 9 illustrates a timing diagram for the bus interface system shown in FIG. 8 during an exemplary data frame provided in accordance to a one wire PWM bus protocol.

Referring now to FIG. 8 and FIG. 9, FIG. 9 illustrates a timing diagram for the bus interface system 109 shown in FIG. 8 during an exemplary data frame provided in accordance to another one wire PWM bus protocol. FIG. 9 includes an exemplary illustration of the input data signal SDATA, the system clock signal SCLK, the oscillation signal OVS_CLK, the reference parameter SYNC_CNT, and the first count parameter BIT_CNT as provided throughout the data frame. In this embodiment, the PWM bus protocol is provided so that the data pulses DP[1]-DP[3] represents any one of a set of logical values. More specifically, the data pulses DP[1]-DP[3] can represent any one of a set of three logical symbols, such as a logical symbol "0," a logical symbol "1," and a logical symbol "2." The master bus controller 110 is configured to generate the input data signal SDATA, which is synchronized based on the system clock signal SCLK, as described above. Again, in this embodiment, the data pulse DP[0] is the calibration pulse provided during the time slot TS[0], which is the calibration time slot. In this example, the data pulse DP[0] is provided by the master bus controller 110 for two clock periods of the system clock signal SCLK. The master bus controller 110 generates the data pulses DP[1]-DP[3] with logical symbols representing a bus address and a payload using the ring oscillator 130, as explained above with respect to FIG. 8.

With respect to the slave bus controller 108, the oscillator 14 in the decoder 10 is configured to be enabled by the data pulse DP[0], which is the calibration pulse provided during the calibration time slot (i.e., TS[0]). The second counter 20 may be configured to reset the reference parameter SYNC_CNT to an initial value of zero (0) in response to an activation edge AE[0] of the data pulse DP[0]. The second counter 20 is configured to count the oscillation pulses OP[0] defined by the oscillation signal OVR_CLK during the time slot TS[0] as a result of the data pulse DP[0] (the calibration pulse). More specifically, the second counter 20 is configured to increment the reference parameter SYNC_CNT as a result of each of the oscillation pulses OP[0] defined by the oscillation signal OVR_CLK during the time slot TS[0]. In this example, the reference parameter SYNC_CNT is set equal to a reference number of six (6) as a result of the six oscillation pulses OP[0] generated as a result of the data pulse DP[0] during the time slot TS[0]. As a result of the end of the data pulse DP[0], no more of the oscillation pulses OP[0] are generated, and the oscillation signal OVS_CLK is held in a deactive state for a remainder of the time slot TS[0]. Accordingly, the reference parameter SYNC_CNT indicates the reference number of six (6), which is how many of the oscillation pulses OP[0] were generated by the oscillator 14 during the time slot TS[0] (i.e., the calibration time slot) as a result of the data pulse DP[0] (i.e., the calibration pulse).

With respect to the second time slot TS[1], the counter enabling circuitry 16 is configured to enable the first counter 18 and disable the second counter 20. As such, the second counter 20 holds the reference parameter SYNC_CNT at the reference number of six (6). The oscillator 14 is configured to be enabled by the data pulse DP[1]. The first counter 18 may be configured to reset the first count parameter BIT_CNT to an initial value of zero (0) in response to an activation edge AE[1] of the data pulse DP[1]. The first counter 18 is configured to count the oscillation pulses OP[1] defined by the oscillation signal OVR_CLK during the time slot TS[1] as a result of the data pulse DP[1], which has a 25% duty cycle.

More specifically, the first counter 18 is configured to increment the first count parameter BIT_CNT as a result of each of the oscillation pulses OP[1] defined by the oscillation signal OVR_CLK during the time slot TS[1]. In this example, the first count parameter BIT_CNT is set equal to a number of four (4) as a result of the four oscillation pulses OP[1] generated as a result of the data pulse DP[1] during the time slot TS[1]. As a result of the end of the data pulse DP[1], no more of the oscillation pulses OP[1] are generated and the oscillation signal OVS_CLK is held in a deactive state for a remainder of the time slot TS[1]. Accordingly, the first count parameter BIT_CNT indicates a number of four (4), which is how many of the oscillation pulses OP[1] were generated by the oscillator 14 during the time slot TS[1] as a result of the data pulse DP[1]. The comparison circuit 22 then subtracts the reference parameter SYNC_CNT from the first count parameter BIT_CNT. Since four (4) minus six (6) is negative, the comparison circuit 22 generates the data output 34 so that the data output 34 represents a logical symbol "0."

With respect to the time slot TS[2], the counter enabling circuitry 16 is configured to enable the first counter 18 and disable the second counter 20. As such, the second counter 20 holds the reference parameter SYNC_CNT at the reference number of six (6). The oscillator 14 is configured to be enabled by the data pulse DP[2]. The first counter 18 may be configured to reset the first count parameter BIT_CNT to an initial value of zero (0) in response to an activation edge AE[2] of the data pulse DP[2]. The first counter 18 is configured to count the oscillation pulses OP[2] defined by the oscillation signal OVR_CLK during the time slot TS[2] as a result of the data pulse DP[2], which has a 50% duty cycle.

More specifically, the first counter 18 is configured to increment the first count parameter BIT_CNT as a result of each of the oscillation pulses OP[2] defined by the oscillation signal OVR_CLK during the time slot TS[2]. In this example, the first count parameter BIT_CNT is set equal to a number of six (6) as a result of the six oscillation pulses OP[2] generated as a result of the data pulse DP[2] during the time slot TS[2]. As a result of the end of the data pulse DP[2], no more of the oscillation pulses OP[2] are generated, and the oscillation signal OVS_CLK is held in a deactive state for a remainder of the time slot TS[2]. Accordingly, the first count parameter BIT_CNT indicates a number of six (6), which is how many of the oscillation pulses OP[2] were generated by the oscillator 14 during the time slot TS[2] (i.e., the first address time slot) as a result of the data pulse DP[2]. The comparison circuit 22 then subtracts the reference parameter SYNC_CNT from the first count parameter BIT_CNT. Since six (6) minus six (6) is zero, the comparison circuit 22 generates the data output 34 so that the data output 34 represents a logical symbol of "1."

With respect to the time slot TS[3], the counter enabling circuitry 16 is configured to enable the first counter 18 and disable the second counter 20. As such, the second counter 20 holds the reference parameter SYNC_CNT at the reference number of six (6). The oscillator 14 is configured to be enabled by the data pulse DP[3]. The first counter 18 may be configured to reset the first count parameter BIT_CNT to an initial value of zero (0) in response to an activation edge AE[3] of the data pulse DP[3]. The first counter 18 is configured to count the oscillation pulses OP[3] defined by the oscillation signal OVR_CLK during the time slot TS[3] as a result of the data pulse DP[3] which has a 75% duty cycle.

More specifically, the first counter 18 is configured to increment the first count parameter BIT_CNT as a result of each of the oscillation pulses OP[3] defined by the oscillation signal OVR_CLK during the time slot TS[3]. In this example, the first count parameter BIT_CNT is set equal to a number of nine (9) as a result of the nine oscillation pulses OP[3] generated as a result of the data pulse DP[3] during the time slot TS[3]. As a result of the end of the data pulse DP[3], no more of the oscillation pulses OP[3] are generated, and the oscillation signal OVS_CLK is held in a deactive state for a remainder of the time slot TS[3]. Accordingly, the first count parameter BIT_CNT indicates a number of nine (9), which is how many of the oscillation pulses OP[3] were generated by the oscillator 14 during the time slot TS[3] as a result of the data pulse DP[3]. The comparison circuit 22 then subtracts the reference parameter SYNC_CNT from the first count parameter BIT_CNT. Since nine (9) minus six (6) is positive, the comparison circuit 22 generates the data output 34 so that the data output 34 represents a logical symbol of "2."

Figure 10:
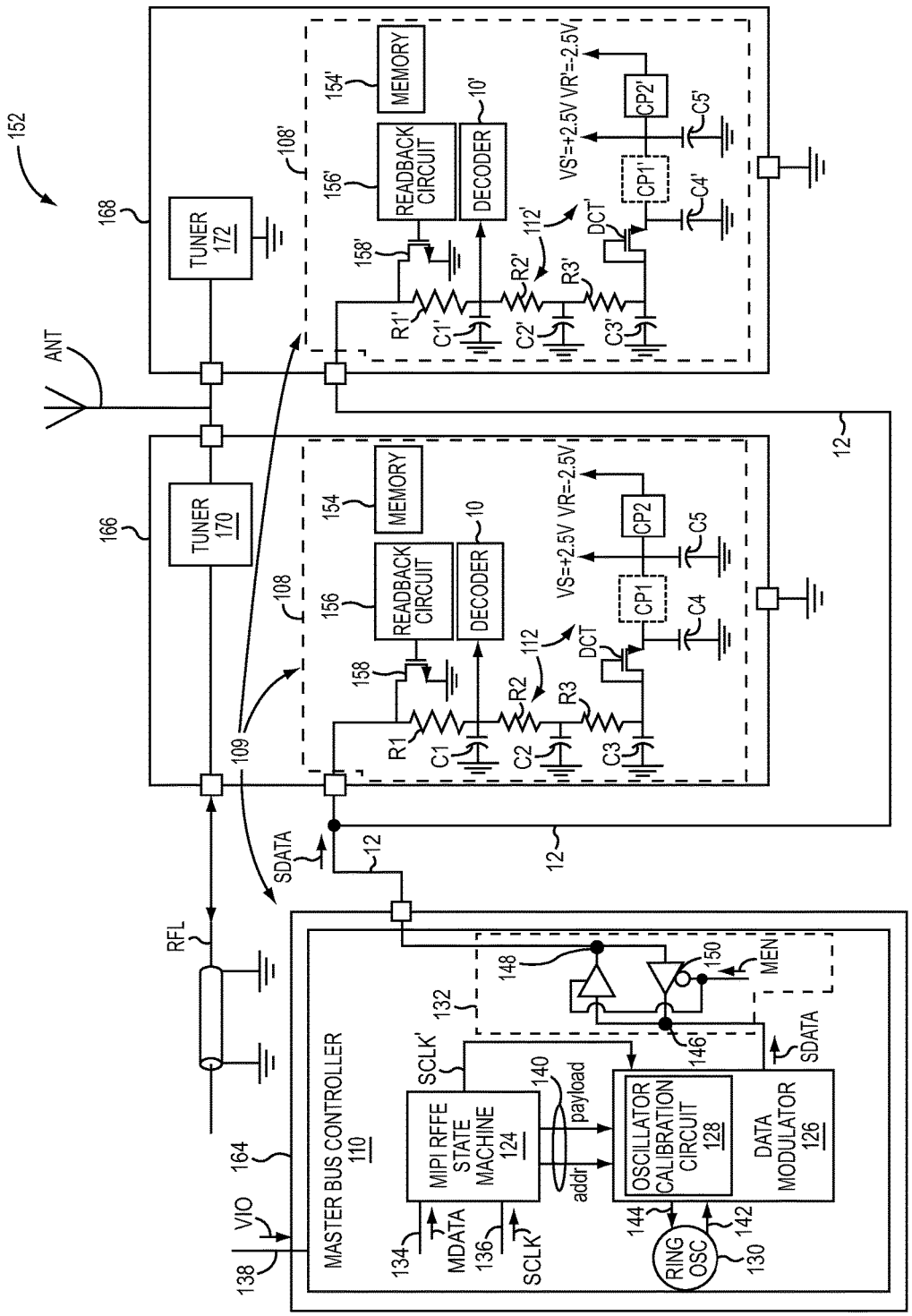
FIG. 10 illustrates another exemplary embodiment of the bus interface system that includes a master bus controller and slave bus controllers coupled in a daisy chain along the bus line.

FIG. 10 illustrates another exemplary embodiment of the bus interface system 109, which is provided in a radio frequency (RF) front end module 152. The bus interface system 109 includes an embodiment of the master bus controller 110, an embodiment of the slave bus controller 108, and another slave bus controller 108'. The slave bus controller 108' is coupled to the bus line 12 such that the slave bus controller 108 and the slave bus controller 108' are coupled in a daisy chain along the bus line 12. In this manner, the slave bus controller 108' also receives the input data signal SDATA from the master bus controller 110. In this embodiment, the slave bus controller 108 includes a memory device 154 that stores information received on the bus line 12 and can be used to write information on the bus line 12. A readback circuit 156 is configured to control a pull down transistor 158 in order to write bits onto the bus line 12. The slave bus controller 108 includes the decoder 10, which was described with respect to FIG. 1.

In addition, the slave bus controller 108 also includes another embodiment of the power conversion circuitry 112. In this embodiment, the power conversion circuitry includes shunt coupled capacitors C1, C2, C3, C4, C5, series connected resistors R1, R2, R3, a diode connected transistor DCT, a charge pump CP1, and a charge pump CP2. The shunt coupled capacitors C1, C2, C3, C4, C5, series connected resistors R1, R2, R3, and series connected transistors provide the appropriate RC constant to convert the input data signal SDATA into the supply voltage VS and a supply voltage VR. In this embodiment, the charge pump CP1 is a positive charge pump that generates the supply voltage at approximately +2.5V. The charge pump CP2 is a negative charge pump that generates the supply voltage VR at approximately −2.5V. The supply voltage VS and the supply voltage VR are provided to power the decoder 10 and readback circuit 156 of the slave bus controller 108.

In this embodiment, the slave bus controller 108' is identical to the slave bus controller 108. Thus, a decoder 10', a memory device 154', a readback circuit 156' a pull down transistor 158', a power conversion circuitry 112', shunt coupled capacitors C1', C2', C3', C4', C5', series connected resistors R1', R2', R3', a diode connected transistor DCT', a charge pump CP1', and a charge pump CP2' of the slave bus controller 108' are identical to the decoder 10, the memory device 154, the readback circuit 156, the pull down transistor 158, the power conversion circuitry 112, the shunt coupled capacitors C1, C2, C3, C4, C5, the series connected resistors R1, R2, R3, the diode connected transistor DCT, the charge pump CP1, and the charge pump CP2, respectively of the slave bus controller 108.

The master bus controller 110 is formed as an integrated circuit (IC) within an IC package 164. Similarly, the slave bus controller 108 is formed as an IC within an IC package 166 and the slave bus controller 108' is formed as an IC with an IC package 168. The IC packages 164, 166, 168 connect the master bus controller 110 and the slave bus controller 108, 108' in a daisy chain along the bus line 12. This arrangement thus reduces interconnections, and thus the slave bus controllers 108, 108' are provided with other circuitry of the RF front end module. More specifically, the IC package 166 includes a tuner 170 connected to an antenna ANT along an RF line RFL. The IC package 168 also includes a tuner 172 connected to the antenna ANT along the RF line RFL. In this example, the master bus controller 110 may be included within a cellular baseband chipset in a dedicated phone compartment and the slave bus controllers 108, 108' reside close to the antenna ANT. Reducing interconnections helps reduce costs and increase reliability.

Figure 11:
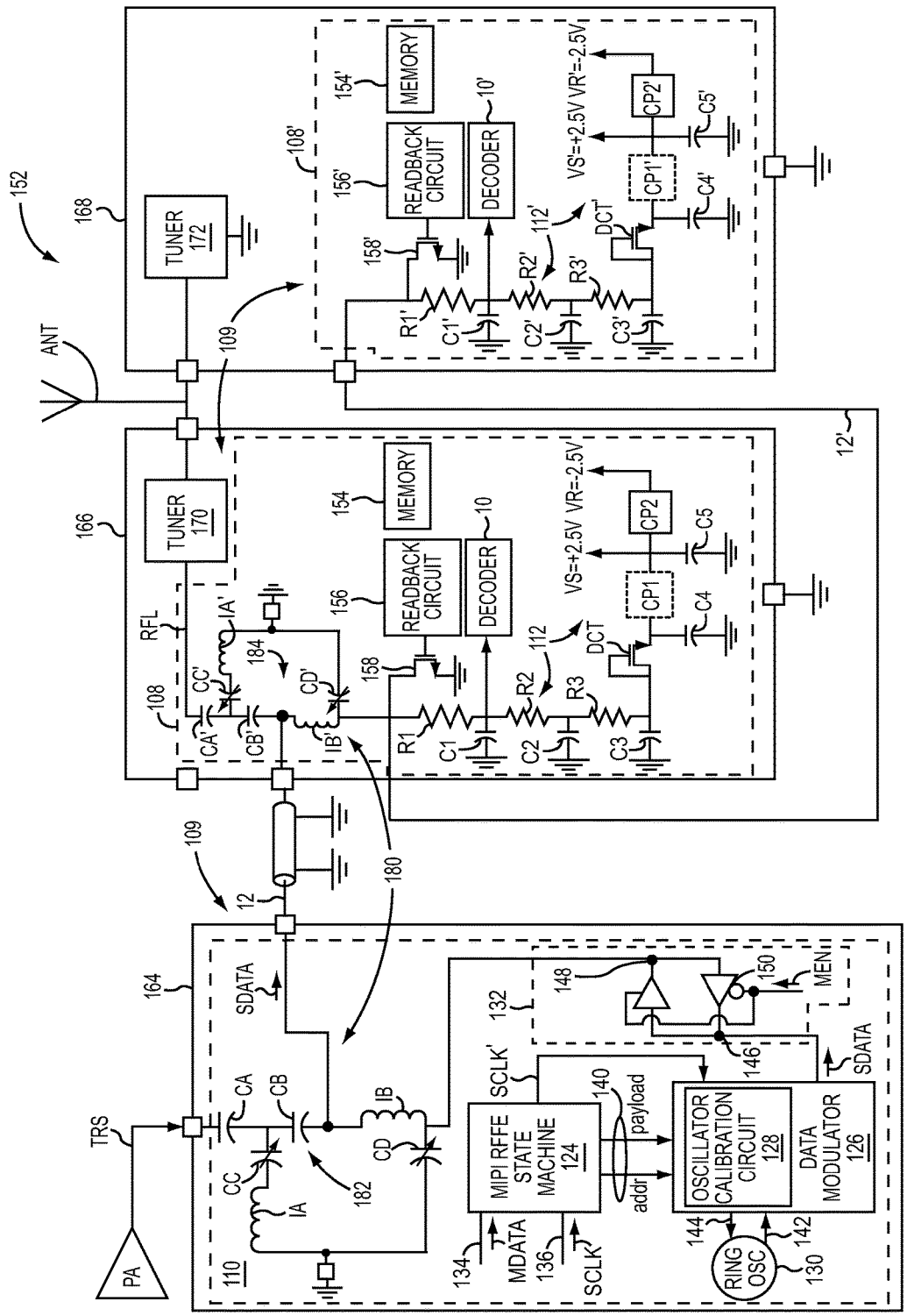
FIG. 11 illustrates another exemplary embodiment of the bus interface system that includes a master bus controller and slave bus controllers with a diplexer that reduces transmit injections along the bus line.

FIG. 11 illustrates another exemplary embodiment of the bus interface system 109, which is provided in another embodiment of the RF front end module 152. The master bus controller 110, the slave bus controller 108, and the slave bus controller 108' are the same as the embodiments shown in FIG. 10 except that, in this embodiment, the slave bus controller 108 and the slave bus controller 108' are connected by a bus line 12'. Furthermore, a diplexer 180 is provided to deal with transmit injection onto the bus line 12 and the bus line 12' resulting from a transmit signal TRS amplified by the power amplifier PA in the RF front end module 152. The RF transmit signal TRS propagates along the RF line RFL. The diplexer 180 includes a first RF filter 182 and a second RF filter 184. The master bus controller 110 includes the first RF filter 182. The slave bus controller 108 includes the second RF filter 184.

The RF transmit signal TRS is diplexed onto the wire in the master bus controller 110 and to the wire in the slave bus controller 108. As such, the RF transmit signal TRS needs to be passed with as little loss and noise as possible. The first RF filter 182 and the second RF filter 184 are configured to block bus noise produced by the master bus controller 110, the slave bus controller 108, and the slave bus controller 108' from entering the RF line RFL and the RF transmit signal TRS. The bus line 12 is connected between the first RF filter 182 and the second RF filter 184. The bus line 12' is connected between the pull down transistor 158 and resistor R1 in the slave bus controller 108 and is connected between the pull down transistor 158' and resistor R1' in the slave bus controller 108'.

The first RF filter 182 includes capacitors CA, CB, variable capacitive structure CC, CD, inductor IA, and inductor IB. The capacitor CA is coupled in series to provide matching for the transmit signal TRS from the power amplifier PA. The variable capacitive structure CC and the inductor IA are series coupled to form a series resonator connected in shunt. The capacitor CB, variable capacitive structure CC, and the inductor IA form a high pass filter that blocks energy from the communications bus activity from getting back to RF sections. The variable capacitive structure CD and the inductor IB are coupled in series to form another series resonator. The variable capacitive structure CD and the inductor IB form a low pass filter that blocks RF energy from getting to the data modulator 126. This low pass filter reduces RF levels at the output terminal 148 of the bidirectional buffer 132 from entering the master bus controller 110. The variable capacitive structures CC and CD may each be a programmable array of capacitors. Any other suitable variable capacitive structure may also be used such as varactors. In this manner, the first RF filter 182 can be tuned.

The second RF filter 184 includes capacitors CA', CB', variable capacitive structure CC', CD', inductor IA', and inductor IB'. The bus line 12 is connected to first RF filter 182 between the capacitor CB and the inductor IB and is connected to the second RF filter 184 between the capacitor CB' and the inductor IB'. The capacitor CA' is coupled in series to provide matching to the RF line RFL. The variable capacitive structure CC' and the inductor IA' are series coupled to form a series resonator connected in shunt. The capacitor CB', variable capacitive structure CC', and the inductor IA' form a high pass filter that blocks energy from the communications bus activity from getting back to RF sections. The variable capacitive structure CD' and the inductor IB' are coupled in series to form another series resonator. The series resonator formed by the variable capacitive structure CD' and the inductor IB' are connected in series to the other components of the slave bus controller 108. The variable capacitive structure CD' and the inductor IB' form a low pass filter that blocks RF energy from getting to the slave bus controller 108 and the slave bus controller 108' through the bus line 12'. The variable capacitive structures CC' and CD' may each be a programmable array of capacitors. Any other suitable variable capacitive structure may also be used such as varactors. In this manner, the second RF filter 184 can be tuned. The diplexer 180 may be tuned to have an elliptical response (Cauer characteristic response) such that the first RF filter 182 and the second RF filter 184 can be tuned for optimal selectivity at a signal frequency of the RF transit signal TRS.

Figure 12:
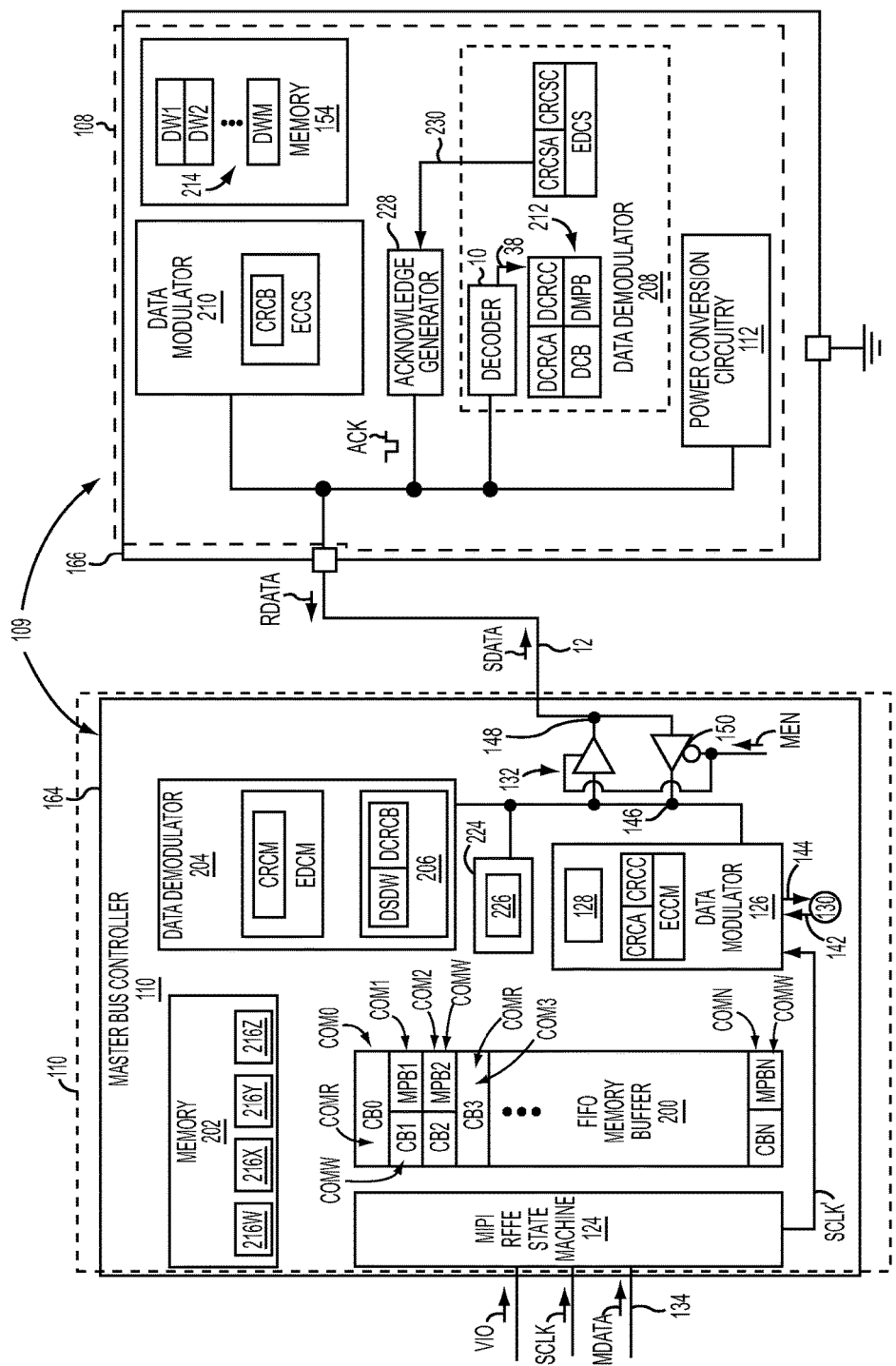
FIG. 12 illustrates another embodiment of the bus interface system having an embodiment of the master bus controller and an embodiment of the slave bus controller coupled to the bus line, wherein the master bus controller and the slave bus controller are configured to error check communications along the bus line.

FIG. 12 illustrates an embodiment of the bus interface system 109 with an embodiment of the master bus controller 110 formed on the IC package 164 and an embodiment of the slave bus controller 108 formed on the IC package 166. The master bus controller 110 shown in FIG. 12 includes the MIPI RFFE state machine 124 described above with respect to FIGS. 8, 10, and 11 in order to decode information encoded in the input data signal MDATA by the MIPI bus controller into data pulses formatted in accordance with the PWM bus protocol for transmission along the bus line 12, as explained above. Since the MIPI bus may be faster than the data rate provided by the bus interface system 109, a First In First Out (FIFO) memory buffer 200 is provided to store data commands (referred to generically as elements COM and specifically as data command COM0 or read command COM0, data command COM1 or write command COM1, data command COM2 or group write command COM2, data command COM3 or read command COM3, and data command COMN or write command COMN). Each of the data commands COM may be stored as bits within the FIFO memory buffer 200.

Each of the data commands COM includes a command field (referred to generically as elements CB and specifically as elements "CB0-CBN"). Each of the command fields CB may include a set of transactional bits describing a requested bus operation of the corresponding data command COM. For example, each of the command fields CB may include a command identifier subfield, a slave identifier subfield, and an address subfield. The command identifier subfield indicates a particular type of bus operation being requested by the data command COM. For example, the different types of read commands or write commands can be identified by the command identifier subfield of the command field CB. The slave identifier subfield identifies a slave bus controller (e.g., the slave bus controller 108) or slave bus controllers that are to implement the bus operation identified by the command identifier subfield. The memory address subfield identifies a memory address in a memory device (e.g., the memory device 154) of the slave bus controller (e.g. slave bus controller 108) relevant to the bus operation. The command fields CB may or may not include other transactional fields depending on the types of data commands COM that are to be implemented by an application of the bus interface system 109.

The data command COM0 stored in the FIFO memory buffer 200 is a read command that is provided as a command field CB0. The command field CB0 is a set of transactional data bits that describe the read command COM0. The data command COM1 stored in the FIFO memory buffer 200 is an individual write command. The data command COM1 includes the command field CB1, which is a set of transactional data bits for the individual write command. The data command COM1 in the FIFO memory buffer 200 also includes the payload segment MPB1, which is a set of payload bits for the individual write command. For the write command COM1, one of the slave bus controllers (e.g., the slave bus controller 108) in the bus interface system is to receive a copy of the payload segment MPB1. The data command COM2 in the FIFO memory buffer 200 is a group write command. The data command COM2 includes the command field CB2, which is a set of transactional data bits for the group write command. The data command COM2 in the FIFO memory buffer 200 also includes a payload segment MPB2, which is a set of payload bits for the group write command. For the group write command, more than one of the slave bus controllers (e.g., the slave bus controller 108) in the bus interface system 109 is to receive a copy of the payload segment MPB2.

The group write commands may be broadcast write commands or subgroup write commands. The data command COM3 in the FIFO memory buffer 200 is another read command that is provided as the command field CB3. The data command COMN in the FIFO memory buffer 200 is presumed to be another individual write command. The command field CBN includes a set of transactional bits for another write command. The read commands COM0 and COM3 will be referred to generically as read commands COMR. The write commands COM1 and COMN will be referred to generically as write commands COMW.

Each of the data commands COM1, COM2, and COMN include the payload segments MPB1, MPB2, MPBN (referred to generically as elements "MPB"), each including payload bits for the write commands COMW. To implement each of the write commands COMW, the master bus controller 110 is requesting that an individual slave bus controller (e.g., the slave bus controller 108) write the payload segment MPB to its memory device (e.g., the memory device 154). On the other hand, to implement each of the read commands COMR, the master bus controller 110 is requesting that a slave bus controller (e.g., the slave bus controller 108) provide a data segment from its memory device (e.g., the memory device 154) to the master bus controller 110. As such, the read commands COMR do not include the payload segment MPB. Since the read commands COMR do not include payload segments MPB, the command field CB of the read command COMR may be the entire read command. In this embodiment, the read command COM0 is simply made up of the command field CB0. Similarly, the read command COM3 is simply made up of the command field CB3.

The group write command COM2 may be a broadcast write command requesting that all of the slave bus controllers in the bus interface system 109 write the payload segment MPB2 in each of its memory devices. Also, the group write command COM2 may be a subgroup write command requesting that a proper subset of the slave bus controllers write the payload segment MPB2 in each of its memory devices.

With respect to the payload segments MPB of the write commands COMW and the data command COM2, the payload bits of the payload segment MPB may have been decoded by the MIPI RFFE state machine 124 from the input data signal MDATA provided by the bus line 12, as explained above with respect to FIG. 8. The master bus controller 110 also includes memory device 202 configured to store master data of the master bus controller 110. Accordingly, the payload segment MPB of the write commands COMW, COM2 may also be provided from the memory device 202 of the master bus controller 110 for transmission by the data modulator 126 to the slave bus controller 108 along the bus line 12.

With respect to the master bus controller 110, the data modulator 126 is configured to generate data pulses in the input data signal SDATA representing the data commands COM in accordance with a PWM bus protocol as explained above. These data pulses are organized into data frames that are described in further in detail below. It should be noted furthermore that the data modulator 126 may also be configured to start the data frames with a sequence of data pulses provided in accordance with a start of sequence (SOS) pulse pattern, as described in concurrently filed related U.S. patent application Ser. No. 14/659,292, entitled "START OF SEQUENCE DETECTION FOR ONE WIRE BUS," hereby incorporated herein by reference in its entirety.

In FIG. 12, the data modulator 126 includes the oscillator calibration circuit 128 (described above) and an error coding circuit ECCM. The error coding circuit ECCM is explained in further detail below. The slave bus controller 108 is coupled to the bus line 12 and thus receives the input data signal SDATA. In this embodiment, no other bus line is provided in the bus interface system 109 to connect the master bus controller 110 and the slave bus controller 108.

As shown in FIG. 12, the master bus controller 110 further includes a data demodulator 204 that is coupled to the bus line 12. The data demodulator 204 may receive an input data signal RDATA with data pulses formatted in accordance to the PWM bus protocol along the bus line 12 from the slave bus controller 108. With the input data signal RDATA, the slave bus controller 108 can send a data segment to the master bus controller 110 from the memory device 154 to implement the read command COMR. The data demodulator 204 of the master bus controller 110 is configured to decode the data pulses provided within the input data signal RDATA from the slave bus controller 108 in accordance with the PWM bus protocol. The data demodulator 204 of the master bus controller 110 includes payload registers 206. The payload registers 206 are configured to store data bits decoded as a result of the data pulses in the input data signal RDATA within payload registers 206 as explained in further detail below. The data demodulator 204 also includes an error detection circuit EDCM configured to check for transmission errors in the data bits stored in the payload registers 206. The function of the error detection circuit EDCM is explained in further detail below.

An embodiment of the slave bus controller 108 is also shown in FIG. 12 and formed in the IC package 166. The slave bus controller 108 includes a data demodulator 208, a data modulator 210, and the power conversion circuitry 112. The power conversion circuitry 112 may be provided in accordance with any of the embodiments described above. The power conversion circuitry 112 may also be provided as described in concurrently filed related U.S. patent application Ser. No. 14/659,371, entitled "POWER MANAGEMENT SYSTEM FOR A BUS INTERFACE SYSTEM," hereby incorporated herein by reference in its entirety.

With regards to the data demodulator 208, the data demodulator 208 of the slave bus controller 108 includes the decoder 10. The decoder 10 is configured to decode the data pulses of the input data signal SDATA from the master bus controller 110 in accordance with the PWM bus protocol as described above. It should be noted furthermore that the data demodulator 208 of the slave bus controller 108 and the decoder 10 may also be configured to recognize a sequence of data pulses within the input data signal SDATA provided in accordance with the SOS pulse pattern at the beginning of a data frame, as described in concurrently filed related U.S. patent application Ser. No. 14/659,292, entitled "START OF SEQUENCE DETECTION FOR ONE WIRE BUS." Furthermore, the decoder 10 can also be calibrated as described in concurrently filed related U.S. patent application Ser. No. 14/659,292, entitled "START OF SEQUENCE DETECTION FOR ONE WIRE BUS."

As shown in FIG. 12, the data demodulator 208 of the slave bus controller 108 includes data frame registers 212 configured to receive the memory input signal 38 from the decoder 10. In this manner, the data frame registers 212 store the data bits decoded by the decoder 10 as result of the data pulses within the input data signal SDATA from the master bus controller 110. The data demodulator 208 includes an error detection circuit EDCS, which is explained in further detail below.

As shown in FIG. 12, the memory device 154 is configured to store slave data 214. The slave data 214 includes data segments (referred to generically as elements "DW" and specifically as elements "DW1-DWM"). The memory device 154 is configured to assign memory addresses to locations of the data segments DW1-DWM within the slave data 214. Thus, each of the data segments is located within the slave data 214 at one of the memory addresses.

The slave bus controller 108 further includes a data modulator 210. The data modulator 210 is operably associated with the memory device 154 of the slave bus controller 108. The data modulator 210 of the slave bus controller 108 is configured to generate the input data signal RDATA along the bus line 12 in accordance with the PWM bus protocol. For example, to implement one of the read commands COMR, the data modulator 210 of the slave bus controller 108 may generate data pulses along the bus line 12 within the input data signal RDATA in accordance with the PWM bus protocol. The data pulses are transmitted by the slave bus controller 108 to the master bus controller 110 along the bus line 12. The data pulses may represent the data segment DW requested by the read commands COMR. It should be noted that the input data signal SDATA is not being provided by the master bus controller 110 during the transmission of the input data signal RDATA by the slave bus controller 108.

Referring again to the master bus controller 110 shown in FIG. 12, the master bus controller 110 is configured to generate and store slave data images (referred to generically as elements 216 and specifically as elements 216W-216Z). The slave data images 216 approximately replicate slave data stored in memory devices of slave bus controllers coupled along the bus line 12. For example, the slave data image 216W is an approximate replica of the slave data 214 stored in the memory device 154 of the slave bus controller 108. Of course, the slave data images 216 may not be exact replicas. Errors in copying may occur regardless of error checking, which may result in slight differences. Not all updates to slave data (e.g., the slave data 214) may be provided to update the slave data images 216 and in any case cannot be provided instantaneously to the slave data images 216 in the memory device 202 of the master bus controller 110. Acceptable differences between the slave data images 216 and slave data 214 should be determined in accordance with acceptable error tolerances implicitly or explicitly defined by technical standards relevant to a particular application of the bus interface system 109.

The memory device 202 of the master bus controller 110 is configured so that memory addresses of each of the slave data images 216 correspond to memory addresses storing corresponding slave data in memory devices of the slave bus controllers. For example, the memory device 202 of the master bus controller 110 is configured so that memory addresses storing the slave data image 216W correspond to the memory addresses storing the slave data 214 in the memory device 154 of the slave bus controller 108. In this manner, the master bus controller 110 can simply read the slave data images 216 rather than send read command(s) every time that it needs to perform operations based on the slave data 214. Rather, the master bus controller 110 can perform the operation by simply looking up data segments within the slave data image 216W with memory addresses corresponding to the memory addresses of the memory device 154 with the relevant data segments DW. In one embodiment, the master bus controller 110 may request transmission of slave data from the slave bus controllers at start up in order to generate the slave data images 216. For instance, the master bus controller 110 may request transmission of slave data 214 from the slave bus controller 108 at start up in order to generate the slave data images 216.

Figure 13:
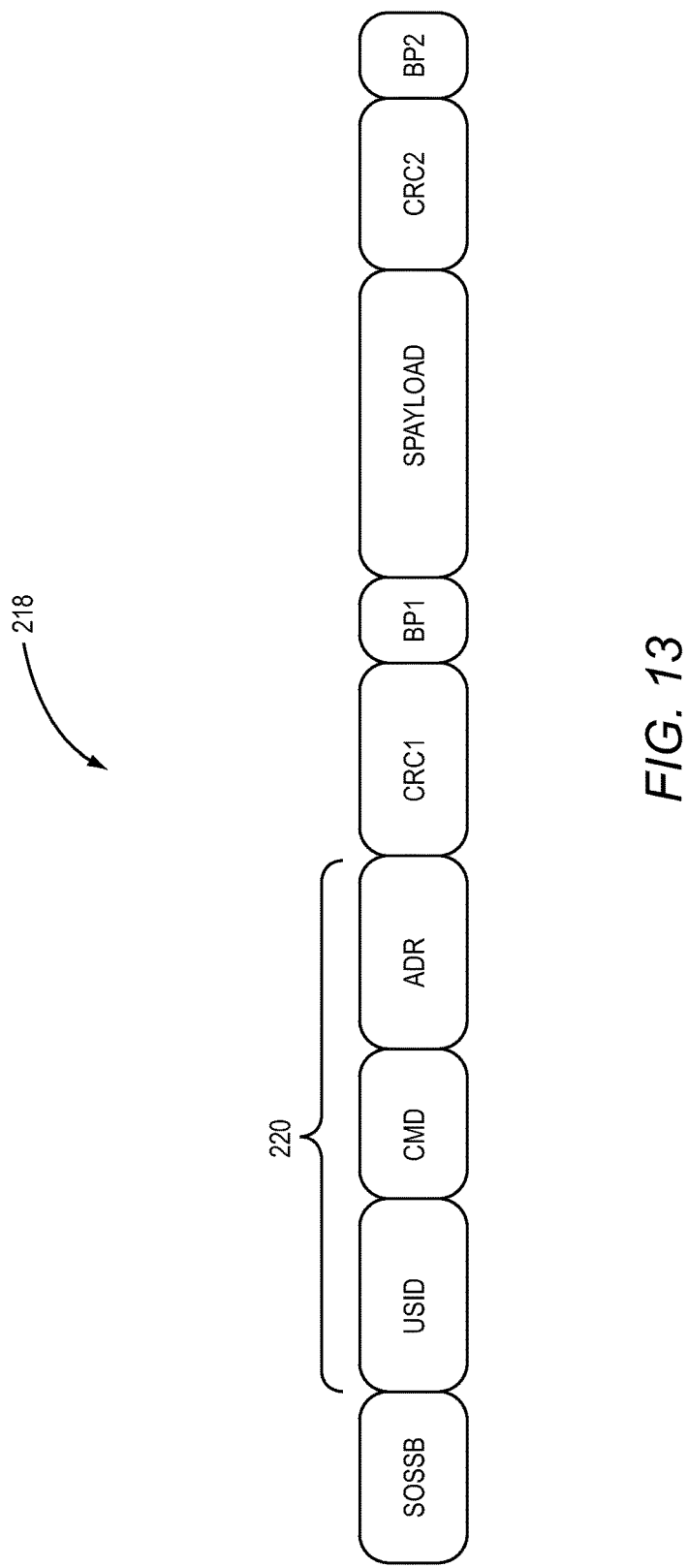
FIG. 13 illustrates an embodiment of a read data frame for the bus interface system shown in FIG. 12.

Referring now to FIGS. 12 and 13, FIG. 13 illustrates one embodiment of a read data frame 218 utilized by the bus interface system 109 shown in FIG. 12 to implement one of the read commands COMR. The read data frame 218 describes the organization of data pulses generated along the bus line 12 with the input data signal SDATA from the master bus controller 110 and with an input data signal (e.g., the input data signal RDATA) from one of the slave bus controllers in order to implement one of the read commands COMR. To implement a read bus operation described by the read command COMR, the data modulator 126 is configured to receive one of the read commands COMR from the FIFO memory buffer 200. For example, the FIFO memory buffer 200 provides the read command COM0 to the data modulator 126, which is the initial data command COM within the FIFO memory buffer 200. For the sake of explanation, it is presumed that the read command COM0 is for the slave bus controller 108. Thus, for the sake of explanation, the read data frame 218 will be described as an organization of data pulses generated along the bus line 12 with the input data signal SDATA from the master bus controller 110 and with the input data signal RDATA from a slave bus controller 108 in order to implement the read command COM0.

In this embodiment, the data modulator 126 of the master bus controller 110 begins the read data frame 218 by generating a sequence of data pulses within the input data signal SDATA along the bus line 12 in accordance with an SOS pulse pattern, as described in concurrently filed related U.S. patent application Ser. No. 14/659,292, entitled "START OF SEQUENCE DETECTION FOR ONE WIRE BUS." In an alternative embodiment, the read data frame 218 may be begun as described by FIG. 2 and the time slot TS[0]. The master bus controller 110 is configured to transmit this sequence of data pulses along the bus line 12 during an SOS subframe SOSSB, which is at the beginning of the read data frame 218. The sequence of data pulses includes a calibration data pulse, as described in concurrently filed related U.S. patent application Ser. No. 14/659,292, entitled "START OF SEQUENCE DETECTION FOR ONE WIRE BUS."

The data demodulator 208 of the slave bus controller 108 is configured to recognize that the sequence of data pulses transmitted along the bus line 12 has been provided in accordance with the SOS pulse pattern, also as described in concurrently filed related U.S. patent application Ser. No. 14/659,292, entitled "START OF SEQUENCE DETECTION FOR ONE WIRE BUS." In this manner, the data demodulator 208 of the slave bus controller 108 is configured to detect that the master bus controller 110 has started a new data frame, which in this example is the read data frame 218. The data demodulator 208 of the slave bus controller 108 is further configured to calibrate the decoder 10 in accordance with the calibration data pulse provided within the sequence of data pulses provided in accordance with the SOS pulse pattern, as described in concurrently filed related U.S. patent application Ser. No. 14/659,292, entitled "START OF SEQUENCE DETECTION FOR ONE WIRE BUS." As such, the data demodulator 208 is configured to clear the data frame registers 212 in response to recognizing that the sequence of data pulses has been provided in accordance with the SOS pulse pattern.

After the SOS subframe SOSSB, the read data frame 218 shown in FIG. 13 includes a command data frame segment 220. During the command data frame segment 220, the data modulator 126 of the master bus controller 110 is configured to generate a set of data pulses within the input data signal SDATA along the bus line 12 in accordance to a PWM bus protocol. This set of data pulses represents the command field CB of the data command COM. With respect to the read data frame 218, the data modulator 126 of the master bus controller 110 is configured to generate a set of data pulses along the bus line 12 within the input data signal SDATA representing one of the read commands COMR, which is made up of its command field CB. Continuing with the example for the read command COM0, during the command data frame segment 220, the data modulator 126 of the master bus controller 110 is configured to generate the set of data pulses along the bus line 12 representing the command field CB0 (and thus representing the read command COM0) in accordance with the PWM bus protocol.

The command data frame segment 220 includes a slave identifier subframe USID, a command identifier subframe CMD, and an address subframe ADR. During the slave identifier subframe USID, a subset of the data pulses generated by the data modulator 126 within the command data frame segment 220 represent the slave identifier subfield in the command field CB of the data command COM in accordance to the PWM bus protocol. With respect to the read data frame 218, the subset of the data pulses generated by the data modulator 126 during the slave identifier subframe USID represent the slave identifier subfield in the command field CB of one of the read commands COMR. For example, with regards to the read command COM0, the data modulator 126 of the master bus controller 110 is configured to generate the subset of the data pulses to represent the slave identifier subfield of the data command COM0. Assuming that the data command COM0 is for the slave bus controller 108, the slave identifier subfield of the command field CB0 would identify the slave bus controller 108 and thus the subset of data pulses would represent a slave identifier assigned to the slave bus controller 108.

The data modulator 126 is configured to generate a subset of the data pulses within command data frame segment 220 during the command identifier subframe CMD in accordance with the PWM bus protocol. The subset of the data pulses represents the command identifier subfield in the command field CB of the data command COM. With respect to the read data frame 218, the subset of the data pulses generated by the data modulator 126 during the command identifier subframe CMD represent the command identifier subfield in the command field CB of one of the read commands COMR. Continuing with the example for the read command COM0, the data modulator 126 of the master bus controller 110 is configured to generate the subset of the data pulses to represent the command identifier subfield in the command field CB0 of the data command COM0. The command identifier subfield may request different types of read commands such as a standard read command, or an extended read command.

During the address subframe ADR, the data modulator 126 of the master bus controller 110 is configured to generate a subset of the data pulses within the command data frame segment 220. The subset of the data pulses represents the address subfield in the command field CB of the data command COM in accordance to the PWM bus protocol. With respect to the read data frame 218, the subset of the data pulses generated by the data modulator 126 during the address subframe ADR represents the address subfield in the command field CB of one of the read commands COMR. For example, with regards to the read command COM0, the data modulator 126 of the master bus controller 110 is configured to generate the subset of the data pulses to represent the address subfield in the read command COM0. Assuming that the read command COM0 is for the slave bus controller 108, the address subfield of the command field CB0 would identify the memory address within the memory device 154 of the slave bus controller 108 being requested to be read by the master bus controller 110.

With regards to the slave bus controller 108, the decoder 10 in the data demodulator 208 of the slave bus controller 108 is operable to receive the set of data pulses in the input data signal SDATA that were transmitted during the command data frame segment 220. The decoder 10 of the data demodulator 208 is configured to decode the set of data pulses transmitted during the command data frame segment 220 into the decoded command field DCB in accordance with the PWM bus protocol. The decoded command field DCB is stored by the slave bus controller 108 within the data frame registers 212 of the data demodulator 208. Thus, the data demodulator 208 of the slave bus controller 108 is configured to generate the decoded command field DCB from the set of data pulses representing the read command COM0. The decoded command field in this example is thus a decoded read command generated from the set of data pulses representing the read command COM0, which were transmitted during the command data frame segment 220 of the read data frame 218.

Next, the read data frame 218 shown in FIG. 13 then includes the error code subframe CRC1. The error coding circuit ECCM shown in FIG. 12 within the data modulator 126 of the master bus controller 110 is configured to generate an error code CRCA based on the command field CB of the data command CM. With regards to the read commands COMR, the error coding circuit ECCM of the data modulator 126 is configured to generate the error code CRCA based on the command field CB of the particular read command COMR. For example, with regards to the read command COM0, the error coding circuit ECCM of the data modulator 126 is configured to generate the error code CRCA based on the command field CB0 and thus based on the read command COM0. In this embodiment, the error coding circuit ECCM is a cyclic redundancy code (CRC) generator and the error code CRCA is a CRC. The error coding circuit ECCM is thus configured to implement a CRC algorithm on the command field CB of the data command COM in order to generate the error code CRCA.

However, the error coding circuit ECCM may be any type of suitable coding circuit such as a parity code generator.

The error coding circuit ECCM in the data modulator 126 of the master bus controller 110 is configured to generate the error code CRCA based on the command field CM0 of the read command COM0. Thus, the error coding circuit ECCM is configured to implement the CRC algorithm on the read command COM0 in order to generate the error code CRCA. During the error code subframe CRC1, the data modulator 126 of the master bus controller 110 is configured to generate a set of data pulses along the bus line 12 within the input data signal SDATA representing the error code CRCA in accordance with the PWM bus protocol.

With regards to the slave bus controller 108, the decoder 10 in the data demodulator 208 of the slave bus controller 108 is operable to receive the set of data pulses within the input data signal SDATA transmitted during the error code subframe CRC1. As such, the decoder 10 of the data demodulator 208 in the slave bus controller 108 is configured to decode the set of data pulses representing the error code CRCA into the decoded error code DCRCA in accordance with the PWM bus protocol. The decoded error code DCRCA is also stored within the data frame registers 212. Additionally, the error detection circuit EDCS of the data demodulator 208 in the slave bus controller 108 is configured to generate the error code CRCSA based on the decoded command field DCB provided from the data frame registers 212. More specifically, the error detection circuit EDCS of the data demodulator 208 in the slave bus controller 108 is configured to generate the error code CRCSA based on the decoded command field DCB, which was decoded by the decoder 10 from the set of data pulses representing the read command COM0.

The error detection circuit EDCS is then configured to perform an error check on the decoded command field DCB by comparing the decoded error code DCRCA with the error code CRCSA. More specifically, the error detection circuit EDCS is operable to compare the decoded error code DCRCA with the error code CRCSA. Based on a correspondence between the decoded error code DCRCA and the error code CRCSA, the error detection circuit EDCS of the data demodulator 208 in the slave bus controller 108 detects whether there is an error in the decoded command field DCB. When the correspondence between the decoded error code DCRCA and the error code CRCSA has a specified relationship, no error is detected by the EDCS in the decoded command field DCB and the decoded command field DCB passes the error check. In one example, the error detection circuit EDCS is configured to compare the decoded error code DCRCA and the error code CRCSA to determine whether the decoded error code DCRCA and the error code CRCSA match. When the decoded error code DCRCA and the error code CRCSA match, the decoded command field DCB passes the error check. However, when the decoded error code DCRCA and the error code CRCSA do not match, then the decoded command field DCB fails the error check. For example, the error detection circuit EDCS of the data demodulator 208 in the slave bus controller 108 is configured to generate the error code CRCSA based on the decoded command field DCB, which should be a copy of the read command COM0. When the error code DCRCA and the error code CRCSA do not match, the decoded command field DCB fails the error check, and the decoded command field DCB is not an accurate copy of the read command COM0. However, when the error code DCRCA and the error code CRCSA match, the decoded command field DCB passes the error check. The decoded command field DCB is thus an accurate copy of the read command COM0. In this manner, the error detection circuit EDCS is configured to detect whether the set of data pulses representing the read command COM0 were decoded appropriately. In this embodiment, the error code circuit ECCM and the error detection circuit EDCS are configured to implement the same CRC algorithm. In alternative embodiments, the error code circuit ECCM and the error detection circuit EDCS are configured to implement the different CRC algorithms, and the correspondence between their results is known.

When the error detection circuit EDCS detects an error in the decoded command field DCB and the decoded command filed fails the error check, the slave bus controller 108 aborts the read command COM0. When no error is detected in the decoded command field DCB and the decoded command field DCB passes the error check, the decoded command field DCB and the read command COM0 match. As such, the decoded command field DCB will include a decoded slave identifier subfield that is a copy of the slave identifier subfield of the read command COM0 represented during the slave identifier subframe USID. The decoded command field DCB will include a decoded command identifier subfield that is a copy of the command identifier subfield of the read command COM0 represented during the command identifier subframe CMD. Thus, in this example, the decoded command identifier subfield requests a read bus operation. The decoded command field DCB will also include a decoded address subfield that is a copy of the address subfield of the read command COM0 represented during the address subframe ADR. When the decoded command field DCB fails the error check, the slave bus controller 108 aborts the read command COM0. The master bus controller 110 may recommunicate the read command COM0 or continue on to the next data command COM.

Referring again to FIGS. 12 and 13, after the error code subframe CRC1, the read data frame 218 includes a bus park subframe BP1. During a bus park subframe BP1, the data modulator 126 of the master bus controller 110 transfers control of the bus line 12 to the slave bus controller 108. The master bus controller 110 is thus configured to transfer control of the bus line 12 to the slave bus controller 108 after transmitting the set of data pulses representing the read command COM0 and the set of data pulses representing the error code CRCA. To transfer control of the bus line 12, the data modulator 126 is configured to generate the enable signal MEN so that the bidirectional buffer 132 allows the slave bus controller 108 to generate data pulses along the bus line 12 with the input data signal RDATA. In one embodiment, the master bus controller 110 is configured to begin the bus park subframe BP1 by dropping the input data signal SDATA to ground with a passive pull-down. A failing edge of input data signal SDATA begins an error tolerance window with a temporal duration of two standard time slots. After the falling edge of SDATA, the master bus controller 110 transfers control of the bus line 12 to the slave bus controller.

Once the bus park subframe BP1 ends, the master bus controller 110 monitors the bus line 12 during the error tolerance window to detect whether the slave bus controller is responsive. In this embodiment, the master bus controller 110 is configured to monitor the bus line 12 for another falling edge on the bus line 12 after transferring control to the slave bus controller 108. If the slave bus controller 108 generates the falling edge in the error tolerance window, then the master bus controller 110 deems that the slave bus controller 108 is operational, and the read data frame 218 continues. However, when no falling edge is provided, the master bus controller 110 determines that the slave bus controller 108 is stuck high or stuck low, and the master bus controller 110 is thus unresponsive. The master bus controller 110 sets a slave lock error status register high in its bus status registers. If the slave lock error status register is pulsed high, then the master bus controller 110 is configured to abort the read command COM0. Once the read command COM0 is aborted, the master bus controller 110 is configured to pull the bus line low so that a supply voltage of the slave bus controller 108 and any other slave bus controller is set to 0V. Accordingly, the slave bus controller 108 is reset.

Referring again to FIGS. 12 and 13, after the bus park subframe BP1, the read data frame has a slave payload subframe SPAYLOAD. During the slave payload subframe SPAYLOAD, the slave bus controller 108 is configured to generate a set of data pulses within the input data signal RDATA and along the bus line 12 that represent the particular data segment DW identified by the decoded read command, which in this example is the decoded command field DCB. More specifically, the data modulator 210 of the slave bus controller 108 is configured to generate the set of data pulses corresponding to the data segment DW identified by the decoded address subfield of the decoded read command, which in this example is the decoded command field DCB. The data modulator 210 generates the set of data pulses in accordance with the PWM bus protocol. With regards to the decoded read command for the read command COM0, the data modulator 210 of the slave bus controller 108 is configured to generate the set of the data pulses within the input data signal RDATA so that the set of data pulses represent the data segment DW identified by the address subfield of the decoded read command, which in this example is the decoded command field DCB.

The data demodulator 204 of the master bus controller 110 is operable to receive the set of data pulses within the input data signal RDATA that were transmitted during the slave payload subframe SPAYLOAD. The data demodulator 204 is configured to decode the set of data pulses into a decoded data segment DSDW in accordance with the PWM bus protocol. The decoded data segment DSDW is stored within the payload registers 206.

Referring again to FIGS. 12 and 13, the read data frame 218 then includes an error code subframe CRC2. To ensure accurate data transmission, the error coding circuit ECCS shown in FIG. 12 within the data modulator 210 of the slave bus controller 108 is configured to generate an error code CRCB based on the data segment DW identified by the decoded read command. For example, with regards to the data command COM0 (which is one of the read command COMR), the error coding circuit ECCS of the data modulator 210 is configured to generate the error code CRCB based on the data segment DW identified by the decoded address subfield, which is a copy of the address subfield of the read command COM0. In this embodiment, the error coding circuit ECCS is a CRC generator, and the error code CRCB is a CRC. The error coding circuit ECCS is thus configured to implement a CRC algorithm on the data segment DW identified by the decoded read command in order to generate the error code CRCB. Thus, in this embodiment, the error code CRCB is a CRC. However, the error coding circuit ECCS may be any type of suitable error coding circuit such as a parity code generator.

During the error code subframe CRC2, the data modulator 210 of the slave bus controller 108 is configured to generate a set of data pulses within the input data signal RDATA along the bus line 12 representing the error code CRCB in accordance with the PWM bus protocol. Accordingly, the data demodulator 204 of the master bus controller 110 is operable to receive the set of data pulses within the input data signal RDATA representing the CRCB. The data demodulator 204 in the master bus controller 110 is configured to decode the set of data pulses that were transmitted during the error code subframe CRC2 into a decoded error code DCRCB in accordance with the PWM bus protocol. The decoded error code DCRCB is stored within the payload registers 206.

The error detection circuit EDCM of the data demodulator 204 in the master bus controller 110 is configured to generate an error code CRCM based on the decoded data segment DSDW provided from the data frame registers 212. The error detection circuit EDCM may implement the same (or a different but related algorithm) as the error detection circuit ECCS of the slave bus controller 108 in order to generate the error code CRCM. In this embodiment, the error detection circuit EDCM is a CRC error detector and the error code CRCM is a CRC code.

The error detection circuit EDCM is then configured to perform an error check on the decoded data segment DSDW by comparing the decoded error code DCRCB with the error code CRCM. More specifically, the error detection circuit EDCM is operable to compare the decoded error code DCRCB with the error code CRCM. Based on a correspondence between the decoded error code DCRCB and the error code CRCM, the error detection circuit EDCM of the data demodulator 204 in the master bus controller 110 detects whether there is an error in the decoded data segment DSDW. When the correspondence between the decoded error code DCRCB and the error code CRCM has a specified relationship, no error is detected by the EDCM in the decoded data segment DSDW and the decoded data segment DSDW passes the error check. In one example, the error detection circuit EDCM is configured to compare the decoded error code DCRCB and the error code CRCM to determine whether the decoded error code DCRCB and the error code CRCM match. When the decoded error code DCRCB and the error code CRCM match, the decoded data segment DSDW passes the error check. However, when the decoded error code DCRCB and the error code CRCM don't match, then the decoded data segment DSDW fails the error check. For example, the error detection circuit EDCM of the data demodulator 204 in the master bus controller 110 is configured to generate the error code CRCM based on the decoded data segment DSDW, which should be a copy of the data segment DW. When the error code DCRCB and the error code CRCM do not match, the decoded data segment DSDW fails the error check, and the decoded data segment DSDW is not an accurate copy of the data segment DW. However, when the error code DCRCB and the error code CRCM match, the decoded data segment DSDW passes the error check. The decoded data segment DSDW is thus an accurate copy of the data segment DW. In this manner, the error detection circuit EDCM is configured to detect whether the set of data pulses representing data segment DW was decoded appropriately. In this embodiment, the error code circuit ECCM and the error detection circuit ECCS are configured to implement the same CRC algorithm. In alternative embodiments, the error code circuit ECCM and the error detection circuit ECCS are configured to implement the different CRC algorithms, and the correspondence between their results is known.

In response to the decoded error code DCRCB and if the error code and CRCM match (or have a specified relationship to one another), the data demodulator 204 is configured to store the decoded data word DSDW within the memory device 202. In this embodiment, the data demodulator 204 stores the decoded data word DSDW in the slave data image 216W for the slave bus controller 108. More specifically, the decoded word DSDW is stored within the slave data image 216W at a memory address that corresponds with the address data field of the read command COM0. The address data field identifies the memory address within the memory device 154 of the slave bus controller 108 storing the data segment requested by the read command COMR. As such, the decoded word DSDW is stored by the memory device 202 of the master bus controller 110 within the slave data image 216W at the memory address that corresponds to the memory address of the memory device 154 in the slave bus controller 108 that stores the data segment of the slave data 214 identified by the read command COM0. Using the read command COMR, the master bus controller 110 can create and maintain the slave data image 216W as an accurate replica of the slave data 214 within the memory device 154.

As shown in FIG. 13, a bus park subframe BP2 is provided at the end of the read data frame 218 and is used to give the master bus controller 110 control of the bus line 12. During the bus park subframe BP2, the master bus controller 110 is thus configured to generate the enable signal MEN such that the bidirectional buffer 132 allows the input data signal SDATA to be provided along the bus line 12.

Figure 14:
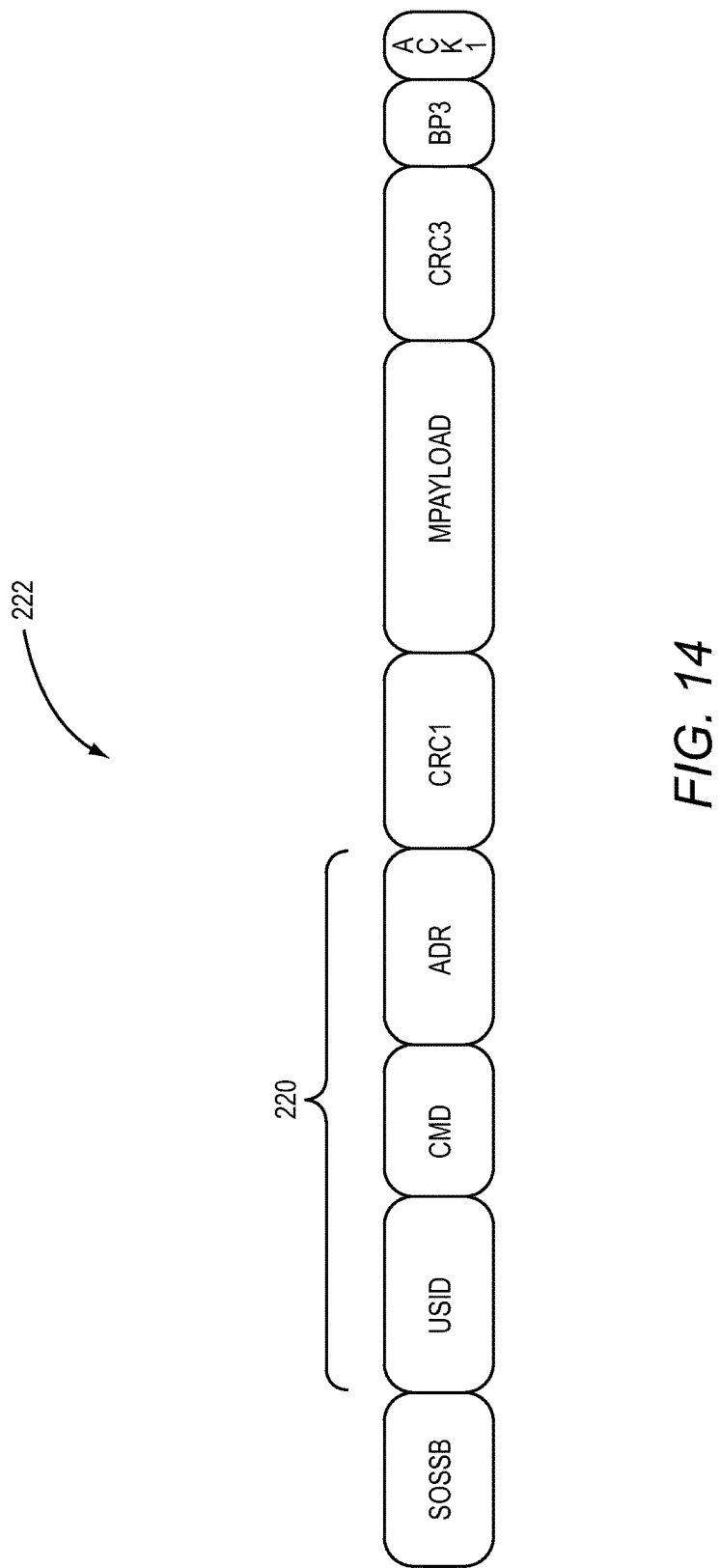
FIG. 14 illustrates an embodiment of a write data frame for the bus interface system shown in FIG. 12.

Referring now to FIGS. 12 and 14, FIG. 14 illustrates one embodiment of a write data frame 222 utilized by the bus interface system 109 shown in FIG. 12 to implement the write commands COMW. The write data frame 222 describes the organization of data pulses generated along the bus line 12 with the input data signal SDATA from the master bus controller 110 from a slave bus controller 108 in order to implement one of the write commands COMW with the bus interface system 109. To implement a write bus operation described by the write command COMW, the data modulator 126 is configured to receive the write command COMW from the FIFO memory buffer 200. For example, after the data command COM0, the FIFO memory buffer 200 provides the write command COM1 to the data modulator 126, which is one of the write command COMW. For the sake of explanation, it is presumed that the write command COM1 is for the slave bus controller 108.

The master bus controller 110 shown in FIG. 12 includes a shadow register circuit 224 that includes shadow registers 226. After receiving one of the write commands COMW, the data modulator 126 is configured to store the write command COMW within the shadow registers 226 of the shadow register circuit 224. As explained in further detail below, the master bus controller 110 does this in order to await an acknowledgement pulse from the slave bus controller (e.g., the slave bus controller 108) that indicates that an accurate copy of the payload segment MPB was stored within the slave data (e.g., the slave data 214) of the memory device (e.g., the memory device 154) referred to as the write command COMW. In response to the acknowledgement pulse, the shadow register circuit 224 provides the write command COMW to the memory device 202 which stores the payload segment MPB from the shadow registers 226 into the slave data image 216W.

For example, again assuming that the write command COM1 is for the slave bus controller 108, the data modulator 126 is configured to store the write command COM1 within the shadow registers 226 of the shadow register circuit 224. The shadow register circuit 224 waits for an acknowledgement pulse from the slave bus controller 108 that indicates that an accurate copy of the payload segment MPB1 was stored within the slave data 214 of the memory device 154. The shadow register circuit 224 then provides the write command COM1 to the memory device 202. The memory device 202 is configured to store the payload segment MPB1 within the memory address of the slave data image 216W that corresponds to the address subfield within the command field CB1 of the write command COM1.

The write data frame 222 describes an organization of data pulses generated along the bus line 12 with the input data signal SDATA by the master bus controller 110 in order to implement one of the write commands COMW. In this embodiment, the data modulator 126 of the master bus controller 110 begins the write data frame 222 by generating a sequence of data pulses within the input data signal SDATA along the bus line 12 in accordance with the SOS pulse pattern. In an alternative embodiment, the write data frame 222 may be begun as described by FIG. 2 and the time slot TS[0]. This sequence of data pulses is provided during an SOS subframe SOSSB at the beginning of the write data frame 222. The master bus controller 110 is configured to transmit this sequence of data pulses along the bus line 12 during the SOS subframe SOSSB, which is at the beginning of the write data frame 222. The sequence of data pulses includes a calibration data pulse.

The data demodulator 208 of the slave bus controller 108 is configured to recognize that the sequence of data pulses transmitted along the bus line 12 by the data modulator 126 of the master bus controller 110 has been provided in accordance with the SOS pulse pattern. In this manner, the data demodulator 208 of the slave bus controller can detect when the master bus controller 110 has started the write data frame 222. The data demodulator 208 of the slave bus controller 108 is further configured to calibrate the decoder 10 in accordance with the calibration data pulse in response to recognizing that the sequence of data pulses has been provided in accordance with the SOS pulse pattern. As such, the data demodulator 208 is configured to clear the data frame registers 212 in response to recognizing that the sequence of data pulses transmitted along the bus line 12 by the data modulator 126 of the master bus controller 110 has been provided in accordance with the SOS pulse pattern.

After the SOS subframe SOSSB, the write data frame 222 includes the command data frame segment 220, which was described above with respect to FIGS. 12 and 13. However, with respect to the write data frame 222, the data modulator 126 of the master bus controller 110 is configured to generate a set of data pulses within the input data signal SDATA along the bus line 12 representing one of the command field CB. For example, with regards to the write command COM1, the data modulator 126 of the master bus controller 110 is configured to generate the set of data pulses along the bus line 12 representing the command field CB1.

As explained above, the command data frame segment 220 shown in FIG. 14 includes the slave identifier subframe USID, the command identifier subframe CMD, and the address subframe ADR. With respect to the write data frame 222, for example, with regards to the write command COM1, the data modulator 126 of the master bus controller 110 is configured to generate the subset of the data pulses to represent the slave identifier subfield in the command field CB1 of the write command COM1. Assuming that the write command COM1 is for the slave bus controller 108, the slave identifier subfield of the command field CB1 would identify the slave bus controller 108, and thus the subset of data pulses would represent a slave identifier of the slave bus controller 108.

During the command identifier subframe CMD, a subset of the data pulses generated by the data modulator 126 within the command data frame segment 220 represents the command identifier subfield in the command field CB of the data command COM in accordance to a PWM bus protocol. With respect to the write data frame 222, the subset of the data pulses generated by the data represents the command identifier subfield in the command field CB of one of the write commands COMW. For example, with regards to the write command COM1, the data modulator 126 of the master bus controller 110 is configured to generate the subset of the data pulses to represent the command identifier subfield in the command field CB1 of the write command COM1. The command identifier subfield may request different types of individual write commands to a specific slave bus controller. For the sake of explanation, the write command COM1 is presumed to be specifically for the slave bus controller 108.

With respect to the write data frame 222, the data modulator 126 of the master bus controller 110 is configured to generate a subset of the data pulses within the command data frame segment 220 representing the address subfield in the command field CB of one of the write commands COMW. For example, with regards to the write command COM1, the data modulator 126 of the master bus controller 110 is configured to generate the subset of the data pulses to represent the address subfield in the command field CB1 of the write command COM1. Assuming that the write command COM1 is for the slave bus controller 108, the address subfield of the command field CB1 would identify the memory address within the memory device 154 of the slave bus controller 108 being requested to be written to by the master bus controller 110.

With regards to the write commands COMW, the error coding circuit ECCM shown in FIG. 12 within the data modulator 126 of the master bus controller 110 is configured to generate the error code CRCA based on the command field CB of one of the write commands COMW. For example, with regards to the write command COM1, the error coding circuit ECCM of the data modulator 126 is configured to generate the error code CRCA based on the command field CB1. The write data frame 222 also includes the error code subframe CRC1 shown in FIG. 14. During the error code subframe CRC1, the data modulator 126 of the master bus controller 110 is configured to generate a set of data pulses along the bus line 12 within the input data signal SDATA representing the error code CRCA.

As such, the decoder 10 in the data demodulator 208 of the slave bus controller 108 is operable to receive the set of data pulses in the input data signal SDATA that was transmitted during the command data frame segment 220. The decoder 10 of the data demodulator 208 is configured to decode this set of data into a decoded command field DCB in accordance with the PWM bus protocol. The decoded command field DCB is stored within the data frame registers 212. For example, with regards to the write command COM1 (which is one of the write commands COMW), the data demodulator 208 of the slave bus controller 108 is configured to generate the decoded command field DCB that was decoded from the set of data pulses in the input data signal SDATA representing the command field CB1 of the write command COM1.

The decoder 10 in the data demodulator 208 of the slave bus controller 108 is also operable to receive the set of data pulses within the input data signal SDATA that were transmitted during the error code frame CRC1. As such, the decoder 10 of the data demodulator 208 in the slave bus controller 108 is configured to decode the set of data pulses representing the error code CRCA into the decoded error code DCRCA in accordance with the PWM bus protocol. The decoded error code DCRCA is also stored within the data frame registers 212. Additionally, the error detection circuit EDCS of the data demodulator 208 in the slave bus controller 108 is configured to generate the error code CRCSA based on the decoded command field DCB provided from the data frame registers 212. For example, with regards to the write command COM1, the error detection circuit EDCS of the data demodulator 208 in the slave bus controller 108 is configured to generate the error code CRCSA based on the decoded command field DCB that was decoded from the set of data pulses representing the set of data pulses in the input data signal SDATA representing the command field CB1 of the write command COM1.

The error detection circuit EDCS is then configured to perform an error check on the decoded command field DCB by comparing the decoded error code DCRCA with the error code CRCSA. More specifically, the error detection circuit EDCS is then configured to compare the decoded error code DCRCA with the error code CRCSA. By comparing the decoded error code DCRCA with the error code CRCSA, the error detection circuit EDCS of the data demodulator 208 in the slave bus controller 108 detects whether there is an error in the decoded command field DCB. For example, when the decoded error code DCRCA and the error code CRCSA match (or have a specified relationship to one another), then no error is detected in the decoded command field DCB. As such, the error check is passed by the decoded command field DCB. However, when the decoded error code DCRCA and the error code CRCSA do not match (or do not have the specified relationship to one another) then an error is detected. As such, the decoded command field DCB fails the error check. For example, for the write command COM1 (which is one of the write commands COMW), the error detection circuit EDCS of the data demodulator 208 in the slave bus controller 108 is configured to generate the error code CRCSA based on the decoded command field DCB, which should be a copy of the command field CB1 of the data command CM1. When the error code DCRCA and the error code CRCSA do not match, the decoded command field DCB fails the error check. In this manner, the error detection circuit EDCS is configured to detect whether the set of data pulses representing the command field CB1 were decoded appropriately.

When the error detection circuit EDCS detects an error in the decoded command field DCB and the error check has failed, the slave bus controller 108 aborts the write command COMW. When no error is detected in the decoded command field DCB and the error check is passed, then the decoded command field DCB and the command field CB of the write command COMW match. As such, the decoded command field DCB will include a decoded slave identifier subfield that is a copy of the slave identifier subfield of the command field CB represented during the slave identifier subframe USID. The decoded command field DCB will include a decoded command identifier subfield that is a copy of the command identifier subfield of the command field CB represented during the command identifier subframe CMD. Thus, in this example, the decoded command identifier subfield requests the write bus operation. The decoded command field DCB will also include a decoded address subfield that is a copy of the address subfield of the command field CB represented during the address subframe ADR. When the decoded slave identifier subfield in the decoded command field DCB does not identify the slave bus controller 108 (but rather another slave bus controller or has an error), the slave bus controller 108 ignores the remainder of the write data frame 222. However, when the decoded slave identifier subfield in the decoded command field DCB does identify the slave bus controller 108, the slave bus controller 108 prepares for the payload segment MPB from the master bus controller 110 to be written to the memory address identified by the decoded address field of the decoded command field DCB.

Referring again to FIGS. 12 and 14, after the error code subframe CRC1, the write data frame 222 has a master payload subframe MPAYLOAD. During the master payload subframe MPAYLOAD, the master bus controller 110 is configured to generate a set of data pulses along the bus line 12 within the input data signal SDATA representing the payload segment MPB of one of the write commands. More specifically, the data modulator 126 of the master bus controller 110 is configured to generate a set of data pulses along the bus line 12 within the input data signal SDATA representing the payload segment MPB of one of the write commands COMW. The data modulator 126 generates the set of data pulses in accordance with the PWM bus protocol. With regards to the write command COM1, the data modulator 126 of the master bus controller 110 is configured to generate the set of the data pulses within the input data signal SDATA so that the set of data pulses represent the payload segment MPB1. The data demodulator 208 of the slave bus controller 108 is operable to receive the set of data pulses within the input data signal SDATA that were transmitted during the master payload subframe MPAYLOAD. The decoder 10 in the data demodulator 208 of the slave bus controller 108 is configured to decode the set of data pulses into a decoded payload segment DMPB. The data frame registers 212 are configured to store the decoded payload segment DMPB.

For the write command COMW being communicated during the write data frame 222, the error coding circuit ECCM shown in FIG. 12 within the data modulator 126 of the master bus controller 110 is configured to generate an error code CRCC based on the payload segment MPB of the write command COMW. To generate the error code CRCC, the error coding circuit ECCM within the data modulator 126 of the master bus controller 110 is configured to implement an error check algorithm on the payload segment MPB. In this embodiment, the error code CRCC is a CRC since the error coding algorithm implemented by the error coding circuit ECCM is the CRC algorithm discussed above. However, as explained above, alternative embodiments of the error coding circuit ECCM may be any suitable type of error coding generator capable of allowing the bus interface system 109 to maintain bus errors within error tolerances applicable to a particular application of the bus interface system 109. Therefore, alternative the error code CRCC may be any type of error code generated by such error coding generators, such as a parity code generator. With regards to the write command COM1 (which is one of the write commands COMW), the error coding circuit ECCM of the data modulator 126 is configured to generate the error code CRCC based on the payload segment MPB1 and thus based on the write command COM1. Thus, the error coding circuit ECCM shown in FIG. 12 is configured to implement the CRC algorithm on the payload segment MPB1 in order to generate the error code CRCC.

Next, the write data frame 222 shown in FIG. 14 includes an error code subframe CRC3. During the error code subframe CRC3, the data modulator 126 of the master bus controller 110 is configured to generate a set of data pulses in the input data signal SDATA along the bus line 12 representing the error code CRCC in accordance with the PWM bus protocol. The decoder 10 in the data demodulator 208 of the slave bus controller 108 is operable to receive the set of data pulses within the input data signal SDATA that were transmitted during the error code frame CRC3. As such, the decoder 10 of the data demodulator 208 in the slave bus controller 108 is configured to decode the set of data pulses representing the error code CRCC into the decoded error code DCRCC in accordance with the PWM bus protocol. The decoded error code DCRCC is also stored within the data frame registers 212. Additionally, the error detection circuit EDCS of the data demodulator 208 in the slave bus controller 108 is configured to generate the error code CRCSC based on the decoded payload segment DMPB provided from the data frame registers 212. For example, with regards to the write command COM1 (which is one of the write commands COMW), the error detection circuit EDCS of the data demodulator 208 in the slave bus controller 108 is configured to generate the error code CRCSC based on the decoded payload segment DMPB that was decoded from the set of data pulses transmitted during the error code frame CRC3. More specifically, the error detection circuit EDCS of the data demodulator 208 implements the CRC algorithm on the decoded payload segment DMPB to generate the error code CRCSC. In this embodiment, the error code CRCSC is a CRC. However, alternative embodiments of the error coding circuit EDCS may be provided as any suitable type of error coding generator capable of allowing the bus interface system 109 to maintain bus errors within error tolerances applicable to a particular application of the bus interface system 109. Therefore, in alternative embodiments, the error code CRCSC may be any type of error code generated by such error coding generators, such as a parity code. As such, the error detection circuit EDCS is configured to detect whether the set of data pulses representing the payload segment MPB1 of the write command COM1 were decoded appropriately by the slave bus controller 108.

The error detection circuit EDCS is then configured to perform an error check on the decoded payload segment DMPB by comparing the decoded error code DCRCC with the error code CRCSC. More specifically, the error detection circuit EDCS is configured to compare the decoded error code DCRCC with the error code CRCSC. By comparing the decoded error code DCRCC with the error code CRCSC, the error detection circuit EDCS of the data demodulator 208 in the slave bus controller 108 detects whether there is an error in the decoded payload segment DMPB. For example, when the decoded error code DCRCC and the error code CRCSC match (or have a specified relationship to one another), then no error is detected in the decoded payload segment DMPB. As such, the error check is passed by the decoded payload segment DMPB. However, when the decoded error code DCRCC and the error code CRCSC do not match (or do not the specified relationship to one another) then an error is detected. As such, the decoded payload segment DMPB fails the error check.

When no error is detected in the decoded payload segment DMPB and the error check is passed, the slave bus controller 108 is configured to store the decoded payload segment DMPB with the memory device 154. More specifically, the data demodulator 208 is configured to pass the decoded command filed DCB and the decoded payload segment DMPB to the memory device 154. The memory device 154 is then operable to store the decoded payload segment DMPB in the slave data 214 at the memory address of the memory device 154 that is identified by the decoded address subfield of the decoded command field DCB. When an error is detected in the decoded payload segment DMPB and the error check fails, the slave bus controller 108 does not store the decoded payload segment DMPB in the slave data 214 of the memory device 154.

Referring again to FIGS. 12 and 14, after the error code subframe CRC3, the write data frame 222 includes a bus park subframe BP3. During a bus park subframe BP3, the data modulator 126 of the master bus controller 110 transfers control of the bus line 12 to the slave bus controller 108. The data modulator 126 is configured to generate the enable signal MEN so that the bidirectional buffer 132 allows the slave bus controller 108 to communicate along the bus line 12.

The write data frame 222 shown in FIG. 14 then includes an acknowledgement subframe ACK1. The slave bus controller 108 shown in FIG. 12 includes an acknowledge generator 228 configured to generate an acknowledgement signal ACK along the bus line 12 within the acknowledgement subframe ACK1. In response to the decoded payload segment DMPB passing the error check, the acknowledge generator 228 of the slave bus controller 108 is configured to generate the acknowledgment signal ACK along the bus line 12 so that the acknowledgement signal ACK indicates that the decoded payload segment DMPB passed the error check.

In the embodiment shown in FIG. 12, when no error is detected in the decoded payload segment DMPB and the error check is passed, the error detection circuit EDCS is configured to generate an error status signal 230 so that the error status signal 230 indicates that the decoded payload segment DMPB passed the error check. The acknowledge generator 228 of the slave bus controller 108 is configured to receive the error status signal 230 from the error detection circuit EDCS. In the embodiment shown in FIG. 12, the acknowledge generator 228 is configured to generate an acknowledgement pulse along the bus line within the acknowledgement signal ACK in response to the error status signal 230 indicating that the decoded payload segment DMPB passed the error check.

The shadow register circuit 224 of the master bus controller 110 is coupled to the bus line 12 and is configured to receive the acknowledgement signal ACK during the acknowledgement subframe ACK1. In response to the acknowledgment signal ACK indicating that the decoded payload segment DMPB passed the error check, the master bus controller 110 is configured to store the payload segment MPB1 of the data command COM1 in the memory device 202. More specifically, the shadow register circuit 224 is configured to pass the payload segment MPB1 stored within the shadow registers 226 to the memory device 202. The memory device 202 is configured to store the payload segment MPB1 within the slave data image 216W at the memory address identified by the address subfield of the command field CB1. In this embodiment, the shadow register circuit 224 is configured to pass the payload segment MPB1 to the memory device 202 in response to receiving the acknowledgement pulse along the bus line 12 during the acknowledgement subframe ACK1. The acknowledgement pulse within the acknowledgement signal ACK is a trigger pulse. The shadow register circuit 224 is triggered to pass the write command COM1 (which includes the payload segment MPB1) to the memory device 202 in response to receiving the acknowledgement pulse along the bus line 12 during the acknowledgement subframe ACK1.

Since the memory addresses of the slave data image 216W corresponds to the memory addresses of the slave data 214, the payload segment MPB1 is stored at the memory address of the slave data image 216W that corresponds to the memory address of the slave data 214. Note that when the decoded payload segment DMPB passes the error check, the decoded master payload is a copy of the payload segment MPB1 of the data command COM1. Accordingly, the slave data image 216W is updated at the relevant memory address. Furthermore, the master bus controller 110 does not need to use another read command to obtain the slave data 214 at the corresponding memory address of the memory device 154 of the slave bus controller 108. Rather, the slave data image 216W includes an accurate copy within the slave data image 216W.

In response to the decoded payload segment DMPB failing the error check, the acknowledge generator 228 of the slave bus controller 108 is configured to not generate the acknowledgment signal ACK along the bus line 12 so that the acknowledgement signal ACK indicates that the decoded payload segment DMPB failed the error check. In the embodiment shown in FIG. 12, when the decoded payload segment DMPB fails the error check, the error detection circuit EDCS is configured to generate the error status signal 230 so that the error status signal 230 indicates that the decoded payload segment DMPB failed the error check. The acknowledge generator 228 shown in FIG. 12 is configured so as not to provide the acknowledgement pulse along the bus line 12 during the acknowledgement subframe ACK1 when the error status signal 230 indicates that the decoded payload segment DMPB failed the error check. When the master bus controller 110 does not receive the acknowledgement pulse and thus the acknowledgement signal ACK indicates that the decoded payload segment DMPB failed the error check, the master bus controller 110 may either retry communicating the write command COM1 during a subsequent data frame, implement the next data command COM, or shut down the slave bus controller 108.

As discussed above, the master bus controller 110 is a bridge bus controller that translates a data frame formatted in accordance with a first bus protocol (e.g., the MIPI bus protocol) into the data frames formatted in accordance with the PWM bus protocol. The MIPI RFFE state machine 124 of the master bus controller 110 may receive the input data signal MDATA along the bus line 134 so that the input data signal MDATA represents a read command during the data frame formatted in accordance with the first bus protocol. The MIPI RFFE state machine 124 thus decodes the input data signal MDATA into the read command. The read command may identify the slave bus controller 108 and a memory address of the slave data 214 within the memory device 154 of the slave bus controller 108 to be read. However, instead of placing another read command COMR into the FIFO memory buffer 200, the MIPI RFFE state machine 124 of the master bus controller 110 is configured to obtain a data segment of the slave data image 216W corresponding to the slave bus controller 108 and the memory address of the slave data 214 identified by the read command. The MIPI RFFE state machine 124 may then transmit an input data signal (not shown explicitly) along the MDATA line 134 that represents the data segment from the slave data image 216W. For example, if the read command decoded by the MIPI RFFE state machine 124 identified the slave bus controller 108 and the same memory address of the slave data 214 as the read command COM0, the memory address identified by the read command decoded by the MIPI RFFE state machine 124 would also correspond to the memory address storing the decoded data segment DSDW. In response to the read command decoded by the MIPI RFFE state machine 124, the MIPI RFFE state machine 124 is configured to obtain the decoded data segment DSDW stored at the corresponding memory address of the slave data image 216W of the memory device 202. The MIPI RFFE state machine 124 is configured to transmit the input data signal along the MDATA line 134 representing the decoded data segment DSDW in accordance with the first bus protocol (e.g., the MIPI bus protocol). Similarly, if the read command decoded by the MIPI RFFE state machine 124 identified the slave bus controller 108 and the same memory address of the slave data 214 as the as the write command COM1, the MIPI RFFE state machine 124 is configured to obtain the payload segment MPB1 stored at the corresponding memory address of the slave data image 216W. The MIPI RFFE state machine 124 may then transmit the input data signal along the MDATA line 134 representing the decoded data segment DSDW in accordance with the first bus protocol (e.g., the MIPI bus protocol). In this manner, the master bus controller 110 does not need to use another read command to obtain the slave data 214 at the corresponding memory address of the memory device 154 of the slave bus controller 108.

Figure 15:
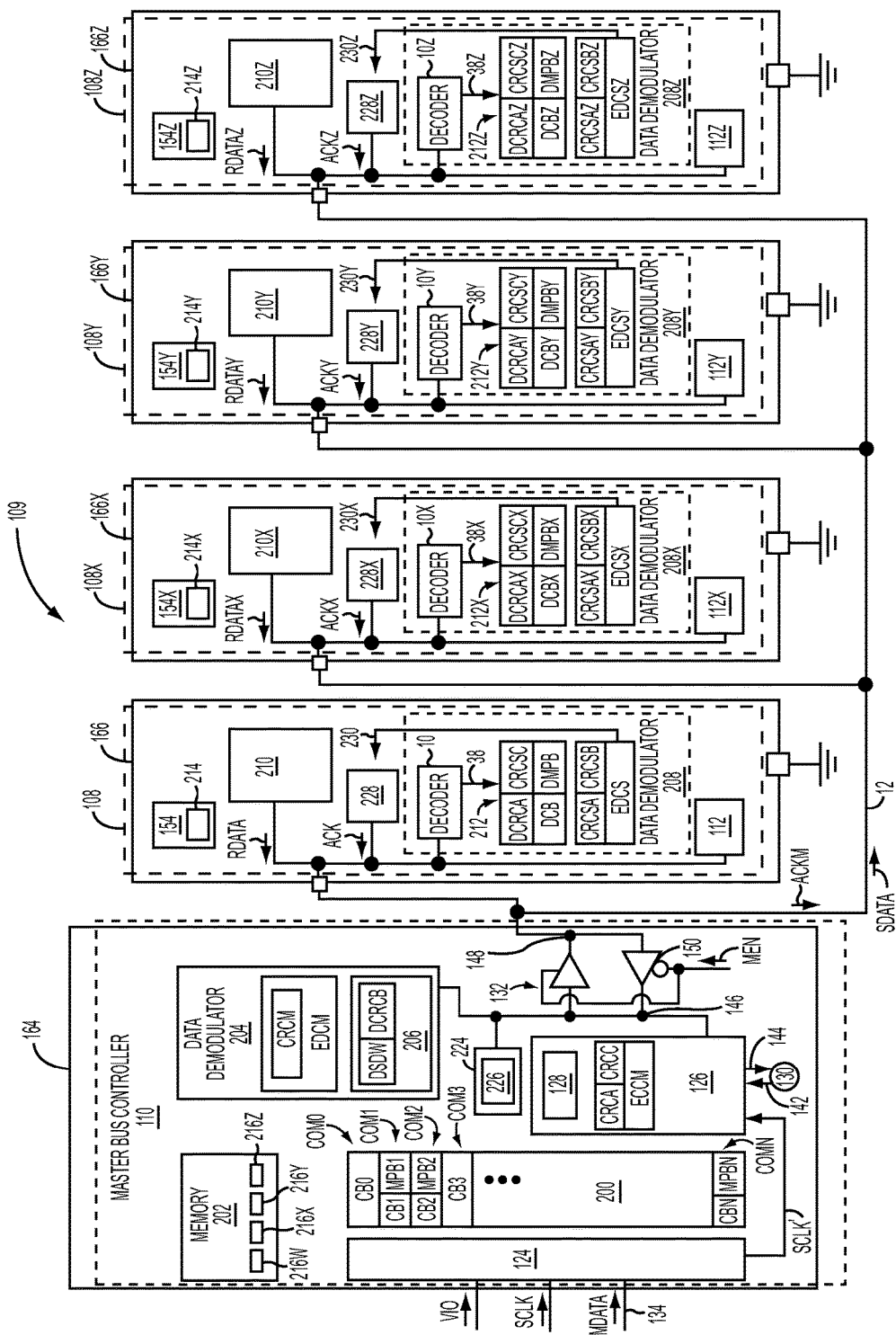
FIG. 15 illustrates another embodiment of the bus interface system having an embodiment of the master bus controller and embodiments of slave bus controllers, wherein the slave bus controllers are configured to operate in a round robin acknowledgment configuration.

FIG. 15 illustrates another embodiment of the bus interface system 109. The bus interface system 109 includes the same embodiment of the master bus controller 110 shown in FIG. 12 and the same embodiment of the slave bus controller 108 shown in FIG. 12. However, in this embodiment, the bus interface system 109 further includes a slave bus controller 108X formed on the IC package 166X, a slave bus controller 108Y formed on the IC package 166Y, and a slave bus controller 108Z formed on the IC package 166Z. The slave bus controller 108X is coupled to the bus line 12 between the slave bus controller 108 and the slave bus controller 108Y. The slave bus controller 108Y is coupled to the bus line 12 between the slave bus controller 108X and the slave bus controller 108Z. Finally, the slave bus controller 108Z is coupled to the bus line 12 next to the slave bus controller 108Y. The slave bus controllers 108, 108X, 108Y, and 108Z are thus operable to receive the input data signal SDATA from the master bus controller 110 along the bus line 12. In this embodiment, no other bus line is provided in the bus interface system 109 to connect the master bus controller 110 and the slave bus controllers 108, 108X, 108Y, and 108Z. Each of the slave bus controllers 108, 108X, 108Y, and 108Z is assigned a unique slave identifier.

The slave bus controller 108X includes a data demodulator 208X, a data modulator 210X, and the power conversion circuitry 112X. The power conversion circuitry 112X may be provided in accordance with any of the embodiments described above. The power conversion circuitry 112X may also be provided as described in concurrently filed related U.S. patent application Ser. No. 14/659,371, entitled "POWER MANAGEMENT SYSTEM FOR A BUS INTERFACE SYSTEM," hereby incorporated herein by reference in its entirety. In this embodiment, the power conversion circuitry 112X is identical to the power conversion circuitry 112 in the slave bus controller 108.

With regards to the data demodulator 208X, the data demodulator 208X of the slave bus controller 108X includes a decoder 10X, data frame registers 212X, and an error detection circuit EDCSX. The decoder 10X is configured to decode the data pulses of the input data signal SDATA from the master bus controller 110 in accordance with the PWM bus protocol as described above. It should be noted furthermore that the data demodulator 208X of the slave bus controller 108X and the decoder 10X may also be configured to recognize the sequence of data pulses within the input data signal SDATA provided in accordance with the SOS pulse pattern. In this embodiment, the data demodulator 208X is identical to the data demodulator 208 of the slave bus controller 108, except that the data demodulator 208X has a different slave identifier, as described in concurrently filed related U.S. patent application Ser. No. 14/659,292, entitled "START OF SEQUENCE DETECTION FOR ONE WIRE BUS." Furthermore, the decoder 10X can also be calibrated as described in concurrently filed related U.S. patent application Ser. No. 14/659,292, entitled "START OF SEQUENCE DETECTION FOR ONE WIRE BUS."

As shown in FIG. 15, the data demodulator 208X of the slave bus controller 108X includes data frame registers 212X configured to receive the memory input signal 38X from the decoder 10X. In this manner, the data frame registers 212X store the data bits decoded by the decoder 10X as result of the data pulses within the input data signal SDATA from the master bus controller 110. The data demodulator 208X is explained in further detail below.

As shown in FIG. 15, the memory device 154X is configured to store slave data 214X. The slave data 214X includes data segments and memory addresses of the memory device 154X locating the data segments DW within the slave data 214X. Thus, each of the data segments is located within the slave data 214X at one of the memory addresses.

Furthermore, the slave bus controller 108X further includes the data modulator 210X. In this embodiment, the data modulator 210X is identical to the data modulator 210 of the slave bus controller 108. The data modulator 210X is operably associated with the memory device 154X of the slave bus controller 108X. The data modulator 210X of the slave bus controller 108X is configured to generate an input data signal RDATAX along the bus line 12 in accordance with the PWM bus protocol. For example, to implement one of the read commands COMR for the slave bus controller 108X, the data modulator 210X of the slave bus controller 108X may generate data pulses along the bus line 12 within the input data signal RDATAX representing the data segment within the slave data 214X that is requested by the read command COMR. The data pulses are transmitted by the slave bus controller 108X to the master bus controller 110 along the bus line 12. It should be noted that the input data signal SDATA is not being provided by the master bus controller 110 during the transmission of the input data signal RDATAX by the slave bus controller 108X. The memory device 202 of the master bus controller 110 is configured to store the slave data image 216X. The slave data image 216X is approximately a replica of the slave data 214X. In this manner, the master bus controller 110 can utilize the slave data image 216X stored within the memory device 202 rather than implementing read commands in order to obtain the data segments from the memory device 154X of the slave bus controller 108X. The master bus controller 110 creates and updates the slave data image 216X in the same manner as described above for the slave data image 216W stored for the memory device 154 of the slave bus controller 108.

The slave bus controller 108Y includes a data demodulator 208Y, a data modulator 210Y, and the power conversion circuitry 112Y. The power conversion circuitry 112Y may be provided in accordance with any of the embodiments described above. The power conversion circuitry 112Y may also be provided as described in concurrently filed related U.S. patent application Ser. No. 14/659,371, entitled "POWER MANAGEMENT SYSTEM FOR A BUS INTERFACE SYSTEM," hereby incorporated herein by reference in its entirety. In this embodiment, the power conversion circuitry 112Y is identical to the power conversion circuitry 112 in the slave bus controller 108.

With regards to the data demodulator 208Y, the data demodulator 208Y of the slave bus controller 108Y includes a decoder 10Y, data frame registers 212Y, and an error detection circuit EDCSY. The decoder 10Y is configured to decode the data pulses of the input data signal SDATA from the master bus controller 110 in accordance with the PWM bus protocol as described above. It should be noted furthermore that the data demodulator 208Y of the slave bus controller 108Y and the decoder 10Y may also be configured to recognize the sequence of data pulses within the input data signal SDATA provided in accordance with the SOS pulse pattern. In this embodiment, the data demodulator 208Y is identical to the data demodulator 208 of the slave bus controller 108, except that the data demodulator 208Y has a different slave identifier, as described in concurrently filed related U.S. patent application Ser. No. 14/659,292, entitled "START OF SEQUENCE DETECTION FOR ONE WIRE BUS." Furthermore, the decoder 10Y can also be calibrated as described in concurrently filed related U.S. patent application Ser. No. 14/659,292, entitled "START OF SEQUENCE DETECTION FOR ONE WIRE BUS."

As shown in FIG. 15, the data demodulator 208Y of the slave bus controller 108Y includes data frame registers 212Y configured to receive the memory input signal 38Y from the decoder 10Y. In this manner, the data frame registers 212Y store the data bits decoded by the decoder 10Y as result of the data pulses within the input data signal SDATA from the master bus controller 110. The data demodulator 208Y is explained in further detail below.

As shown in FIG. 15, the memory device 154Y is configured to store slave data 214Y. The slave data 214Y includes data segments and memory addresses of the memory device 154Y locating the data segments DW within the slave data 214Y. Thus, each of the data segments is located within the slave data 214Y at one of the memory addresses.

Furthermore, the slave bus controller 108Y further includes the data modulator 210Y. In this embodiment, the data modulator 210Y is identical to the data modulator 210 of the slave bus controller 108. The data modulator 210Y is operably associated with the memory device 154Y of the slave bus controller 108Y. The data modulator 210Y of the slave bus controller 108Y is configured to generate an input data signal RDATAY along the bus line 12 in accordance with the PWM bus protocol. For example, to implement one of the read commands COMR for the slave bus controller 108Y, the data modulator 210Y of the slave bus controller 108Y may generate data pulses along the bus line 12 within the input data signal RDATAY representing the data segment within the slave data 214Y that is requested by the read command COMR. The data pulses are transmitted by the slave bus controller 108Y to the master bus controller 110 along the bus line 12. It should be noted that the input data signal SDATA is not being provided by the master bus controller 110 during the transmission of the input data signal RDATAY by the slave bus controller 108Y. The memory device 202 of the master bus controller 110 is configured to store the slave data image 216Y. The slave data image 216Y is approximately a replica of the slave data 214Y. In this manner, the master bus controller 110 can utilize the slave data image 216Y stored within the memory device 202 rather than implementing read commands in order to obtain the data segments from the memory device 154Y of the slave bus controller 108Y. The master bus controller 110 creates and updates the slave data image 216Y in the same manner as described above for the slave data image 216W stored for the memory device 154 of the slave bus controller 108.

The slave bus controller 108Z includes a data demodulator 208Z, a data modulator 210Z, and the power conversion circuitry 112Z. The power conversion circuitry 112Z may be provided in accordance with any of the embodiments described above. The power conversion circuitry 112Z may also be provided as described in concurrently filed related U.S. patent application Ser. No. 14/659,371, entitled "POWER MANAGEMENT SYSTEM FOR A BUS INTERFACE SYSTEM," hereby incorporated herein by reference in its entirety. In this embodiment, the power conversion circuitry 112Z is identical to the power conversion circuitry 112 in the slave bus controller 108.

With regards to the data demodulator 208Z, the data demodulator 208Z of the slave bus controller 108Z includes a decoder 10Z, data frame registers 212Z, and an error detection circuit EDCSZ. The decoder 10Z is configured to decode the data pulses of the input data signal SDATA from the master bus controller 110 in accordance with the PWM bus protocol as described above. It should be noted furthermore that the data demodulator 208Z of the slave bus controller 108Z and the decoder 10Z may also be configured to recognize the sequence of data pulses within the input data signal SDATA provided in accordance with the SOS pulse pattern. In this embodiment, the data demodulator 208Z is identical to the data demodulator 208 of the slave bus controller 108, except that the data demodulator 208Z has a different slave identifier, as described in concurrently filed related U.S. patent application Ser. No. 14/659,292, entitled "START OF SEQUENCE DETECTION FOR ONE WIRE BUS." Furthermore, the decoder 10Z can also be calibrated as described in concurrently filed related U.S. patent application Ser. No. 14/659,292, entitled "START OF SEQUENCE DETECTION FOR ONE WIRE BUS."

As shown in FIG. 15, the data demodulator 208Z of the slave bus controller 108Z includes data frame registers 212Z configured to receive the memory input signal 38Z from the decoder 10Z. In this manner, the data frame registers 212Z store the data bits decoded by the decoder 10Z as result of the data pulses within the input data signal SDATA from the master bus controller 110. The data demodulator 208Z is explained in further detail below.

As shown in FIG. 15, the memory device 154Z is configured to store slave data 214Z. The slave data 214Z includes data segments and memory addresses of the memory device 154Z locating the data segments DW within the slave data 214Z. Thus, each of the data segments is located within the slave data 214Z at one of the memory addresses.

Furthermore, the slave bus controller 108Z further includes the data modulator 210Z. In this embodiment, the data modulator 210Z is identical to the data modulator 210 of the slave bus controller 108. The data modulator 210Z is operably associated with the memory device 154Z of the slave bus controller 108Z. The data modulator 210Z of the slave bus controller 108Z is configured to generate an input data signal RDATAZ along the bus line 12 in accordance with the PWM bus protocol. For example, to implement one of the read commands COMR for the slave bus controller 108Z, the data modulator 210Z of the slave bus controller 108Z may generate data pulses along the bus line 12 within the input data signal RDATAZ representing the data segment within the slave data 214Z that is requested by the read command COMR. The data pulses are transmitted by the slave bus controller 108Z to the master bus controller 110 along the bus line 12. It should be noted that the input data signal SDATA is not being provided by the master bus controller 110 during the transmission of the input data signal RDATAZ by the slave bus controller 108Z. The memory device 202 of the master bus controller 110 is configured to store the slave data image 216Z. The slave data image 216Z is approximately a replica of the slave data 214Z. In this manner, the master bus controller 110 can utilize the slave data image 216Z stored within the memory device 202 rather than implementing read commands in order to obtain the data segments from the memory device 154Z of the slave bus controller 108Z. The master bus controller 110 creates and updates the slave data image 216Z in the same manner as described above for the slave data image 216W stored for the memory device 154 of the slave bus controller 108.

Figure 16:
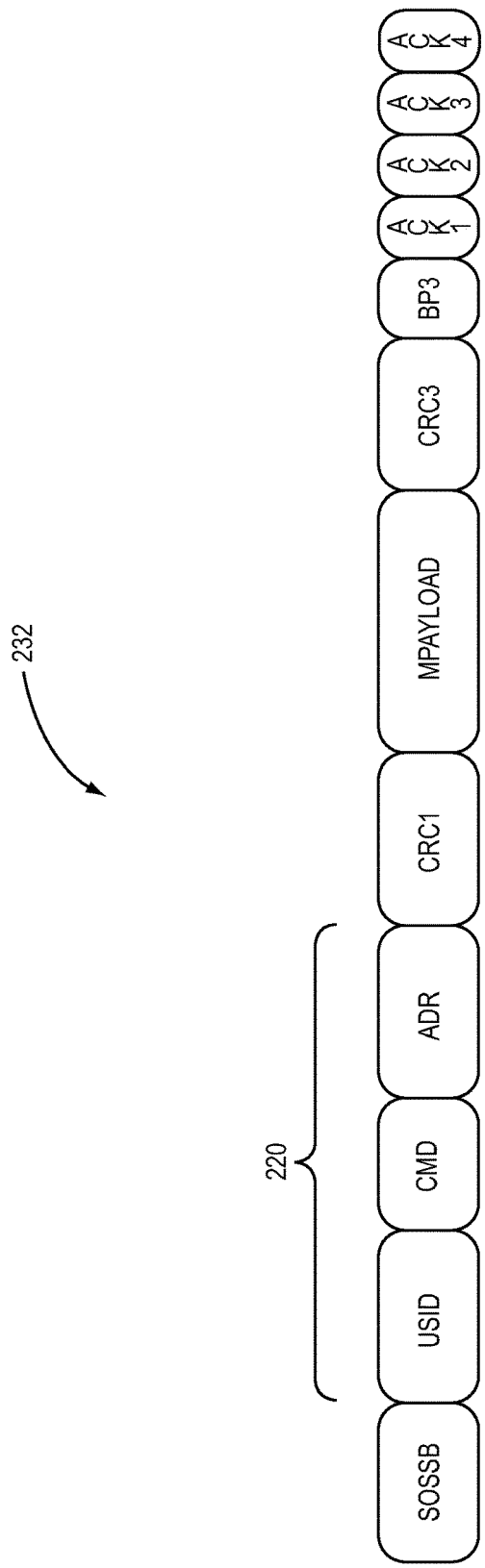
FIG. 16 illustrates one embodiment of a group write data frame for the bus interface system shown in FIG. 15.

Referring now to FIG. 15 and FIG. 16, FIG. 16 illustrates one embodiment of a group write data frame 232 utilized by the bus interface system 109 shown in FIG. 15 to implement the group write command COM2. The group write data frame 232 describes an organization of data pulses generated along the bus line 12 in order to implement one of the group write command COM2. For the sake of explanation, it is presumed that the group write command COM2 is a broadcast write command. As such, the data command COM2 is requesting that the slave bus controllers 108, 108X, 108Y, and 108Z each write the payload segment MPB2 into the slave data 214, 214X, 214Y, and 214Z of their respective memory devices 154, 154X, 154Y, and 154Z. However, the group write command COM2 may also be a subgroup write command. The subgroup write command is requesting that a subcombination of the slave bus controllers 108, 108X, 108Y, and 108Z each write the payload segment MPB2 into the slave data 214, 214X, 214Y, and 214Z of their respective memory devices 154, 154X, 154Y, and 154Z. The subcombination of the slave bus controllers 108, 108X, 108Y, and 108Z may be any grouping of more than one but less than all of the slave bus controllers 108, 108X, 108Y, and 108Z within the bus interface system 109.

To implement a group write bus operation described by the data command COM2, the data modulator 126 is configured to receive the data command COM2 from the FIFO memory buffer 200. After receiving the data command COM2, the data modulator 126 is configured to store the data command COM2 within the shadow registers 226 of the shadow register circuit 224. Assuming that the data command COM2 is a broadcast write command, the master bus controller 110 does this in order to await an acknowledgement pulse along the bus line 12 from the slave bus controller 108, an acknowledgment pulse along the bus line 12 from the slave bus controller 108X, an acknowledgment pulse along the bus line 12 from the slave bus controller 108Y, and an acknowledgment pulse along the bus line 12 from the slave bus controller 108Z. As explained in further detail below, the acknowledgment pulses indicate that each of the slave bus controllers 108, 108X, 108Y, and 108Z received an accurate copy of the payload segment MPB, which is stored by each the slave bus controllers 108, 108X, 108Y, and 108Z within the slave data 214, 214X, 214Y, and 214Z of their respective memory devices 154, 154X, 154Y, and 154Z. In response to the acknowledgement pulses, the shadow register circuit 224 provides the group write command COM2 to the memory device 202, which stores the payload segment MPB from the shadow registers 226 into each the slave data images 216W, 216X, 216Y, 216Z.

In this embodiment, the data modulator 126 of the master bus controller 110 begins the group write data frame 232 by generating a sequence of data pulses along the bus line 12 within the input data signal SDATA in accordance with the SOS pulse pattern. In an alternative embodiment, the read data frame 218 may be begun as described by FIG. 2 and the time slot TS[0]. This sequence of data pulses is provided during an SOS subframe SOSSB at the beginning of the group write data frame 232. The master bus controller 110 is configured to transmit this sequence of data pulses along the bus line 12 during an SOS subframe SOSSB, which is at the beginning of the group write data frame 232. The sequence of data pulses includes a calibration data pulse.

With regard to the slave bus controller 108, the data demodulator 208 of the slave bus controller 108 is configured to recognize that the sequence of data pulses transmitted along the bus line 12 by the data modulator 126 of the master bus controller 110 has been provided in accordance with the SOS pulse pattern. In this manner, the data demodulator 208 of the slave bus controller can detect when the master bus controller 110 has started the group write data frame 232. The data demodulator 208 of the slave bus controller 108 is further configured to calibrate the decoder 10 in accordance with the calibration data pulse in response to recognizing that the sequence of data pulses has been provided in accordance with the SOS pulse pattern. As such, the data demodulator 208 is configured to clear the data frame registers 212 in response to recognizing that the sequence of data pulses transmitted along the bus line 12 by the data modulator 126 of the master bus controller 110 has been provided in accordance with the SOS pulse pattern.

With regard to the slave bus controller 108X, the data demodulator 208X of the slave bus controller 108X is configured to recognize that the sequence of data pulses transmitted along the bus line 12 by the data modulator 126 of the master bus controller 110 has been provided in accordance with the SOS pulse pattern. In this manner, the data demodulator 208X of the slave bus controller can detect when the master bus controller 110 has started the group write data frame 232. The data demodulator 208X of the slave bus controller 108X is further configured to calibrate the decoder 10X in accordance with the calibration data pulse in response to recognizing that the sequence of data pulses has been provided in accordance with the SOS pulse pattern. As such, the data demodulator 208X is configured to clear the data frame registers 212X in response to recognizing that the sequence of data pulses transmitted along the bus line 12 by the data modulator 126 of the master bus controller 110 has been provided in accordance with the SOS pulse pattern.

With regard to the slave bus controller 108Y, the data demodulator 208Y of the slave bus controller 108Y is configured to recognize that the sequence of data pulses transmitted along the bus line 12 by the data modulator 126 of the master bus controller 110 have been provided in accordance with the SOS pulse pattern. In this manner, the data demodulator 208Y of the slave bus controller can detect when the master bus controller 110 has started the group write data frame 232. The data demodulator 208Y of the slave bus controller 108Y is further configured to calibrate the decoder 10Y in accordance with the calibration data pulse in response to recognizing that the sequence of data pulses has been provided in accordance with the SOS pulse pattern. As such, the data demodulator 208Y is configured to clear the data frame registers 212Y in response to recognizing that the sequence of data pulses transmitted along the bus line 12 by the data modulator 126 of the master bus controller 110 have been provided in accordance with the SOS pulse pattern.

With regard to the slave bus controller 108Z, the data demodulator 208Z of the slave bus controller 108Z is configured to recognize that the sequence of data pulses transmitted along the bus line 12 by the data modulator 126 of the master bus controller 110 has been provided in accordance with the SOS pulse pattern. In this manner, the data demodulator 208Z of the slave bus controller can detect when the master bus controller 110 has started the group write data frame 232. The data demodulator 208Z of the slave bus controller 108Z is further configured to calibrate the decoder 10Z in accordance with the calibration data pulse in response to recognizing that the sequence of data pulses has been provided in accordance with the SOS pulse pattern. As such, the data demodulator 208Z is configured to clear the data frame registers 212Z in response to recognizing that the sequence of data pulses transmitted along the bus line 12 by the data modulator 126 of the master bus controller 110 has been provided in accordance with the SOS pulse pattern.

After the SOS subframe SOSSB, the group write data frame 232 includes the command data frame segment 220, which was described above with respect to FIG. 13 and FIG. 16. However, with respect to the group write data frame 232, the data modulator 126 of the master bus controller 110 is configured to generate a set of data pulses within the input data signal SDATA along the bus line 12 representing the command field CB2 of the group write command COM2.

As explained above, the command data frame segment 220 shown in FIG. 16 includes the slave identifier subframe USID, the command identifier subframe CMD, and the address subframe ADR. With respect to the group write data frame 232, the data modulator 126 of the master bus controller 110 is configured to generate a subset of the data pulses within the command data frame segment 220 during the slave identifier subframe USID. The subset of the data pulses provided during the slave identifier subframe USID represents the slave identifier subfield in the command field CB2 of the data command COM2. Assuming that the group write command COM2 is a broadcast write command, the slave identifier subfield in the command field CB2 may be provided as a null bit pattern, which indicates the group write command is for all of the slave bus controllers 108, 108X, 108Y, 108Z. However, if the group write command COM2 is a subgroup write command, the slave identifier subfield represents any one of several subgroup identifiers. Each of the subgroup identifiers identifies a different subcombination of the slave bus controllers 108, 108X, 108Y, 108Z. The subgroup identifiers may or may not conflict with the slave identifiers to the slave bus controllers 108, 108X, 108Y, 108Z individually. This is because the command identifier subfield within the command field CB2 indicates that the group write command COM2 is requesting a subgroup write bus operation not an individual write bus operation.

Next, the command data frame segment 220 shown in FIG. 16 includes the command identifier subframe CMD. During the command identifier subframe CMD, the data modulator 126 is configured to generate a subset of the data pulses within the command data frame segment 220 representing the command identifier subfield of the command field CB2. The command identifier subfield indicates that the group write command COM2 is requesting a group write bus operation. Assuming that the group write command COM2 is a broadcast write command, the command identifier subfield indicates a broadcast write bus operation. In contrast, if the group write command COM2 is a subgroup write command, the command identifier subfield indicates that a subgroup write operation is being requested. In this embodiment, the subcombination of the slave bus controllers 108, 108X, 108Y, 108Z for the group write command COM2 is identified by the slave identifier subfield.

The command data frame segment 220 shown in FIG. 16 includes the address subframe ADR. With respect to the group write data frame 232, the data modulator 126 of the master bus controller 110 is configured to generate a subset of the data pulses within the command data frame segment 220 representing the address subfield in the command field CB2 of the group write command COM2. The address subfield of the command field CB2 may be a memory address offset. Thus, the memory address offset corresponds to a memory address of the slave data 214 within the memory device 154, a memory address of the slave data 214X within the memory device 154X, a memory address of the slave data 214Y within the memory device 154Y, and a memory address of the slave data 214Z within the memory device 154Z. Thus, for a broadcast write command, the address subfield of the command field CB2 identifies the memory addresses to be written to by each of the memory devices 154, 154X, 154Y, 154Z. Thus, for a subgroup write command, the address subfield of the command field CB2 identifies the memory addresses to be written to by each of the memory devices 154, 154X, 154Y, 154Z that are in the subcombination identified by the slave identifier subfield.

With regards to the slave bus controller 108, the decoder 10 in the data demodulator 208 of the slave bus controller 108 is operable to receive the set of data pulses in the input data signal SDATA that were transmitted during the command data frame segment 220. The decoder 10 of the data demodulator 208 is configured to decode the set of data pulses transmitted during the command data frame segment 220 into the decoded command field DCB in accordance with the PWM bus protocol. The decoded command field DCB is stored by the slave bus controller 108 within the data frame registers 212 of the data demodulator 208. Thus, the data demodulator 208 of the slave bus controller 108 is configured to generate the decoded command field DCB from the set of data pulses representing the command field CB2 of the group write command COM2.

With regards to the slave bus controller 108X, the decoder 10X in the data demodulator 208X of the slave bus controller 108X is operable to receive the set of data pulses in the input data signal SDATA that were transmitted during the command data frame segment 220. The decoder 10X of the data demodulator 208X is configured to decode the set of data pulses transmitted during the command data frame segment 220 into a decoded command field DCBX in accordance with the PWM bus protocol. The decoded command field DCBX is stored by the slave bus controller 108X within the data frame registers 212X of the data demodulator 208X. Thus, the data demodulator 208X of the slave bus controller 108X is configured to generate the decoded command field DCBX from the set of data pulses representing the command field CB2 of the group write command COM2.

With regards to the slave bus controller 108Y, the decoder 10Y in the data demodulator 208Y of the slave bus controller 108Y is operable to receive the set of data pulses in the input data signal SDATA that were transmitted during the command data frame segment 220. The decoder 10Y of the data demodulator 208Y is configured to decode the set of data pulses transmitted during the command data frame segment 220 into a decoded command field DCBY in accordance with the PWM bus protocol. The decoded command field DCBY is stored by the slave bus controller 108Y within the data frame registers 212Y of the data demodulator 208Y. Thus, the data demodulator 208Y of the slave bus controller 108Y is configured to generate the decoded command field DCBY from the set of data pulses representing the command field CB2 of the group write command COM2.

With regards to the slave bus controller 108Z, the decoder 10Z in the data demodulator 208Z of the slave bus controller 108Z is operable to receive the set of data pulses in the input data signal SDATA that were transmitted during the command data frame segment 220. The decoder 10Z of the data demodulator 208Z is configured to decode the set of data pulses transmitted during the command data frame segment 220 into a decoded command field DCBZ in accordance with the PWM bus protocol. The decoded command field DCBZ is stored by the slave bus controller 108Z within the data frame registers 212Z of the data demodulator 208Z. Thus, the data demodulator 208Z of the slave bus controller 108Z is configured to generate the decoded command field DCBZ from the set of data pulses representing the command field CB2 of the group write command COM2.

The group write data frame 232 shown in FIG. 16 then includes the error code subframe CRC1. The error coding circuit ECCM in the data modulator 126 of the master bus controller 110 is configured to generate the error code CRCA based on the command field CB2 of the group write command COM2. The error coding circuit ECCM is configured to implement the CRC algorithm on the command field CB2 to generate the error code CRCA as a CRC. During the error code subframe CRC1, the data modulator 126 of the master bus controller 110 is configured to generate a set of data pulses along the bus line 12 within the input data signal SDATA representing the error code CRCA in accordance with the PWM bus protocol.

With regards to the slave bus controller 108, the decoder 10 in the data demodulator 208 of the slave bus controller 108 is operable to receive the set of data pulses within the input data signal SDATA transmitted during the error code subframe CRC1. As such, the decoder 10 of the data demodulator 208 in the slave bus controller 108 is configured to decode the set of data pulses representing the error code CRCA into the decoded error code DCRCA in accordance with the PWM bus protocol. The decoded error code DCRCA is also stored within the data frame registers 212. Additionally, the error detection circuit EDCS of the data demodulator 208 in the slave bus controller 108 is configured to generate the error code CRCSA based on the decoded command field DCB provided from the data frame registers 212. More specifically, the error detection circuit EDCS of the data demodulator 208 in the slave bus controller 108 is configured to generate the error code CRCSA based on the decoded command field DCB, which was decoded by the decoder 10 from the set of data pulses representing the command field CB2 of the group write command COM2.

The error detection circuit EDCS is then configured to perform an error check on the decoded command field DCB by comparing the decoded error code DCRCA with the error code CRCSA. More specifically, the error detection circuit EDCS is operable to compare the decoded error code DCRCA with the error code CRCSA. Based on a correspondence between the decoded error code DCRCA and the error code CRCSA, the error detection circuit EDCS of the data demodulator 208 in the slave bus controller 108 detects whether there is an error in the decoded command field DCB. When the correspondence between the decoded error code DCRCA and the error code CRCSA have a specified relationship, no error is detected by the EDCS in the decoded command field DCB and the decoded command field DCB passes the error check. In one example, the error detection circuit EDCS is configured to compare the decoded error code DCRCA and the error code CRCSA to determine whether the decoded error code DCRCA and the error code CRCSA match. When the decoded error code DCRCA and the error code CRCSA match, the decoded command field DCB passes the error check. However, when the decoded error code DCRCA and the error code CRCSA do not match, then the decoded command field DCB fails the error check. For example, the error detection circuit EDCS of the data demodulator 208 in the slave bus controller 108 is configured to generate the error code CRCSA based on the decoded command field DCB, which should be a copy of the command field CB2 of the data command COM2. When the error code DCRCA and the error code CRCSA do not match, the decoded command field DCB fails the error check and the decoded command field DCB is not an accurate copy of the command field CB2. However, when the error code DCRCA and the error code CRCSA match, the decoded command field DCB passes the error check. The decoded command field DCB is thus an accurate copy of the command field CB2. In this manner, the error detection circuit EDCS is configured to detect whether the set of data pulses representing the command field CB2 were decoded appropriately.

When the error detection circuit EDCS detects an error in the decoded command field DCB and the decoded command field fails the error check, the slave bus controller 108 aborts the group write command COM2. When no error is detected in the decoded command field DCB and the decoded command field DCB passes the error check, the decoded command field DCB and the command field CB2 of the group write command COM2 match. As such, the decoded command field DCB will include a decoded slave identifier subfield that is a copy of the slave identifier subfield of the command field CB2 represented during the slave identifier subframe USID. The decoded command field DCB will include a decoded command identifier subfield that is a copy of the command identifier subfield of the command field CB2 represented during the command identifier subframe CMD. Thus, in this example, the decoded command identifier subfield requests a group write bus operation. The decoded command field DCB will also include a decoded address subfield that is a copy of the address subfield of the command field CB2 represented during the address subframe ADR.

When the decoded command field DCB fails the error check, the slave bus controller 108 aborts the group write command. On the other hand, assuming that the group write command COM2 is a broadcast write command, the decoded command identifier subfield identifies a broadcast write command when the decoded command field DCB passes the error check since the decoded command identifier subfield is an accurate copy of the command identifier subfield in the command field CB2 of the group write command COM2. As such, the slave bus controller 108 prepares to write to the memory address in the memory device 154 identified by the decoded address field of the decoded command field DCB. However, when the group write command COM2 is a subgroup write command, the decoded command identifier subfield identifies a subgroup write command when the decoded command field DCB passes the error check. As such, when the decoded slave identifier subfield of the decoded command field DCB identifies a subcombination that does not include the slave bus controller 108, the slave bus controller 108 ignores the remainder of the group write data frame 232. However, the slave bus controller 108 prepares to write to the memory address in the memory device 154 identified by the decoded address field of the decoded command field DCB when the decoded slave identifier subfield of the decoded command field DCB identifies a subcombination that does includes the slave bus controller 108.

With regards to the slave bus controller 108X, the decoder 10X in the data demodulator 208X of the slave bus controller 108X is operable to receive the set of data pulses within the input data signal SDATA transmitted during the error code subframe CRC1. As such, the decoder 10X of the data demodulator 208X in the slave bus controller 108X is configured to decode the set of data pulses representing the error code CRCA into a decoded error code DCRCAX in accordance with the PWM bus protocol. The decoded error code DCRCAX is also stored within the data frame registers 212X. Additionally, an error detection circuit EDCSX of the data demodulator 208X in the slave bus controller 108X is configured to generate an error code CRCSAX based on the decoded command field DCBX provided from the data frame registers 212X. More specifically, the error detection circuit EDCSX of the data demodulator 208X in the slave bus controller 108X is configured to generate the error code CRCSAX based on the decoded command field DCBX, which was decoded by the decoder 10X from the set of data pulses representing the command field CB2 of the group write command COM2.

The error detection circuit EDCSX is then configured to perform an error check on the decoded command field DCBX by comparing the decoded error code DCRCAX with the error code CRCSAX. More specifically, the error detection circuit EDCSX is operable to compare the decoded error code DCRCAX with the error code CRCSAX. Based on a correspondence between the decoded error code DCRCAX and the error code CRCSAX, the error detection circuit EDCSX of the data demodulator 208X in the slave bus controller 108X detects whether there is an error in the decoded command field DCBX. When the correspondence between the decoded error code DCRCAX and the error code CRCSAX has a specified relationship, no error is detected by the EDCSX in the decoded command field DCBX and the decoded command field DCBX passes the error check. In one example, the error detection circuit EDCSX is configured to compare the decoded error code DCRCAX and the error code CRCSAX to determine whether the decoded error code DCRCAX and the error code CRCSAX match. When the decoded error code DCRCAX and the error code CRCSAX match, the decoded command field DCBX passes the error check. However, when the decoded error code DCRCAX and the error code CRCSAX do not match, then the decoded command field DCBX fails the error check. For example, the error detection circuit EDCSX of the data demodulator 208X in the slave bus controller 108X is configured to generate the error code CRCSAX based on the decoded command field DCBX, which should be a copy of the command field CB2 of the data command COM2. When the error code DCRCAX and the error code CRCSAX do not match, the decoded command field DCBX fails the error check, and the decoded command field DCBX is not an accurate copy of the command field CB2. However, when the error code DCRCAX and the error code CRCSAX match, the decoded command field DCBX passes the error check. The decoded command field DCBX is thus an accurate copy of the command field CB2. In this manner, the error detection circuit EDCSX is configured to detect whether the set of data pulses representing the command field CB2 were decoded appropriately.

When the error detection circuit EDCSX detects an error in the decoded command field DCBX and the decoded command field fails the error check, the slave bus controller 108X aborts the group write command COM2. When no error is detected in the decoded command field DCBX and the decoded command field DCBX passes the error check, the decoded command field DCBX and the command field CB2 of the group write command COM2 match. As such, the decoded command field DCBX will include a decoded slave identifier subfield that is a copy of the slave identifier subfield of the command field CB2 represented during the slave identifier subframe USID. The decoded command field DCBX will include a decoded command identifier subfield that is a copy of the command identifier subfield of the command field CB2 represented during the command identifier subframe CMD. Thus, in this example, the decoded command identifier subfield requests a group write bus operation. The decoded command field DCBX will also include a decoded address subfield that is a copy of the address subfield of the command field CB2 represented during the address subframe ADR.

When the decoded command field DCBX fails the error check, the slave bus controller 108X aborts the group write command. On the other hand, assuming that the group write command COM2 is a broadcast write command, the decoded command identifier subfield identifies a broadcast write command when the decoded command field DCBX passes the error check, since the decoded command identifier subfield is an accurate copy of the command identifier subfield in the command field CB2 of the group write command COM2. As such, the slave bus controller 108X prepares to write to the memory address in the memory device 154X identified by the decoded address field of the decoded command field DCBX. However, when the group write command COM2 is a subgroup write command, the decoded command identifier subfield identifies a subgroup write command when the decoded command field DCBX passes the error check. As such, when the decoded slave identifier subfield of the decoded command field DCBX identifies a subcombination that does not include the slave bus controller 108X, the slave bus controller 108X ignores the remainder of the group write data frame 232. However, the slave bus controller 108X prepares to write to the memory address in the memory device 154X identified by the decoded address field of the decoded command field DCBX when the decoded slave identifier subfield of the decoded command field DCBX identifies a subcombination that does includes the slave bus controller 108X.

With regards to the slave bus controller 108Y, the decoder 10Y in the data demodulator 208Y of the slave bus controller 108Y is operable to receive the set of data pulses within the input data signal SDATA transmitted during the error code subframe CRC1. As such, the decoder 10Y of the data demodulator 208Y in the slave bus controller 108Y is configured to decode the set of data pulses representing the error code CRCA into a decoded error code DCRCAY in accordance with the PWM bus protocol. The decoded error code DCRCAY is also stored within the data frame registers 212Y. Additionally, an error detection circuit EDCSY of the data demodulator 208Y in the slave bus controller 108Y is configured to generate an error code CRCSAY based on the decoded command field DCBY provided from the data frame registers 212Y. More specifically, the error detection circuit EDCSY of the data demodulator 208Y in the slave bus controller 108Y is configured to generate the error code CRCSAY based on the decoded command field DCBY, which was decoded by the decoder 10Y from the set of data pulses representing the command field CB2 of the group write command COM2.

The error detection circuit EDCSY is then configured to perform an error check on the decoded command field DCBY by comparing the decoded error code DCRCAY with the error code CRCSAY. More specifically, the error detection circuit EDCSY is operable to compare the decoded error code DCRCAY with the error code CRCSAY. Based on a correspondence between the decoded error code DCRCAY and the error code CRCSAY, the error detection circuit EDCSY of the data demodulator 208Y in the slave bus controller 108Y detects whether there is an error in the decoded command field DCBY. When the correspondence between the decoded error code DCRCAY and the error code CRCSAY has a specified relationship, no error is detected by the EDCSY in the decoded command field DCBY and the decoded command field DCBY passes the error check. In one example, the error detection circuit EDCSY is configured to compare the decoded error code DCRCAY and the error code CRCSAY to determine whether the decoded error code DCRCAY and the error code CRCSAY match. When the decoded error code DCRCAY and the error code CRCSAY match, the decoded command field DCBY passes the error check. However, when the decoded error code DCRCAY and the error code CRCSAY do not match then the decoded command field DCBY fails the error check. For example, the error detection circuit EDCSY of the data demodulator 208Y in the slave bus controller 108Y is configured to generate the error code CRCSAY based on the decoded command field DCBY, which should be a copy of the command field CB2 of the data command COM2. When the error code DCRCAY and the error code CRCSAY do not match, the decoded command field DCBY fails the error check and the decoded command field DCBY is not an accurate copy of the command field CB2. However, when the error code DCRCAY and the error code CRCSAY match, the decoded command field DCBY passes the error check. The decoded command field DCBY is thus an accurate copy of the command field CB2. In this manner, the error detection circuit EDCSY is configured to detect whether the set of data pulses representing the command field CB2 were decoded appropriately.

When the error detection circuit EDCSY detects an error in the decoded command field DCBY and the decoded command field fails the error check, the slave bus controller 108Y aborts the group write command COM2. When no error is detected in the decoded command field DCBY and the decoded command field DCBY passes the error check, the decoded command field DCBY and the command field CB2 of the group write command COM2 match. As such, the decoded command field DCBY will include a decoded slave identifier subfield that is a copy of the slave identifier subfield of the command field CB2 represented during the slave identifier subframe USID. The decoded command field DCBY will include a decoded command identifier subfield that is a copy of the command identifier subfield of the command field CB2 represented during the command identifier subframe CMD. Thus, in this example, the decoded command identifier subfield requests a group write bus operation. The decoded command field DCBY will also include a decoded address subfield that is a copy of the address subfield of the command field CB2 represented during the address subframe ADR.

When the decoded command field DCBY fails the error check, the slave bus controller 108Y aborts the group write command. On the other hand, assuming that the group write command COM2 is a broadcast write command, the decoded command identifier subfield identifies a broadcast write command when the decoded command field DCBY passes the error check since the decoded command identifier subfield is an accurate copy of the command identifier subfield in the command field CB2 of the group write command COM2. As such, the slave bus controller 108Y prepares to write to the memory address in the memory device 154Y identified by the decoded address field of the decoded command field DCBY. However, when the group write command COM2 is a subgroup write command, the decoded command identifier subfield identifies a subgroup write command when the decoded command field DCBY passes the error check. As such, when the decoded slave identifier subfield of the decoded command field DCBY identifies a subcombination that does not include the slave bus controller 108Y, the slave bus controller 108Y ignores the remainder of the group write data frame 232. However, the slave bus controller 108Y prepares to write to the memory address in the memory device 154Y identified by the decoded address field of the decoded command field DCBY when the decoded slave identifier subfield of the decoded command field DCBY identifies a subcombination that does includes the slave bus controller 108Y.

With regards to the slave bus controller 108Z, the decoder 10Z in the data demodulator 208Z of the slave bus controller 108Z is operable to receive the set of data pulses within the input data signal SDATA transmitted during the error code subframe CRC1. As such, the decoder 10Z of the data demodulator 208Z in the slave bus controller 108Z is configured to decode the set of data pulses representing the error code CRCA into a decoded error code DCRCAZ in accordance with the PWM bus protocol. The decoded error code DCRCAZ is also stored within the data frame registers 212Z. Additionally, an error detection circuit EDCSZ of the data demodulator 208Z in the slave bus controller 108Z is configured to generate an error code CRCSAZ based on the decoded command field DCBZ provided from the data frame registers 212Z. More specifically, the error detection circuit EDCSZ of the data demodulator 208Z in the slave bus controller 108Z is configured to generate the error code DCRCAZ based on the decoded command field DCBZ, which was decoded by the decoder 10Z from the set of data pulses representing the command field CB2 of the group write command COM2.

The error detection circuit EDCSZ is then configured to perform an error check on the decoded command field DCBZ by comparing the decoded error code DCRCAZ with the error code CRCSAZ. More specifically, the error detection circuit EDCSZ is operable to compare the decoded error code DCRCAZ with the error code CRCSAZ. Based on a correspondence between the decoded error code DCRCAZ and the error code CRCSAZ, the error detection circuit EDCSZ of the data demodulator 208Z in the slave bus controller 108Z detects whether there is an error in the decoded command field DCBZ. When the correspondence between the decoded error code DCRCAZ and the error code CRCSAZ have a specified relationship, no error is detected by the EDCSZ in the decoded command field DCBZ and the decoded command field DCBZ passes the error check. In one example, the error detection circuit EDCSZ is configured to compare the decoded error code DCRCAZ and the error code CRCSAZ to determine whether the decoded error code DCRCAZ and the error code CRCSAZ match. When the decoded error code DCRCAZ and the error code CRCSAZ match, the decoded command field DCBZ passes the error check. However, when the decoded error code DCRCAZ and the error code CRCSAZ do not match then the decoded command field DCBZ fails the error check. For example, the error detection circuit EDCSZ of the data demodulator 208Z in the slave bus controller 108Z is configured to generate the error code CRCSAZ based on the decoded command field DCBZ, which should be a copy of the command field CB2 of the data command COM2. When the error code DCRCAZ and the error code CRCSAZ do not match, the decoded command field DCBZ fails the error check and the decoded command field DCBZ is not an accurate copy of the command field CB2. However, when the error code DCRCAZ and the error code CRCSAZ match, the decoded command field DCBZ passes the error check. The decoded command field DCBZ is thus an accurate copy of the command field CB2. In this manner, the error detection circuit EDCSZ is configured to detect whether the set of data pulses representing the command field CB2 were decoded appropriately.

When the error detection circuit EDCSZ detects an error in the decoded command field DCBZ and the decoded command field fails the error check, the slave bus controller 108Z aborts the group write command COM2. When no error is detected in the decoded command field DCBZ and the decoded command field DCBZ passes the error check, the decoded command field DCBZ and the command field CB2 of the group write command COM2 match. As such, the decoded command field DCBZ will include a decoded slave identifier subfield that is a copy of the slave identifier subfield of the command field CB2 represented during the slave identifier subframe USID. The decoded command field DCBZ will include a decoded command identifier subfield that is a copy of the command identifier subfield of the command field CB2 represented during the command identifier subframe CMD. Thus, in this example, the decoded command identifier subfield requests a group write bus operation. The decoded command field DCBZ will also include a decoded address subfield that is a copy of the address subfield of the command field CB2 represented during the address subframe ADR.

When the decoded command field DCBZ fails the error check, the slave bus controller 108Z aborts the group write command. On the other hand, assuming that the group write command COM2 is a broadcast write command, the decoded command identifier subfield identifies a broadcast write command when the decoded command field DCBZ passes the error check since the decoded command identifier subfield is an accurate copy of the command identifier subfield in the command field CB2 of the group write command COM2. As such, the slave bus controller 108Z prepares to write to the memory address in the memory device 154Z identified by the decoded address field of the decoded command field DCBZ. However, when the group write command COM2 is a subgroup write command, the decoded command identifier subfield identifies a subgroup write command when the decoded command field DCBZ passes the error check. As such, when the decoded slave identifier subfield of the decoded command field DCBZ identifies a subcombination that does not include the slave bus controller 108Z, the slave bus controller 108Z ignores the remainder of the group write data frame 232. However, the slave bus controller 108Z prepares to write to the memory address in the memory device 154Z identified by the decoded address field of the decoded command field DCBZ when the decoded slave identifier subfield of the decoded command field DCBZ identifies a subcombination that does includes the slave bus controller 108Z.

Referring again to FIGS. 15 and 16, after the error code subframe CRC1, the group write data frame 232 has the master payload subframe MPAYLOAD. During the master payload subframe MPAYLOAD, the master bus controller 110 is configured to generate a set of data pulses along the bus line 12 within the input data signal SDATA representing the payload segment MPB2 of the group write command COM2. More specifically, the data modulator 126 of the master bus controller 110 is configured to generate the set of data pulses along the bus line 12 within the input data signal SDATA representing the payload segment MPB2. The data modulator 126 is configured to generate the set of data pulses representing the payload segment MPB2 in accordance with the PWM bus protocol.

With regards to the slave bus controller 108, the data demodulator 208 of the slave bus controller 108 is operable to receive the set of data pulses within the input data signal SDATA that were transmitted during the master payload subframe MPAYLOAD. The decoder 10 in the data demodulator 208 of the slave bus controller 108 is configured to decode the set of data pulses into the decoded payload segment DMPB in accordance with the PWM bus protocol. The data frame registers 212 are configured to store the decoded payload segment DMPB. Thus, the data demodulator 208 of the slave bus controller 108 is configured to generate the decoded payload segment DMPB based on the set of data pulses representing the payload segment MPB2 of the group write command COM2.

With regards to the slave bus controller 108X, the data demodulator 208X of the slave bus controller 108X is operable to receive the set of data pulses within the input data signal SDATA that were transmitted during the master payload subframe MPAYLOAD. The decoder 10X in the data demodulator 208X of the slave bus controller 108X is configured to decode the set of data pulses into a decoded payload segment DMPB in accordance with the PWM bus protocol. The data frame registers 212X are configured to store the decoded payload segment DMPB. Thus, the data demodulator 208X of the slave bus controller 108X is configured to generate the decoded payload segment DMPB based on the set of data pulses representing the payload segment MPB2 of the group write command COM2.

With regards to the slave bus controller 108Y, the data demodulator 208Y of the slave bus controller 108Y is operable to receive the set of data pulses within the input data signal SDATA that were transmitted during the master payload subframe MPAYLOAD. The decoder 10Y in the data demodulator 208Y of the slave bus controller 108Y is configured to decode the set of data pulses into a decoded payload segment DMPBY in accordance with the PWM bus protocol. The data frame registers 212Y are configured to store the decoded payload segment DMPBY. Thus, the data demodulator 208Y of the slave bus controller 108Y is configured to generate the decoded payload segment DMPBY based on the set of data pulses representing the payload segment MPB2 of the group write command COM2.

With regards to the slave bus controller 108Z, the data demodulator 208Z of the slave bus controller 108Z is operable to receive the set of data pulses within the input data signal SDATA that were transmitted during the master payload subframe MPAYLOAD. The decoder 10Z in the data demodulator 208Z of the slave bus controller 108Z is configured to decode the set of data pulses into a decoded payload segment DMPBZ in accordance with the PWM bus protocol. The data frame registers 212Z are configured to store the decoded payload segment DMPBZ. Thus, the data demodulator 208Z of the slave bus controller 108Z is configured to generate the decoded payload segment DMPBZ based on the set of data pulses representing the payload segment MPB2 of the group write command COM2.

The group write data frame 232 shown in FIG. 16 then includes the error code subframe CRC3. The error coding circuit ECCM in the master bus controller 110 of the master bus controller 110 is configured to generate the error code CRCC based on the payload segment MPB2 of the group write command COM2. To generate the error code CRCC, the error coding circuit ECCM within the data modulator 126 of the master bus controller 110 is configured to apply an error check algorithm to the payload segment MPB2. Thus, the error coding circuit ECCM shown in FIG. 15 is configured to implement the CRC algorithm on the payload segment MPB2 in order to generate the error code CRCC. During the error code subframe CRC3, the data modulator 126 of the master bus controller 110 is configured to generate a set of data pulses along the bus line 12 within the input data signal SDATA along the bus line 12 representing the error code CRCC in accordance with the PWM bus protocol.

With regards to the slave bus controller 108, the decoder 10 in the data demodulator 208 of the slave bus controller 108 is operable to receive the set of data pulses within the input data signal SDATA that were transmitted during the error code frame CRC3 along the bus line 12. The decoder 10 of the data demodulator 208 in the slave bus controller 108 is configured to decode the set of data pulses representing the error code CRCC into the decoded error code DCRCC in accordance with the PWM bus protocol. The decoded error code DCRCC is also stored within the data frame registers 212. Additionally, the error detection circuit EDCS of the data demodulator 208 in the slave bus controller 108 is configured to generate the error code CRCSC based on the decoded payload segment DMPB provided from the data frame registers 212. In this embodiment, the error detection circuit EDCS is configured to implement the CRC algorithm on the decoded payload segment DMPB to generate the error code CRCSC as a CRC.

The error detection circuit EDCS is then configured to perform an error check on the decoded payload segment DMPB by comparing the decoded error code DCRCC with the error code CRCSC. More specifically, the error detection circuit EDCS is operable to compare the decoded error code DCRCC with the error code CRCSC. Based on a correspondence between the decoded error code DCRCC and the error code CRCSC, the error detection circuit EDCS of the data demodulator 208 in the slave bus controller 108 detects whether there is an error in the decoded payload segment DMPB. When the correspondence between the decoded error code DCRCC and the error code CRCSC have a specified relationship, no error is detected by the EDCS in the decoded payload segment DMPB and the decoded payload segment DMPB passes the error check. In one example, the error detection circuit EDCS is configured to compare the decoded error code DCRCC and the error code CRCSC to determine whether the decoded error code DCRCC and the error code CRCSC match. When the decoded error code DCRCC and the error code CRCSC match, the decoded payload segment DMPB passes the error check. However, when the decoded error code DCRCC and the error code CRCSC don't match then the decoded payload segment DMPB fails the error check. For example, the error detection circuit EDCS of the data demodulator 208 in the slave bus controller 108 is configured to generate the error code CRCSC based on the decoded payload segment DMPB, which should be a copy of the payload segment MPB2 of the data command CM2. When the error code DCRCC and the error code CRCSC do not match, the decoded payload segment DMPB fails the error check and the decoded payload segment DMPB is not an accurate copy of the payload segment MPB2. However, when the error code DCRCC and the error code CRCSC match, the decoded payload segment DMPB passes the error check. The decoded payload segment DMPB is thus an accurate copy of the payload segment MPB2. In this manner, the error detection circuit EDCS is configured to detect whether the set of data pulses representing the payload segment MPB2 were decoded appropriately.

When no error is detected in the decoded payload segment DMPB and the error check is passed, the slave bus controller 108 is configured to store the decoded payload segment DMPB within the memory device 154. More specifically, the data demodulator 208 is configured to pass the decoded payload segment DMPB and the decoded address subfield of the decoded command field to the memory device 154. The memory device 154 is then operable to store the decoded payload segment DMPB in the slave data 214 at the memory address of the memory device 154 that is identified by the decoded address subfield. However, when an error is detected in the decoded payload segment DMPB and the error check fails, the decoded payload segment DMPB is not stored in the slave data 214 of the memory device 154.

With regards to the slave bus controller 108X, the decoder 10X in the data demodulator 208X of the slave bus controller 108X is operable to receive the set of data pulses within the input data signal SDATA that were transmitted during the error code frame CRC3 along the bus line 12. The decoder 10X of the data demodulator 208X in the slave bus controller 108X is configured to decode the set of data pulses representing the error code CRCC into the decoded error code DCRCCX in accordance with the PWM bus protocol. The decoded error code DCRCCX is also stored within the data frame registers 212X. Additionally, the error detection circuit EDCSX of the data demodulator 208X in the slave bus controller 108X is configured to generate an error code CRCSCX based on the decoded payload segment DMPBX provided from the data frame registers 212X. In this embodiment, the error detection circuit EDCSX is configured to implement the CRC algorithm on the decoded payload segment DMPBX to generate the error code CRCSCX as a CRC.

The error detection circuit EDCSX is then configured to perform an error check on the decoded payload segment DMPBX by comparing the decoded error code DCRCCX with the error code CRCSCX. More specifically, the error detection circuit EDCSX is operable to compare the decoded error code DCRCCX with the error code CRCSCX. Based on a correspondence between the decoded error code DCRCCX and the error code CRCSCX, the error detection circuit EDCSX of the data demodulator 208X in the slave bus controller 108X detects whether there is an error in the decoded payload segment DMPBX. When the correspondence between the decoded error code DCRCCX and the error code CRCSCX have a specified relationship, no error is detected by the EDCSX in the decoded payload segment DMPBX and the decoded payload segment DMPBX passes the error check. In one example, the error detection circuit EDCSX is configured to compare the decoded error code DCRCCX and the error code CRCSCX to determine whether the decoded error code DCRCCX and the error code CRCSCX match. When the decoded error code DCRCCX and the error code CRCSCX match, the decoded payload segment DMPBX passes the error check. However, when the decoded error code DCRCCX and the error code CRCSCX don't match then the decoded payload segment DMPBX fails the error check. For example, the error detection circuit EDCSX of the data demodulator 208X in the slave bus controller 108X is configured to generate the error code CRCSCX based on the decoded payload segment DMPBX, which should be a copy of the payload segment MPB2 of the data command CM2. When the error code DCRCCX and the error code CRCSCX do not match, the decoded payload segment DMPBX fails the error check and the decoded payload segment DMPBX is not an accurate copy of the payload segment MPB2. However, when the error code DCRCCX and the error code CRCSCX match, the decoded payload segment DMPBX passes the error check. The decoded payload segment DMPBX is thus an accurate copy of the payload segment MPB2. In this manner, the error detection circuit EDCSX is configured to detect whether the set of data pulses representing the payload segment MPB2 were decoded appropriately.

When no error is detected in the decoded payload segment DMPBX and the error check is passed, the slave bus controller 108X is configured to store the decoded payload segment DMPBX within the memory device 154X. More specifically, the data demodulator 208X is configured to pass the decoded payload segment DMPBX and the decoded address subfield of the decoded command field to the memory device 154X. The memory device 154X is then operable to store the decoded payload segment DMPBX in the slave data 214X at the memory address of the memory device 154X that is identified by the decoded address subfield. However, when an error is detected in the decoded payload segment DMPBX and the error check fails, the decoded payload segment DMPBX is not stored in the slave data 214X of the memory device 154X.

With regards to the slave bus controller 108Y, the decoder 10Y in the data demodulator 208Y of the slave bus controller 108Y is operable to receive the set of data pulses within the input data signal SDATA that were transmitted during the error code frame CRC3 along the bus line 12. The decoder 10Y of the data demodulator 208Y in the slave bus controller 108Y is configured to decode the set of data pulses representing the error code CRCC into the decoded error code DCRCCY in accordance with the PWM bus protocol. The decoded error code DCRCCY is also stored within the data frame registers 212Y. Additionally, the error detection circuit EDCSY of the data demodulator 208Y in the slave bus controller 108Y is configured to generate an error code CRCSCY based on the decoded payload segment DMPBY provided from the data frame registers 212Y. In this embodiment, the error detection circuit EDCSY is configured to implement the CRC algorithm on the decoded payload segment DMPBY to generate the error code CRCSCY as a CRC.

The error detection circuit EDCSY is then configured to perform an error check on the decoded payload segment DMPBY by comparing the decoded error code DCRCCY with the error code CRCSCY. More specifically, the error detection circuit EDCSY is operable to compare the decoded error code DCRCCY with the error code CRCSCY. Based on a correspondence between the decoded error code DCRCCY and the error code CRCSCY, the error detection circuit EDCSY of the data demodulator 208Y in the slave bus controller 108Y detects whether there is an error in the decoded payload segment DMPBY. When the correspondence between the decoded error code DCRCCY and the error code CRCSCY have a specified relationship, no error is detected by the EDCSY in the decoded payload segment DMPBY and the decoded payload segment DMPBY passes the error check. In one example, the error detection circuit EDCSY is configured to compare the decoded error code DCRCCY and the error code CRCSCY to determine whether the decoded error code DCRCCY and the error code CRCSCY match. When the decoded error code DCRCCY and the error code CRCSCY match, the decoded payload segment DMPBY passes the error check. However, when the decoded error code DCRCCY and the error code CRCSCY don't match then the decoded payload segment DMPBY fails the error check. For example, the error detection circuit EDCSY of the data demodulator 208Y in the slave bus controller 108Y is configured to generate the error code CRCSCY based on the decoded payload segment DMPBY, which should be a copy of the payload segment MPB2 of the data command CM2. When the error code DCRCCY and the error code CRCSCY do not match, the decoded payload segment DMPBY fails the error check and the decoded payload segment DMPBY is not an accurate copy of the payload segment MPB2. However, when the error code DCRCCY and the error code CRCSCY match, the decoded payload segment DMPBY passes the error check. The decoded payload segment DMPBY is thus an accurate copy of the payload segment MPB2. In this manner, the error detection circuit EDCSY is configured to detect whether the set of data pulses representing the payload segment MPB2 were decoded appropriately.

When no error is detected in the decoded payload segment DMPBY and the error check is passed, the slave bus controller 108Y is configured to store the decoded payload segment DMPBY within the memory device 154Y. More specifically, the data demodulator 208Y is configured to pass the decoded payload segment DMPBY and the decoded address subfield of the decoded command field to the memory device 154Y. The memory device 154Y is then operable to store the decoded payload segment DMPBY in the slave data 214Y at the memory address of the memory device 154Y that is identified by the decoded address subfield. However, when an error is detected in the decoded payload segment DMPBY and the error check fails, the decoded payload segment DMPBY is not stored in the slave data 214Y of the memory device 154Y.

With regards to the slave bus controller 108Z, the decoder 10Z in the data demodulator 208Z of the slave bus controller 108Z is operable to receive the set of data pulses within the input data signal SDATA that were transmitted during the error code frame CRC3 along the bus line 12. The decoder 10Z of the data demodulator 208Z in the slave bus controller 108Z is configured to decode the set of data pulses representing the error code CRCC into the decoded error code DCRCCZ in accordance with the PWM bus protocol. The decoded error code DCRCCZ is also stored within the data frame registers 212Z. Additionally, the error detection circuit EDCSZ of the data demodulator 208Z in the slave bus controller 108Z is configured to generate an error code CRCSCZ based on the decoded payload segment DMPBZ provided from the data frame registers 212Z. In this embodiment, the error detection circuit EDCSZ is configured to implement the CRC algorithm on the decoded payload segment DMPBZ to generate the error code CRCSCZ as a CRC.

The error detection circuit EDCSZ is then configured to perform an error check on the decoded payload segment DMPBZ by comparing the decoded error code DCRCCZ with the error code CRCSCZ. More specifically, the error detection circuit EDCSZ is operable to compare the decoded error code DCRCCZ with the error code CRCSCZ. Based on a correspondence between the decoded error code DCRCCZ and the error code CRCSCZ, the error detection circuit EDCSZ of the data demodulator 208Z in the slave bus controller 108Z detects whether there is an error in the decoded payload segment DMPBZ. When the correspondence between the decoded error code DCRCCZ and the error code CRCSCZ have a specified relationship, no error is detected by the EDCSZ in the decoded payload segment DMPBZ and the decoded payload segment DMPBZ passes the error check. In one example, the error detection circuit EDCSZ is configured to compare the decoded error code DCRCCZ and the error code CRCSCZ to determine whether the decoded error code DCRCCZ and the error code CRCSCZ match. When the decoded error code DCRCCZ and the error code CRCSCZ match, the decoded payload segment DMPBZ passes the error check. However, when the decoded error code DCRCCZ and the error code CRCSCZ don't match then the decoded payload segment DMPBZ fails the error check. For example, the error detection circuit EDCSZ of the data demodulator 208Z in the slave bus controller 108Z is configured to generate the error code CRCSCZ based on the decoded payload segment DMPBZ, which should be a copy of the payload segment MPB2 of the data command CM2. When the error code DCRCCZ and the error code CRCSCZ do not match, the decoded payload segment DMPBZ fails the error check and the decoded payload segment DMPBZ is not an accurate copy of the payload segment MPB2. However, when the error code DCRCCZ and the error code CRCSCZ match, the decoded payload segment DMPBZ passes the error check. The decoded payload segment DMPBZ is thus an accurate copy of the payload segment MPB2. In this manner, the error detection circuit EDCSZ is configured to detect whether the set of data pulses representing the payload segment MPB2 were decoded appropriately.

When no error is detected in the decoded payload segment DMPBZ and the error check is passed, the slave bus controller 108Z is configured to store the decoded payload segment DMPBZ within the memory device 154Z. More specifically, the data demodulator 208Z is configured to pass the decoded payload segment DMPBZ and the decoded address subfield of the decoded command field to the memory device 154Z. The memory device 154Z is then operable to store the decoded payload segment DMPBZ in the slave data 214Z at the memory address of the memory device 154Z that is identified by the decoded address subfield. However, when an error is detected in the decoded payload segment DMPBZ and the error check fails, the decoded payload segment DMPBZ is not stored in the slave data 214Z of the memory device 154Z.

Referring again to FIG. 15 and FIG. 16, after the error code subframe CRC3, the group write data frame 232 includes a bus park subframe BP3. During a bus park subframe BP3, the data modulator 126 of the master bus controller 110 transfers control of the bus line 12 to the slave bus controllers 108, 108X, 108Y, and 108Z. The data modulator 126 is configured to generate the enable signal MEN so that the bidirectional buffer 132 allows the slave bus controllers 108, 108X, 108Y, and 108Z to communicate along the bus line 12. The master bus controller 110 is configured to tristate the input data signal SDATA so that a passive pull down is provided to the bus line 12. The master bus controller 110 is configured to pull the bus line 12 back up and transfer control of the bus line 12 to the slave bus controller 108. The master bus controller 110 then monitors the bus line 12 after pulling up the bus line 12. When the slave bus controller 108 is operating appropriately, the slave bus controller 108 will maintain the bus line 12 pulled up and then pull down the bus line 12. This creates a falling edge. Thus, when the master bus controller 110 detects the falling edge created by the slave bus controller 108 within the error tolerance window, the master bus controller 110 detects that the slave bus controller 108 is operating appropriately.

Referring again to FIG. 15 and FIG. 16, the group write data frame 232 shown in FIG. 16 then includes the acknowledgement subframe ACK1, the acknowledgement subframe ACK2, the acknowledgment subframe ACK3, and the acknowledgement subframe ACK4. Each of the acknowledgement subframe ACK1, the acknowledgement subframe ACK2, the acknowledgment subframe ACK3, and the acknowledgement subframe ACK4 is a subframe where one of the slave bus controllers 108, 108X, 108Y, and 108Z can provide acknowledgment signals ACK, ACKX, ACKY, and ACKZ, as explained in further detail below. More specifically, the bus interface system 109 is configured to operate in a round robin acknowledgement configuration. With a round robin acknowledgement configuration, each of the slave bus controllers 108, 108X, 108Y, and 108Z are configured to provide the acknowledgment signals ACK, ACKX, ACKY, and ACKZ in a sequential order. For the sake of clarity and this explanation, the sequential order is presumed to correspond to the physical order of the slave bus controllers 108, 108X, 108Y, and 108Z as shown in FIG. 15. In this embodiment, each of the slave bus controllers 108, 108X, 108Y, and 108Z is also triggered along the bus line 12 to generate the acknowledgment signals ACK, ACKX, ACKY, and ACKZ in sequential order.

For the sake of this explanation, the slave bus controller 108 is configured to provide the acknowledgement signal ACK during the acknowledgement subframe ACK1. The slave bus controller 108X is configured to provide the acknowledgement signal ACKX during the acknowledgement subframe ACK2. The slave bus controller 108Y is configured to provide the acknowledgement signal ACKY during the acknowledgement subframe ACK3. The slave bus controller 108Z is configured to provide the acknowledgement signal ACKZ during the acknowledgement subframe ACK4. The slave bus controller 108 is thus an initial slave bus controller in the sequential order. The slave bus controller 108X is thus an intermediate slave bus controller and next in the sequential order after the initial slave bus controller. The slave bus controller 108Y is also an intermediate slave bus controller and next in the sequential order after the previous intermediate slave bus controller. Finally, the slave bus controller 108Z is thus a final slave bus controller in the sequential order.

However, this particular sequential ordering may or may not be the case. The sequential order may actually be in any other order and thus would not correspond with the physical order of the slave bus controllers 108, 108X, 108Y, and 108Z as shown in FIG. 15. In fact, the bus interface system 109 in this embodiment is configured so that the sequential order is programmable rather than being fixed. For example, at startup, the master bus controller 110 may transmit data pulses representing an order parameter to each of the slave bus controllers 108, 108X, 108Y, and 108Z along the bus that that indicates to each of the slave bus controllers 108, 108X, 108Y, and 108Z their position in the sequential order. In this manner, the slave bus controllers 108, 108X, 108Y, and 108Z are assigned a different one of the acknowledgement subframes ACK1, ACK2, ACK3, and ACK4 in which to provide the their respective acknowledgement signals ACK, ACKX, ACKY, and ACKZ.

Continuing on with the example, the slave bus controller 108 is configured to generate the acknowledgement signal ACK during the acknowledgement subframe ACK1. The slave bus controller 108 is the initial slave bus controller in this example. Accordingly, in this embodiment, the slave bus controller 108 is triggered to generate the acknowledgement signal ACK by the master bus controller 110. In particular, the slave bus controller is triggered to generate the acknowledgement signal ACK by the falling edge of a negative trigger pulse BPP generated by the master bus controller 110 during the bus park subframe BP3.

During the acknowledgment subframe ACK1, the acknowledge generator 228 of the slave bus controller 108 is configured to generate the acknowledgement pulse with the acknowledgement signal ACK along the bus line 12 in response to the decoded payload segment DMPB passing the error check. With acknowledgement pulse, the acknowledgement signal ACK indicates to the master bus controller 110 that the decoded payload segment DMPB passed the error check. More specifically, the error detection circuit EDCS is configured to generate the error status signal 230 so that the error status signal 230 indicates that the decoded payload segment DMPB passed the error check. More specifically, once being triggered along the bus line 12 by the master bus controller 110, the acknowledge generator 228 is configured to generate the acknowledgement signal ACK with the acknowledgment pulse in response to the error status signal 230 indicating that the decoded payload segment DMPB passed the error check. In this embodiment, the acknowledgment pulse generated by the acknowledge generator 228 is a negative trigger pulse.

However, the acknowledge generator 228 of the slave bus controller 108 is configured to so as to not generate the acknowledgement pulse with the acknowledgement signal ACK along the bus line 12 in response to the decoded payload segment DMPB failing the error check. Without the acknowledgement pulse, the acknowledgement signal ACK indicates that the decoded payload segment DMPB failed the error check. More specifically, the error detection circuit EDCS is configured to generate the error status signal 230 so that the error status signal 230 indicates that the decoded payload segment DMPB failed the error check. More specifically, once being triggered along the bus line 12 by the master bus controller 110, the acknowledge generator 228 is configured to generate the acknowledgement signal ACK without the acknowledgment pulse in response to the error status signal 230 indicating that the decoded payload segment DMPB failed the error check. In this embodiment, the acknowledgment pulse generated by the acknowledge generator 228 is a negative trigger pulse.

The shadow register circuit 224 of the master bus controller 110 is coupled to the bus line 12 and is configured to receive the acknowledgement signal ACK during the acknowledgement subframe ACK1. In response to the acknowledgment pulse provided so that the acknowledgement signal ACK indicates that the decoded payload segment DMPB passed the error check, the master bus controller 110 is configured to store the payload segment MPB2 of the group write command COM2 in the memory device 202. More specifically, the shadow register circuit 224 is configured to pass the payload segment MPB1 stored within the shadow registers 226 to the memory device 202. The memory device 202 is configured to store the payload segment MPB2 within the slave data image 216W at the memory address identified by the address subfield of the command field CB2. Thus, the shadow register circuit 224 is configured to pass the payload segment MPB2 to the memory device 202 in response to receiving the acknowledgement pulse along the bus line 12 during the acknowledgement subframe ACK1.

In response to the decoded payload segment DMPB failing the error check, the acknowledge generator 228 of the slave bus controller 108 is configured to generate the acknowledgment signal ACK along the bus line 12 so that the acknowledgement signal ACK indicates that the decoded payload segment DMPB failed the error check. When the master bus controller 110 does not receive the acknowledgement pulse and thus the acknowledgement signal ACK indicates that the decoded payload segment DMPB failed the error check, the master bus controller 110 is configured to generate a trigger pulse along the bus line 12 with the input data signal SDATA. The payload segment MPB2 is also not stored with the slave data image 216W.

With regard to the slave bus controller 108X, the slave bus controller 108X is configured to generate the acknowledgement signal ACKX during the acknowledgement subframe ACK2. The slave bus controller 108X is the next slave bus controller in the sequential order in this example. Accordingly, in this embodiment, the slave bus controller 108X is triggered to generate the acknowledgement signal ACKX by the acknowledgement pulse in the acknowledgement signal ACK from the slave bus controller 108. However, when the slave bus controller 108 does not generate the acknowledgment pulse during the acknowledgment subframe ACK2, the slave bus controller 108X is triggered to generate the acknowledgement signal ACKX by the trigger pulse generated by the master bus controller 110 along the bus line 12. As such, the slave bus controller 108X does not get stuck when the slave bus controller 108 does not provide the acknowledgement pulse within the acknowledgement signal ACKX, and the group write data frame 232 can proceed in accordance to the sequential order.

During the acknowledgment subframe ACK2, the acknowledge generator 228X of the slave bus controller 108X is configured to generate the acknowledgement pulse with the acknowledgement signal ACKX along the bus line 12 in response to the decoded payload segment DMPBX passing the error check. With acknowledgement pulse, the acknowledgement signal ACKX indicates to the master bus controller 110 that the decoded payload segment DMPBX passed the error check. More specifically, the error detection circuit ESCSX is configured to generate an error status signal 230X so that the error status signal 230X indicates that the decoded payload segment DMPBX passed the error check. More specifically, once being triggered along the bus line 12 by the master bus controller 110, the acknowledge generator 228X is configured to generate the acknowledgement signal ACKX with the acknowledgment pulse in response to the error status signal 230X indicating that the decoded payload segment DMPBX passed the error check. In this embodiment, the acknowledgment pulse generated by the acknowledge generator 228X is a negative trigger pulse.

However, the acknowledge generator 228X of the slave bus controller 108X is configured to so as to not generate the acknowledgement pulse with the acknowledgement signal ACKX along the bus line 12 in response to the decoded payload segment DMPBX failing the error check. Without the acknowledgement pulse, the acknowledgement signal ACKX indicates that the decoded payload segment DMPBX failed the error check. More specifically, the error detection circuit ESCSX is configured to generate the error status signal 230X so that the error status signal 230X indicates that the decoded payload segment DMPBX failed the error check. More specifically, once being triggered along the bus line 12 by the master bus controller 110, the acknowledge generator 228X is configured to generate the acknowledgement signal ACKX without the acknowledgment pulse in response to the error status signal 230X indicating that the decoded payload segment DMPBX failed the error check. In this embodiment, the acknowledgment pulse generated by the acknowledge generator 228X is a negative trigger pulse.

The shadow register circuit 224 of the master bus controller 110 is coupled to the bus line 12 and is configured to receive the acknowledgement signal ACKX during the acknowledgement subframe ACK2. In response to the acknowledgment pulse provided so that the acknowledgment signal ACK indicates that the decoded payload segment DMPBX passed the error check, the master bus controller 110 is configured to store the payload segment MPB2 of the group write command COM2 in the memory device 202X. More specifically, the shadow register circuit 224 is configured to pass the payload segment MPB2 stored within the shadow registers 226 to the memory device 202X. The memory device 202X is configured to store the payload segment MPB2 within the slave data image 216X at the memory address identified by the address subfield of the command field CB2. Thus, the shadow register circuit 224 is configured to pass the payload segment MPB2 to the memory device 202X in response to receiving the acknowledgement pulse along the bus line 12 during the acknowledgement subframe ACK2.

In response to the decoded payload segment DMPBX failing the error check, the acknowledge generator 228X of the slave bus controller 108X is configured to generate the acknowledgement signal ACKX along the bus line 12 so that the acknowledgement signal ACKX indicates that the decoded payload segment DMPBX failed the error check. When the master bus controller 110 does not receive the acknowledgement pulse and the acknowledgement signal ACKX indicates that the decoded payload segment DMPBX failed the error check, the master bus controller 110 is configured to generate a trigger pulse along the bus line 12 with the input data signal SDATA. The payload segment MPB2 is also not stored with the slave data image 216X.

With regard to the slave bus controller 108Y, slave bus controller 108Y is configured to generate the acknowledgement signal ACKY during the acknowledgement subframe ACK3. The slave bus controller 108Y is the next slave bus controller in the sequential order in this example. Accordingly, in this embodiment, the slave bus controller 108Y is triggered to generate the acknowledgement signal ACKY by the acknowledgement pulse in the acknowledgement signal ACKX from the slave bus controller 108X. However, when the slave bus controller 108 does not generate the acknowledgment pulse during the acknowledgment subframe ACK3, the slave bus controller 108X is triggered to generate the acknowledgement signal ACKY by the trigger pulse generated by the master bus controller 110 along the bus line 12. As such, the slave bus controller 108Y does not get stuck when the slave bus controller 108 does not provide the acknowledgement pulse within the and the group write data frame 232 can proceed in accordance to the sequential order.

During the acknowledgment subframe ACK3, the acknowledge generator 228Y of the slave bus controller 108Y is configured to generate the acknowledgement pulse with the acknowledgement signal ACKY along the bus line 12 in response to the decoded payload segment DMPBY passing the error check. With acknowledgement pulse, the acknowledgement signal ACKY indicates to the master bus controller 110 that the decoded payload segment DMPBY passed the error check. More specifically, the error detection circuit ESCSY is configured to generate an error status signal 230Y so that the error status signal 230Y indicates that the decoded payload segment DMPBY passed the error check. More specifically, once being triggered along the bus line 12 by the master bus controller 110, the acknowledge generator 228Y is configured to generate the acknowledgement signal ACKY with the acknowledgment pulse in response to the error status signal 230Y indicating that the decoded payload segment DMPBY passed the error check. In this embodiment, the acknowledgment pulse generated by the acknowledge generator 228Y is a negative trigger pulse.

However, the acknowledge generator 228Y of the slave bus controller 108Y is configured to so as to not generate the acknowledgement pulse with the acknowledgement signal ACKY along the bus line 12 in response to the decoded payload segment DMPBY failing the error check. Without the acknowledgement pulse, the acknowledgement signal ACKY indicates that the decoded payload segment DMPBY failed the error check. More specifically, the error detection circuit ESCSY is configured to generate the error status signal 230Y so that the error status signal 230Y indicates that the decoded payload segment DMPBY failed the error check. More specifically, once being triggered along the bus line 12 by the master bus controller 110, the acknowledge generator 228Y is configured to generate the acknowledgement signal ACKY without the acknowledgment pulse in response to the error status signal 230Y indicating that the decoded payload segment DMPBY failed the error check. In this embodiment, the acknowledgment pulse generated by the acknowledge generator 228Y is a negative trigger pulse.

The shadow register circuit 224 of the master bus controller 110 is coupled to the bus line 12 and is configured to receive the acknowledgement signal ACKY during the acknowledgement subframe ACK3. In response to the acknowledgment pulse provided so that the acknowledgement signal ACK3 indicates that the decoded payload segment DMPBY passed the error check, the master bus controller 110 is configured to store the payload segment MPB2 of the group write command COM2 in the memory device 202Y. More specifically, the shadow register circuit 224 is configured to pass the payload segment MPB2 stored within the shadow registers 226 to the memory device 202Y. The memory device 202Y is configured to store the payload segment MPB2 within the slave data image 216Y at the memory address identified by the address subfield of the command field CB2. Thus, the shadow register circuit 224 is configured to pass the payload segment MPB2 to the memory device 202Y in response to receiving the acknowledgement pulse along the bus line 12 during the acknowledgement subframe ACK3.

In response to the decoded payload segment DMPBY failing the error check, the acknowledge generator 228Y of the slave bus controller 108Y is configured to generate the acknowledgement signal ACKY along the bus line 12 so that the acknowledgement signal ACKY indicates that the decoded payload segment DMPBY failed the error check. When the master bus controller 110 does not receive the acknowledgement pulse and thus the acknowledgement signal ACKY indicates that the decoded payload segment DMPBY failed the error check, the master bus controller 110 is configured to generate a trigger pulse along the bus line 12 with the input data signal SDATA. The payload segment MPB2 is also not stored with the slave data image 216Y.

With regard to the slave bus controller 108Z, the slave bus controller 108Z is configured to generate the acknowledgement signal ACKZ during the acknowledgement subframe ACK4. In this example, the slave bus controller 108Z is the final slave bus controller in the sequential order. Accordingly, in this embodiment, the slave bus controller 108Z is triggered to generate the acknowledgement signal ACKZ by the acknowledgement pulse in the acknowledgement signal ACKY from the slave bus controller 108Y. However, when the slave bus controller 108Y does not generate the acknowledgment pulse during the acknowledgment subframe ACK3, the master bus controller 110 is configured to generate a trigger pulse. As such, the slave bus controller 108Z does not get stuck and the group write data frame 232 can proceed in accordance to the sequential order.

During the acknowledgment subframe ACK4, the acknowledge generator 228Z of the slave bus controller 108Z is configured to generate the acknowledgement pulse with the acknowledgement signal ACKZ along the bus line 12 in response to the decoded payload segment DMPBZ passing the error check. With acknowledgement pulse, the acknowledgement signal ACKZ indicates to the master bus controller 110 that the decoded payload segment DMPBZ passed the error check. More specifically, the error detection circuit ESCSZ is configured to generate an error status signal 230Z so that the error status signal 230Z indicates that the decoded payload segment DMPBZ passed the error check. More specifically, once being triggered along the bus line 12 by the master bus controller 110, the acknowledge generator 228Z is configured to generate the acknowledgement signal ACKZ with the acknowledgment pulse in response to the error status signal 230Z indicating that the decoded payload segment DMPBZ passed the error check. In this embodiment, the acknowledgment pulse generated by the acknowledge generator 228Z is a negative trigger pulse.

However, the acknowledge generator 228Z of the slave bus controller 108Z is configured to so as to not generate the acknowledgement pulse with the acknowledgement signal ACKZ along the bus line 12 in response to the decoded payload segment DMPBZ failing the error check. Without the acknowledgement pulse, the acknowledgement signal ACKZ indicates that the decoded payload segment DMPBZ failed the error check. More specifically, the error detection circuit ESCSZ is configured to generate the error status signal 230Z so that the error status signal 230Z indicates that the decoded payload segment DMPBZ failed the error check. More specifically, once being triggered along the bus line 12 by the master bus controller 110, the acknowledge generator 228Z is configured to generate the acknowledgement signal ACKZ without the acknowledgment pulse in response to the error status signal 230Z indicating that the decoded payload segment DMPBZ failed the error check. In this embodiment, the acknowledgment pulse generated by the acknowledge generator 228Z is a negative trigger pulse.

The shadow register circuit 224 of the master bus controller 110 is coupled to the bus line 12 and is configured to receive the acknowledgement signal ACKZ during the acknowledgement subframe ACK4. In response to the acknowledgment pulse provided so that the acknowledgement signal ACK4 indicates that the decoded payload segment DMPBZ passed the error check, the master bus controller 110 is configured to store the payload segment MPB2 of the group write command COM2 in the memory device 202Z. More specifically, the shadow register circuit 224 is configured to pass the payload segment MPB2 stored within the shadow registers 226 to the memory device 202Z. The memory device 202Z is configured to store the payload segment MPB2 within the slave data image 216Z at the memory address identified by the address subfield of the command field CB2. Thus, the shadow register circuit 224 is configured to pass the payload segment MPB2 to the memory device 202Z in response to receiving the acknowledgement pulse along the bus line 12 during the acknowledgement subframe ACK4.

In response to the decoded payload segment DMPBZ failing the error check, the acknowledge generator 228Z of the slave bus controller 108Z is configured to generate the acknowledgement signal ACKZ along the bus line 12 so that the acknowledgement signal ACKZ indicates that the decoded payload segment DMPBZ failed the error check. When the master bus controller 110 does not receive the acknowledgement pulse and thus the acknowledgement signal ACKZ indicates that the decoded payload segment DMPBZ failed the error check, the payload segment MPB2 is also not stored with the slave data image 216Z.

Figure 17:
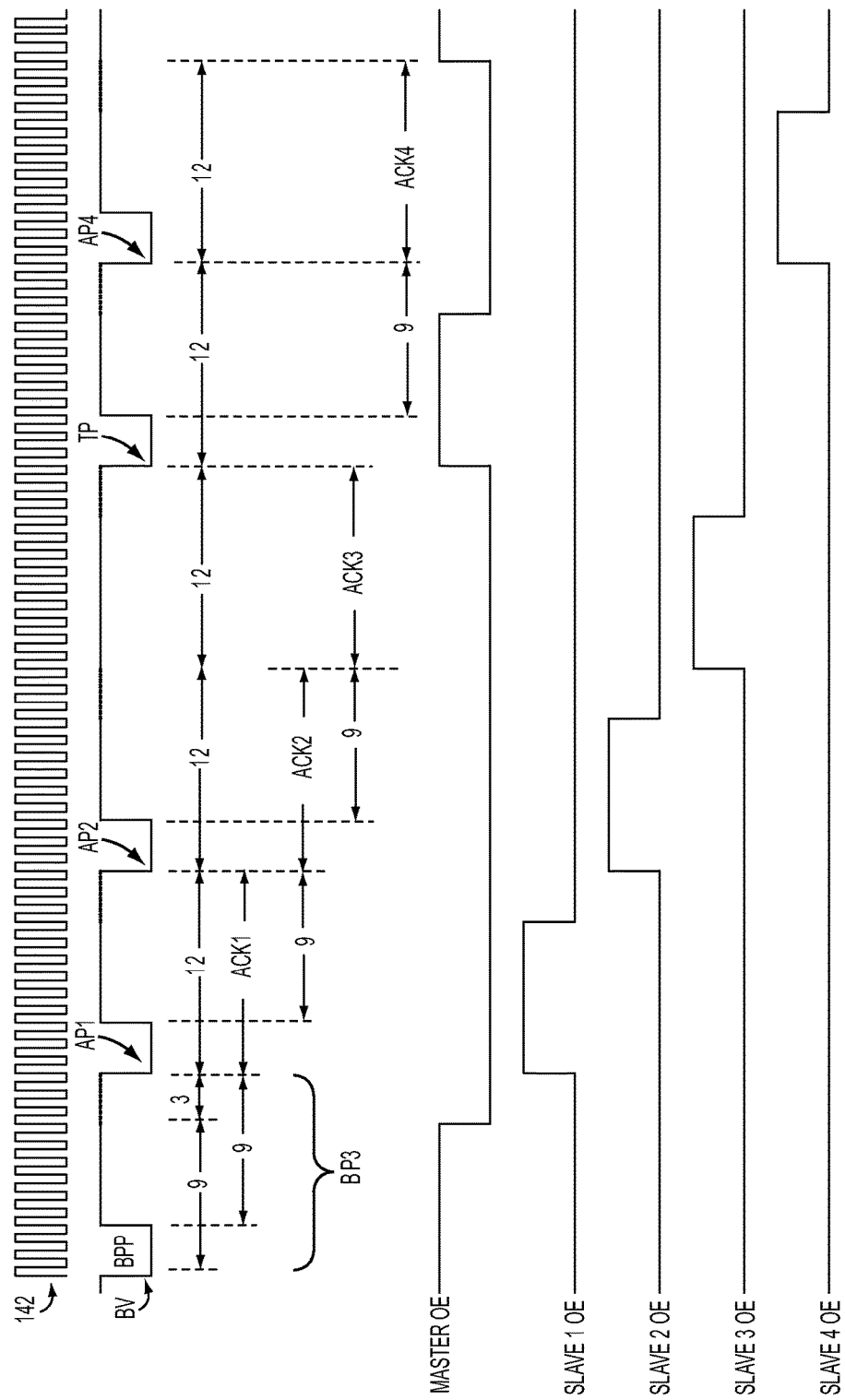
FIG. 17 is an exemplary signal diagram of the bus interface system shown in FIG. 16 performing a round robin acknowledgment.

FIG. 17 is a signal diagram illustrating signals of the bus interface system 109 shown in FIG. 15 during one example of the bus park subframe BP3, the acknowledgement subframe ACK1, the acknowledgement subframe ACK2, the acknowledgement subframe ACK3, and the acknowledgement subframe ACK4. FIG. 17 illustrates the oscillation signal 142, a bus voltage BV of the bus line 12, a master output enabler (OE), a slave 1 OE, a slave 2 OE, a slave 3 OE, and a slave 4 OE. The slave 1 OE is for the initial slave bus controller in the sequential order, which in this example is the slave bus controller 108. The slave 2 OE is for the next slave bus controller in the sequential order, which in this example is the slave bus controller 108X. The slave 3 OE is for the subsequent slave bus controller in the sequential order, which in this example is the slave bus controller 108Y. The slave 4 OE is for the final slave bus controller in the sequential order, which in this example is the slave bus controller 108Z.

As shown in FIG. 17, the bus park subframe BP3 begins with the negative trigger pulse BPP generated by the master bus controller 110 along the bus line 12 (shown in FIG. 15). Thus, the bus voltage BV is shown with the negative trigger pulse BPP, which lasts for three oscillation pulses of the oscillation signal 142. The slave bus controller 108 is triggered by a falling edge of the negative trigger pulse BPP. The master bus controller BV then pulls the bus voltage back up. After nine oscillation pulses, the master OE goes low and control of the bus voltage BV begins to be transferred to the slave bus controller 108 for three oscillation pulses.

Since the slave bus controller 108 was triggered by the falling edge of the negative trigger pulse BPP, the acknowledgement subframe ACK1 begins after the twelve oscillation pulses of the bus park subframe BP3. The slave 1 OE goes high. The slave bus controller 108 in this example generates the acknowledgement pulse AP1 during the acknowledgement subframe ACK1 for 3 oscillation pulses. The slave bus controller 108 then pulls the bus voltage up for nine oscillation pulses. The slave bus controller 108X is triggered by the falling edge of the acknowledgement pulse AP1.

Since the slave bus controller 108X was triggered by the falling edge of the acknowledgement pulse AP1, the acknowledgement subframe ACK2 begins after twelve oscillation pulses of the acknowledgement subframe ACK1. The slave 2 OE goes high. The slave bus controller 108X in this example generates the acknowledgement pulse AP2 during the acknowledgement subframe ACK1 for 3 oscillation pulses. The slave bus controller 108X then pulls the bus voltage up for nine oscillation pulses. The slave bus controller 108Y is triggered by the falling edge of the acknowledgement pulse AP2.

Since the slave bus controller 108Y was triggered by the falling edge of the acknowledgement pulse AP2, the acknowledgement subframe ACK3 begins after twelve oscillation pulses of the acknowledgement subframe ACK2. The slave 3 OE goes high. The slave bus controller 108Y in this example does not generate an acknowledgement pulse during the acknowledgement subframe ACK3. Therefore, after the twelve oscillation pulses of the acknowledgement subframe ACK3, the master OE goes high again. The master bus controller 110 then generates a trigger pulse TP. In this manner, the slave bus controller 108Z is triggered by the falling edge of the trigger pulse TP.

Since the slave bus controller 108Z was triggered by the falling edge of the trigger pulse TP, the acknowledgement subframe ACK4 begins twelve oscillation pulses after the falling edge of the trigger pulse TP. The slave 4 OE goes high. The slave bus controller 108Z in this example generates the acknowledgement pulse AP4 during the acknowledgement subframe ACK4 for 3 oscillation pulses. The slave bus controller 108Z then pulls the bus voltage up for nine oscillation pulses. The acknowledgement subframe ACK4 then ends.

Those skilled in the art will recognize improvements and modifications to the preferred embodiments of the present disclosure. All such improvements and modifications are considered within the scope of the concepts disclosed herein and the claims that follow.

What is claimed is:

1. A bus interface system comprising:
a single bus line;
a master bus controller coupled to the single bus line, wherein the master bus controller is configured to:
generate a first set of data pulses along the single bus line representing a payload segment;
a slave bus controller coupled to the single bus line, wherein no other bus line connects the master bus controller and the slave bus controller, and wherein the slave bus controller is configured to:
decode the first set of data pulses representing the payload segment into a decoded payload segment;
perform a first error check on the decoded payload segment; and
generate an acknowledgment signal along the single bus line so that the acknowledgement signal indicates that the decoded payload segment passed the first error check.

2. The bus interface system of claim 1 wherein the master bus controller comprises a memory device and is further configured to store the payload segment in the memory device in response to the acknowledgement signal indicating that the decoded payload segment passed the first error check.

3. The bus interface system of claim 1 wherein the slave bus controller comprises a first memory device configured to store slave data assigned to first memory addresses, wherein the slave bus controller is further configured to store the decoded payload segment at a first memory address of the first memory addresses in response to the decoded payload segment passing the first error check.

4. The bus interface system of claim 3 wherein the master bus controller comprises a second memory device configured to store a slave data image assigned to second memory addresses such that the second memory addresses correspond to the first memory addresses of the slave data and wherein:
the second memory device of the master bus controller is configured to store the slave data image; and
the master bus controller is configured to store the payload segment within the slave data image at a second memory address of the second memory addresses in response to the acknowledgement signal indicating that the decoded payload segment passed the first error check.

5. The bus interface system of claim 4 wherein the master bus controller is configured to store a write command that identifies the first memory address and includes the payload segment;
the master bus controller is configured to store the payload segment within the slave data image by being configured to pass the write command to the second memory device in response to the acknowledgement signal indicating that the decoded payload segment passed the first error check, wherein the second memory device is configured to store the payload segment at the second memory address corresponding to the first memory address identified by the write command.

6. The bus interface system of claim 5 further comprising a second bus line wherein:
the master bus controller is coupled to the second bus line and is configured to:
decode an input data signal representing a read command in accordance with a first bus protocol along the second bus line into a decoded read command, wherein the decoded read command identifies the slave bus controller and the first memory address of the first memory addresses; and
obtain the payload segment at the second memory address of the second memory addresses of the slave data image in response to the decoded read command.

7. The bus interface system of claim 6 wherein the master bus controller is further configured to transmit a second input data signal along the second bus line representing the payload segment in accordance with a second bus protocol.

8. The bus interface system of claim 1 wherein the slave bus controller is configured to generate the acknowledgment signal along the single bus line which indicates that the decoded payload segment passed the first error check by being configured to generate an acknowledgement pulse in the acknowledgement signal.

9. The bus interface system of claim 1 wherein the slave bus controller is configured to generate the acknowledgement signal along the single bus line so that the acknowledgement signal indicates that the decoded payload segment failed the first error check.

10. The bus interface system of claim 9 wherein the slave bus controller is configured to:
generate the acknowledgement signal along the single bus line so that the acknowledgement signal indicates that the decoded payload segment passed the first error check by being configured to generate an acknowledgment pulse along the single bus line within the acknowledgment signal; and
generate the acknowledgement signal along the single bus line so that the acknowledgement signal indicates that the decoded payload segment failed the first error check by being configured to not generate the acknowledgment pulse along the single bus line.

11. The bus interface system of claim 1 wherein the master bus controller is further configured to store a write command that includes the payload segment and wherein the master bus controller is configured to generate the first set of data pulses along the single bus line representing the payload segment of the write command.

12. The bus interface system of claim 11 wherein:
the slave bus controller further comprises a first memory device, wherein the slave bus controller is configured to store the decoded payload segment in the first memory device in response to the decoded payload segment passing the first error check; and
the master bus controller includes a second memory device, wherein the master bus controller is configured to store the payload segment of the write command in the second memory device in response to the acknowledgment signal along the single bus line indicating that the decoded payload segment passed the first error check.

13. The bus interface system of claim 12 wherein:
the slave bus controller is further configured to:
not store the decoded payload segment in the first memory device when the decoded payload segment fails the first error check; and
generate the acknowledgement signal so that the acknowledgement signal indicates that the decoded payload segment failed the first error check; and
the master bus controller is further configured to:
not store the payload segment in the second memory device in response to the acknowledgement signal indicating that the decoded payload segment failed the first error check.

14. The bus interface system of claim 12 wherein the write command further comprises a command field, wherein:
the master bus controller is further configured to generate a second set of data pulses representing the command field of the write command; and
the slave bus controller is further configured to:
decode the second set of data pulses into a decoded command field; and
perform a second error check on the decoded command field.

15. The bus interface system of claim 14 wherein the master bus controller is configured to generate the first set of data pulses after the second set of data pulses and wherein the slave bus controller is configured to abort the write command when the decoded command field fails the second error check.

16. The bus interface system of claim 1 wherein:
the master bus controller is further configured to:
generate a first error code based on the payload segment;
generate a second set of data pulses along the single bus line representing the first error code; and
the slave bus controller is further configured to:
generate a second error code based on the decoded payload segment;
decode the second set of data pulses representing the first error code into a decoded error code; and
perform the first error check on the decoded payload segment by comparing the decoded error code and the second error code.

17. The bus interface system of claim 16 wherein:
the master bus controller is configured to generate the first error code based on the payload segment by being configured to implement a first cyclic redundancy code (CRC) algorithm on the payload segment so as to generate the first error code as a first CRC.

18. The bus interface system of claim 17 wherein the slave bus controller is configured to generate the second error code based on the decoded payload segment by being configured to implement a second CRC algorithm on the decoded payload segment so as to generate the second error code as a second CRC.

19. The bus interface system of claim 18 wherein the first CRC algorithm is the same as the second CRC algorithm.

20. The bus interface system of claim 18 wherein the slave bus controller is configured to perform the first error check on the decoded payload segment by comparing the decoded error code and the second error code by detecting whether the second CRC and the decoded error code match.

21. The bus interface system of claim 1 wherein:
the master bus controller is configured to generate the first set of data pulses along the single bus line representing the payload segment in accordance with a pulse width modulation (PWM) bus protocol; and
the slave bus controller is configured to decode the first set of data pulses in accordance with the PWM bus protocol.

22. A method of operating a master bus controller and a slave bus controller coupled along a single bus line, wherein no other bus line connects the master bus controller and the slave bus controller, the method comprising:
generating a first set of data pulses along the single bus line representing a payload segment with the master bus controller;
decoding the first set of data pulses representing the payload segment into a decoded payload segment with the slave bus controller;
performing a first error check on the decoded payload segment with the slave bus controller; and
generating an acknowledgment signal along the single bus line so that the acknowledgement signal indicates that the decoded payload segment passed the first error check with the slave bus controller.

23. The method of claim 22 further comprising storing the payload segment in a memory device of the master bus controller in response to the acknowledgement signal indicating that the decoded payload segment passed the first error check.

24. The method of claim 22 further comprising:
storing slave data with a first memory device of the slave bus controller, wherein the slave data is assigned first memory addresses; and
storing the decoded payload segment at a first memory address of the first memory addresses in response to the decoded payload segment passing the first error check.

25. The method of claim 24 further comprising:
storing a slave data image with a second memory device of the master bus controller wherein the slave data image is assigned to second memory addresses such that the second memory addresses correspond to the first memory addresses of the slave data; and
storing the payload segment within the slave data image at a second memory address of the second memory addresses in response to the acknowledgement signal indicating that the decoded payload segment passed the first error check, wherein the second memory address corresponds to the first memory address.

26. A master bus controller comprising:
a memory device;
a data modulator configured to generate a first set of data pulses representing a payload segment, wherein the first set of data pulses representing the payload segment is configured to be sent over a single bus line to a slave bus controller, wherein no other bus line connects the master bus controller and the slave bus controller; and a register circuit that includes registers, wherein the registers are configured to store the payload segment and the register circuit is configured to pass the payload segment to the memory device in response to receiving an acknowledgement pulse, and wherein the acknowledgment pulse is configured to be received over the single bus line from the slave bus controller;

wherein the memory device is configured to store the payload segment passed from the register circuit; and wherein the master bus controller and the slave bus controller are both part of a one wire bus interface system.

27. The master bus controller of claim 26 wherein:

the memory device is configured to store a slave data image assigned to first memory addresses that correspond to second memory addresses of slave data stored by the slave bus controller;

the registers are configured to store a write command that includes the payload segment, wherein the write command identifies a first memory address of the first memory addresses;

the register circuit is configured to pass the write command to the memory device in response to receiving the acknowledgement pulse; and the memory device is configured to store the payload segment at a second memory address of the second memory addresses corresponding to the first memory address identified by the write command.

28. The master bus controller of claim 26 wherein the data modulator is configured to generate the first set of data pulses representing the payload segment in accordance with a pulse width modulation (PWM) bus protocol.

29. A slave bus controller comprising:

a memory device;

a data demodulator configured to:

decode a first set of data pulses representing a payload segment into a decoded payload segment, wherein the first set of data pulses representing the payload segment is received over a single bus line from a master bus controller, wherein no other bus line connects the master bus controller and the slave bus controller;

perform a first error check on the decoded payload segment; and provide the decoded payload segment to the memory device when the decoded payload segment passes the first error check; and an acknowledgement generator configured to generate an acknowledgment signal so that the acknowledgement signal indicates that the decoded payload segment passed the first error check, wherein the acknowledgment signal is configured to be sent over the single bus line to the master bus controller;

wherein the memory device is configured to store the decoded payload segment from the data demodulator.

30. The slave bus controller of claim 29 wherein the data demodulator is further configured to:

decode a second set of data pulses representing a first error code into a decoded error code;

generate a second error code based on the decoded payload segment; and perform the first error check on the decoded payload segment by comparing the decoded error code and the second error code.

31. The slave bus controller of claim 29 wherein the data demodulator is configured to decode the first set of data pulses representing the payload segment in accordance with a pulse width modulation (PWM) bus protocol.

* * * * *